United States Patent
Kim et al.

(10) Patent No.: US 11,985,675 B2
(45) Date of Patent: May 14, 2024

(54) METHOD FOR TRANSMITTING/RECEIVING A MACHINE TYPE COMMUNICATION PHYSICAL DOWNLINK CONTROL CHANNEL

(71) Applicant: LG ELECTRONICS INC., Seoul (KR)

(72) Inventors: Jaehyung Kim, Seoul (KR); Seonwook Kim, Seoul (KR); Changhwan Park, Seoul (KR); Seokmin Shin, Seoul (KR); Joonkui Ahn, Seoul (KR); Suckchel Yang, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 628 days.

(21) Appl. No.: 17/265,548

(22) PCT Filed: Aug. 9, 2019

(86) PCT No.: PCT/KR2019/010151
§ 371 (c)(1),
(2) Date: Feb. 3, 2021

(87) PCT Pub. No.: WO2020/032733
PCT Pub. Date: Feb. 13, 2020

(65) Prior Publication Data
US 2022/0394680 A1 Dec. 8, 2022

Related U.S. Application Data

(60) Provisional application No. 62/755,370, filed on Nov. 2, 2018, provisional application No. 62/720,092, filed
(Continued)

(30) Foreign Application Priority Data

Sep. 20, 2018 (KR) .................. 10-2018-0113323
Oct. 9, 2018 (KR) .................. 10-2018-0120122
(Continued)

(51) Int. Cl.
*H04W 72/04* (2023.01)
*H04W 72/23* (2023.01)

(52) U.S. Cl.
CPC .................. *H04W 72/23* (2023.01)

(58) Field of Classification Search
CPC .................. H04W 72/23; H04W 72/04
See application file for complete search history.

(56) References Cited

U.S. PATENT DOCUMENTS

2018/0103459 A1* 4/2018 Liu .............. H04L 1/0072
2019/0246378 A1* 8/2019 Islam .............. H04L 1/1819
(Continued)

FOREIGN PATENT DOCUMENTS

| KR | 10-2018-0018993 | 2/2018 |
| KR | 10-2018-0030044 | 3/2018 |
| WO | 2018084672 | 5/2018 |

OTHER PUBLICATIONS

Valid subframes for M-PDDCH and PDSCH for LC-MTC, France, Oct. 4, 2015 (Year: 2015).*
(Continued)

*Primary Examiner* — Mewale A Ambaye
(74) *Attorney, Agent, or Firm* — BRYAN CAVE LEIGHTON PAISNER LLP

(57) ABSTRACT

A method for transmitting an MTC physical downlink control channel (MPDCCH) by a base station in a wireless communication system supporting machine type communication (MTC). A base station transmits, to a terminal. configuration information related to the transmission of an
(Continued)

MPDCCH and maps the MPDCCH onto multiple resource elements (REs) of at least one first symbol constituting a first slot of a special subframe. The special subframe is a subframe in which, among symbols constituting the subframe, the number of symbols for data transmission is smaller than or equal to a predetermined number. The base station transmits the MPDCCH to the terminal over the multiple resource elements, wherein the mapping step is performed by copying at least one second symbol of a second slot adjacent to the first slot onto the at least one first symbol.

14 Claims, 29 Drawing Sheets

Related U.S. Application Data on Aug. 20, 2018, provisional application No. 62/716,984, filed on Aug. 9, 2018.

(30) Foreign Application Priority Data

Feb. 15, 2019 (KR) .......................... 10-2019-0018221
Mar. 28, 2019 (KR) .......................... 10-2019-0036410

(56) References Cited

U.S. PATENT DOCUMENTS

2021/0297999 A1* 9/2021 Kim ..................... H04W 72/23
2022/0039069 A1* 2/2022 Fang ................... H04L 27/2602

OTHER PUBLICATIONS

Sony, "MTC Operation with a Narrowband PDCCH", 3GPP TSG-RAN WG1 Meeting #80, Feb. 9-13, 2015, R1-150428.
Sony, "Valid subframes for M-PDCCH and PDSCH for LC-MTC", 3GPP TAG-RAN WG1 Meeting #82bis, Oct. 5-9, 2015, R1-155884.
Huawei, Introduction of Rel-15 NB-loT Physical layer aspects, R1-1806920, 3GPP TSG-RAN WG1 Meeting #93, May 11, 2018, see section 5.
Huawei, et al., On Sub-RB resource allocation for MTC PUSCH, R1-1805891, 3GPP TSG RAN WG1 Meeting #93, May 11, 2018, see section 2.

* cited by examiner

[FIG. 1]
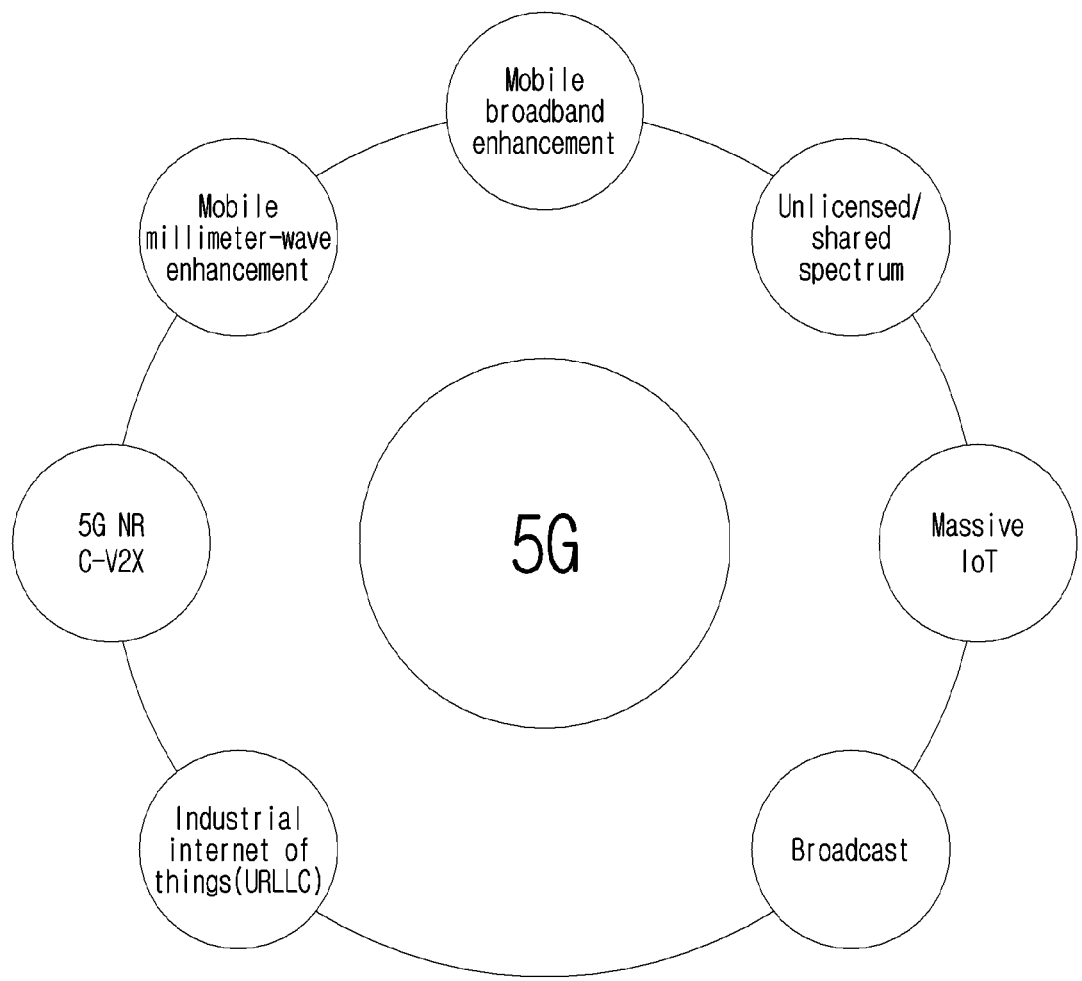

[FIG. 2]
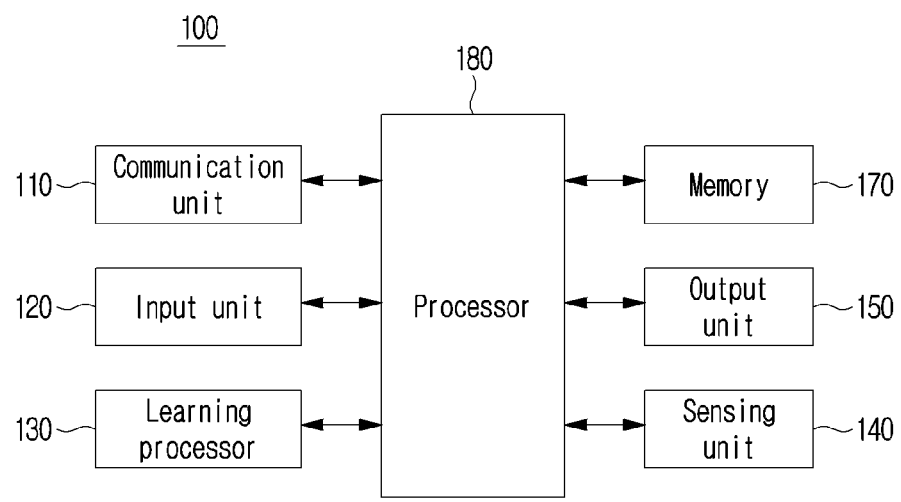

[FIG. 3]
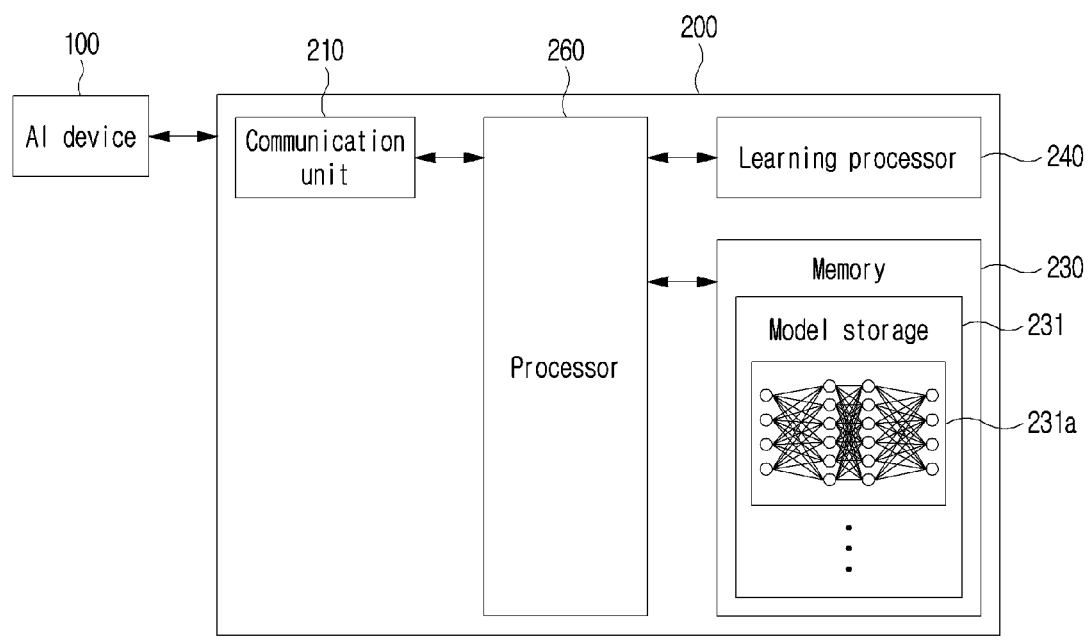

[FIG. 4]
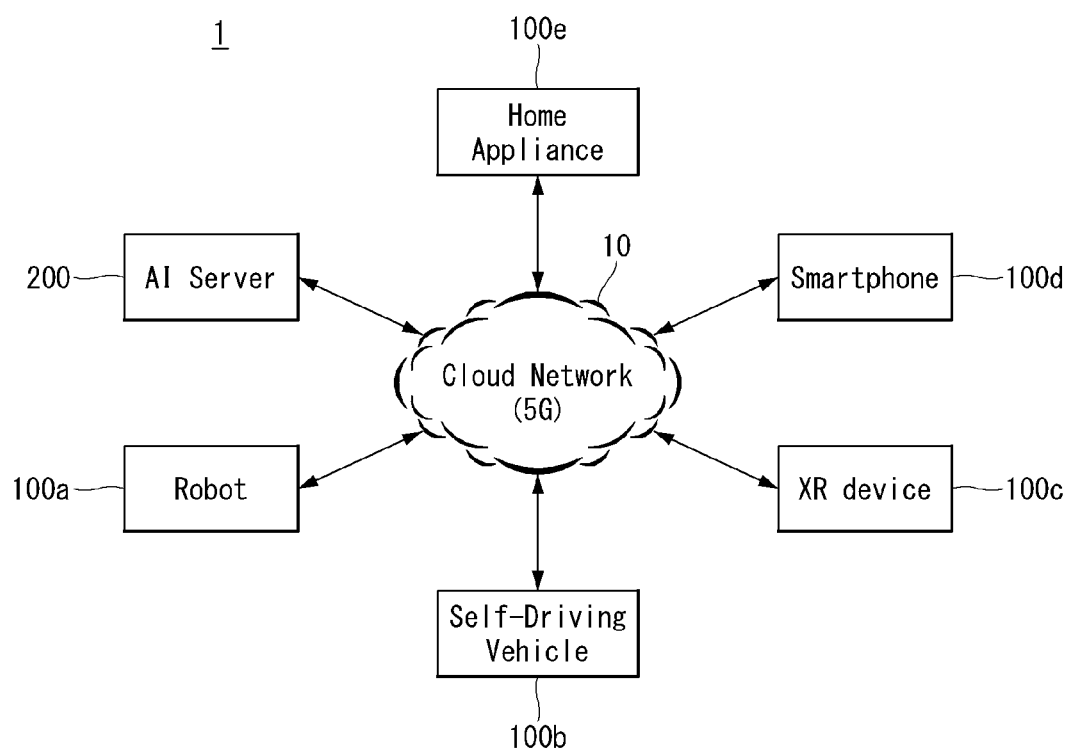

[FIG. 5]
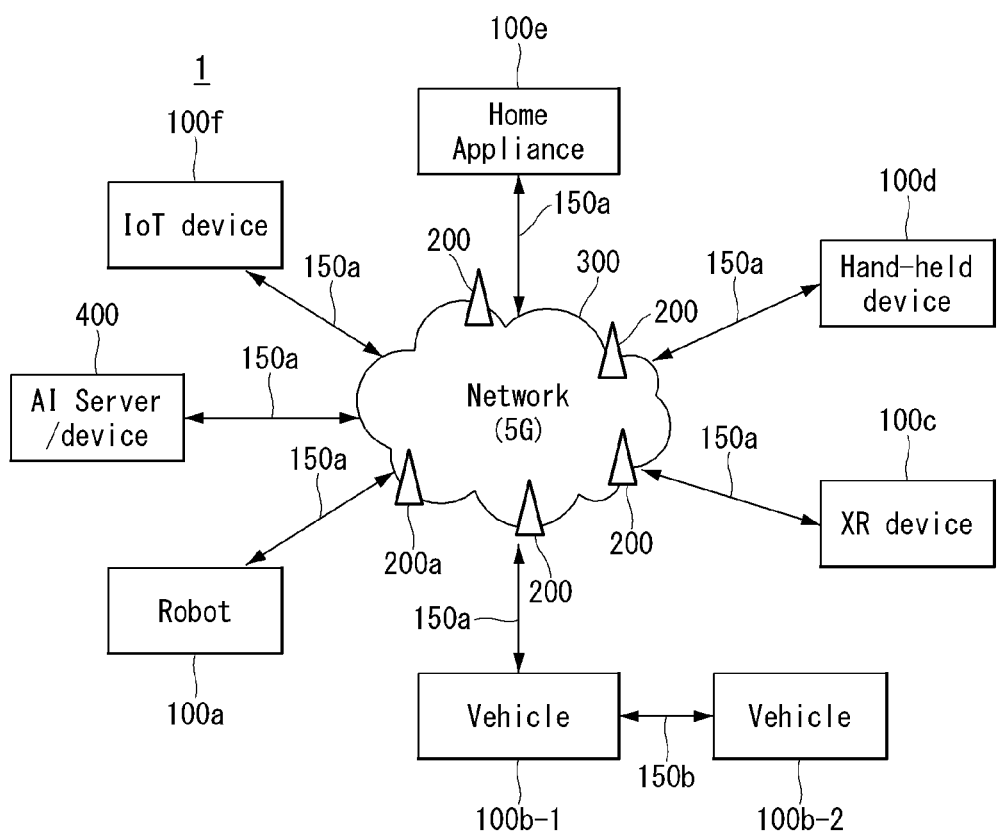

[FIG. 6]
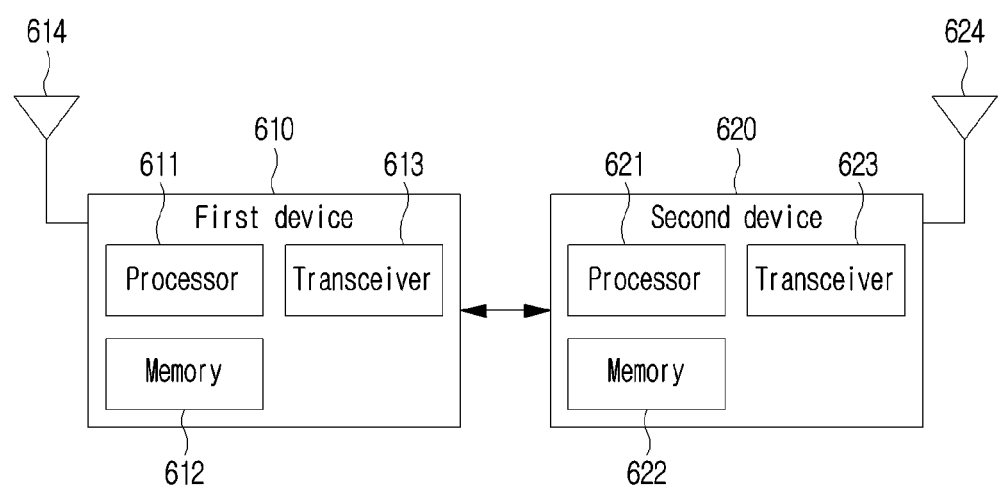

[FIG. 7]
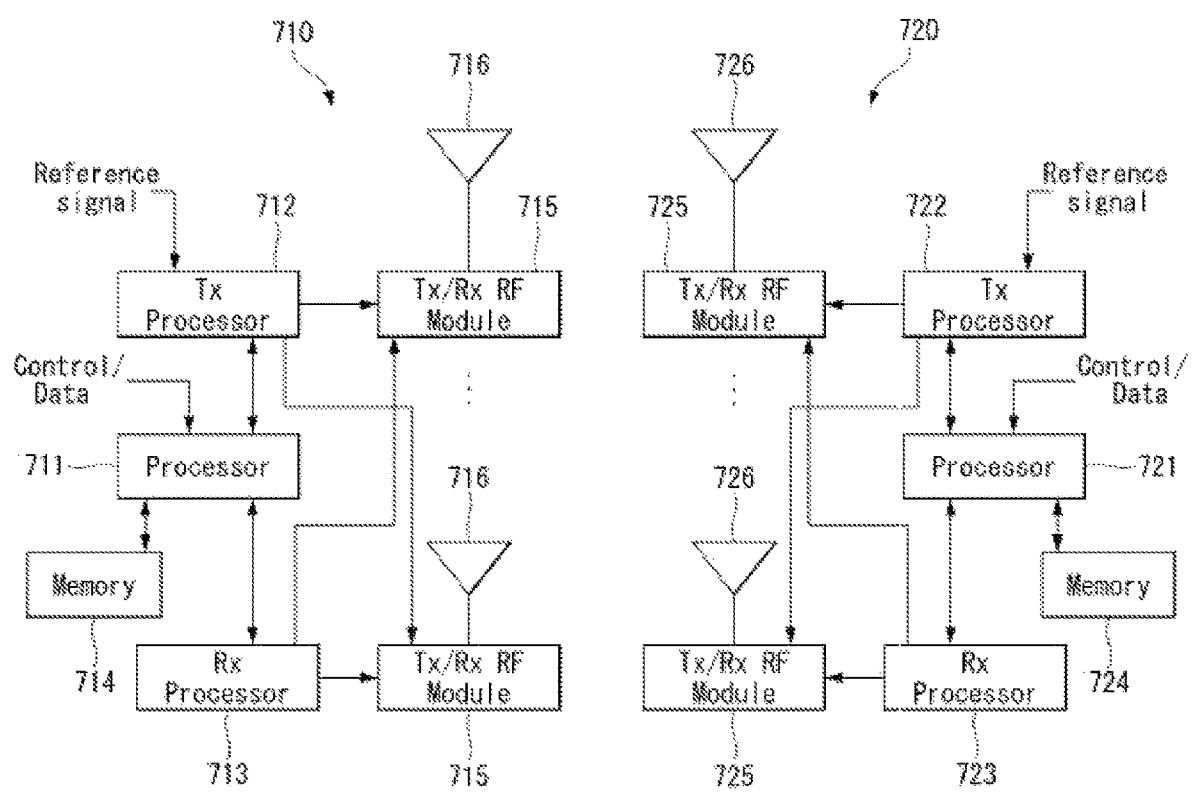

[FIG. 8]
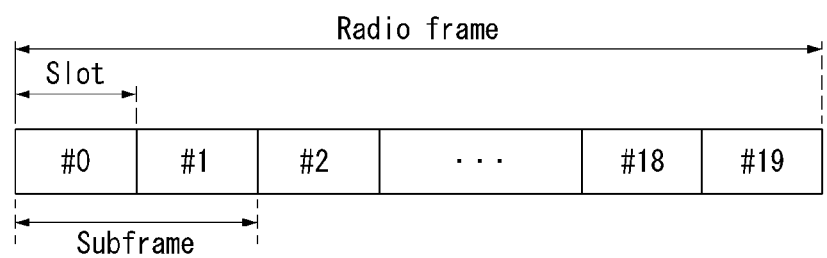

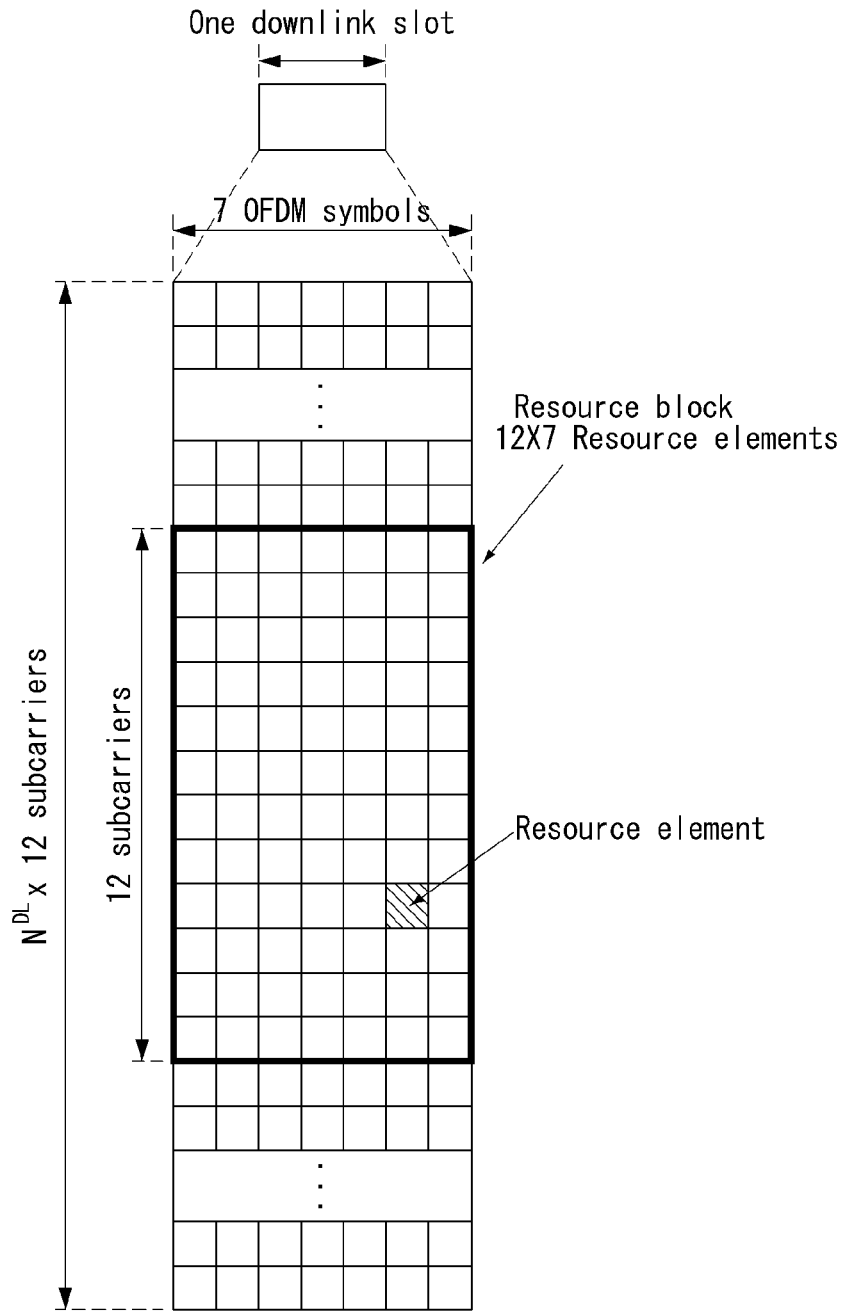

[FIG. 10]
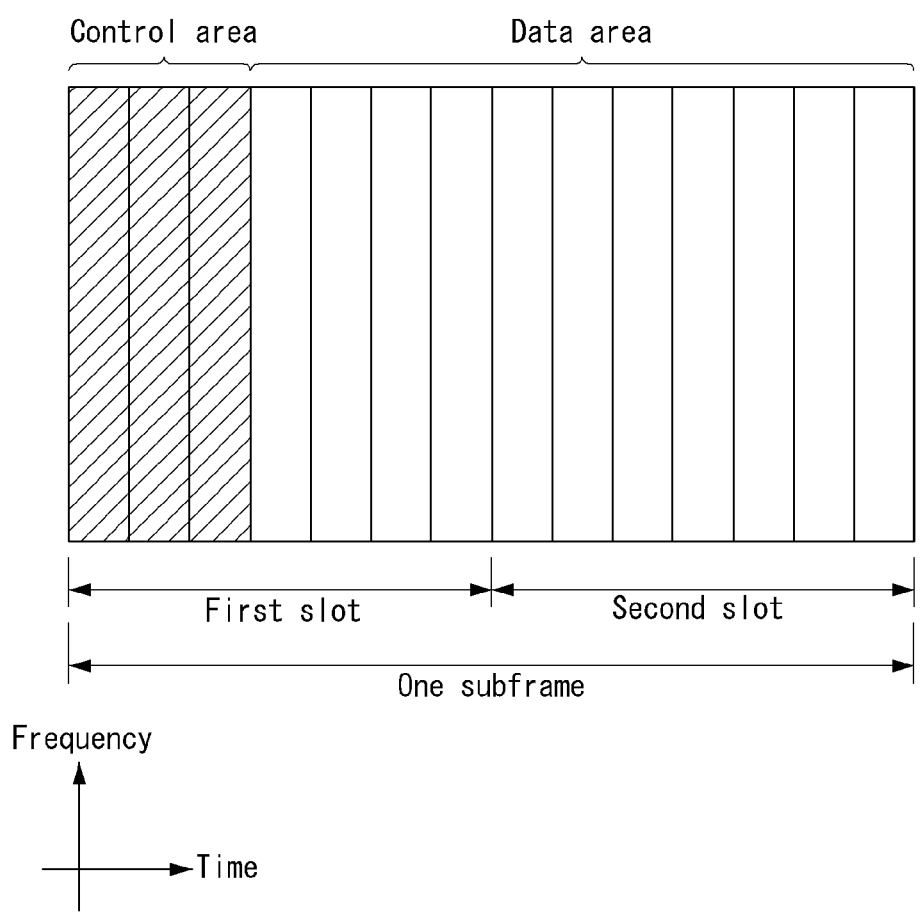

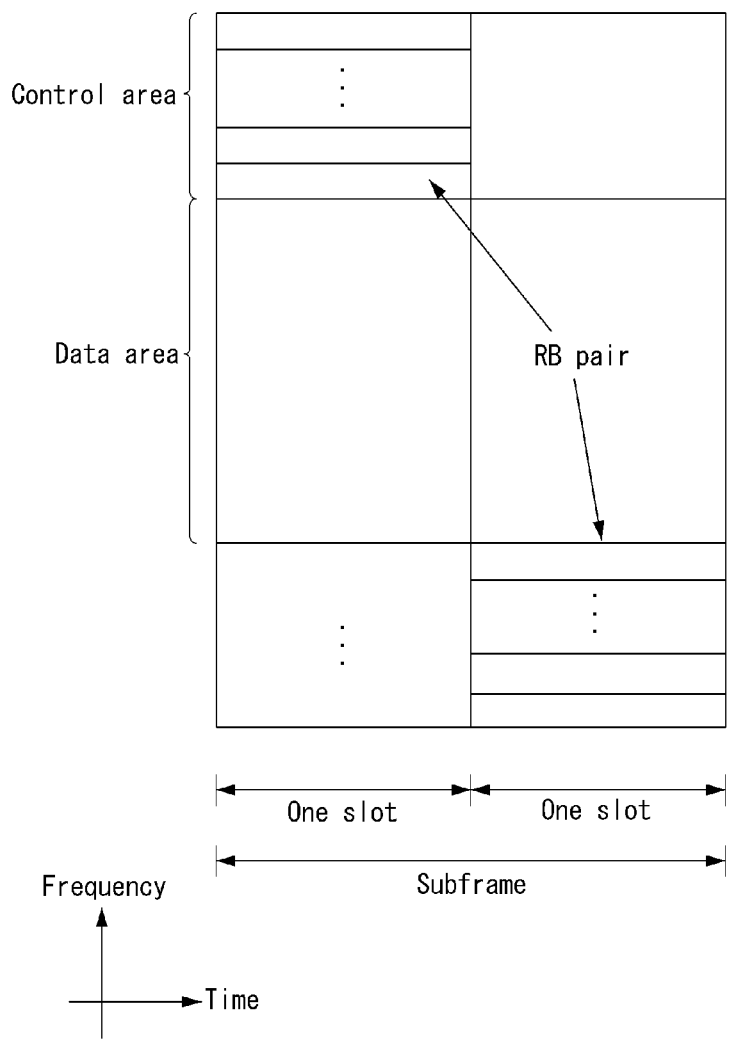
[FIG. 11]

【FIG. 12】
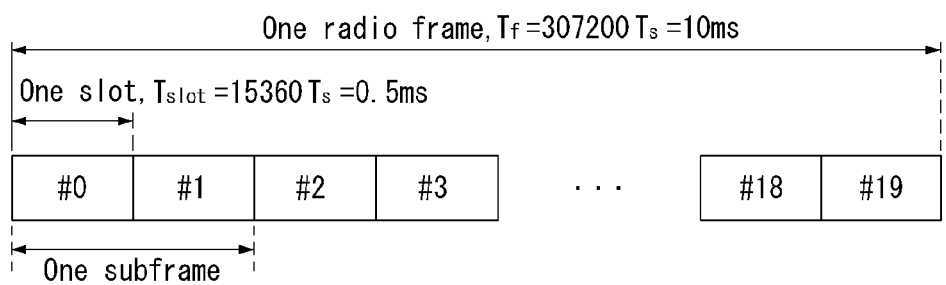

[FIG. 13]
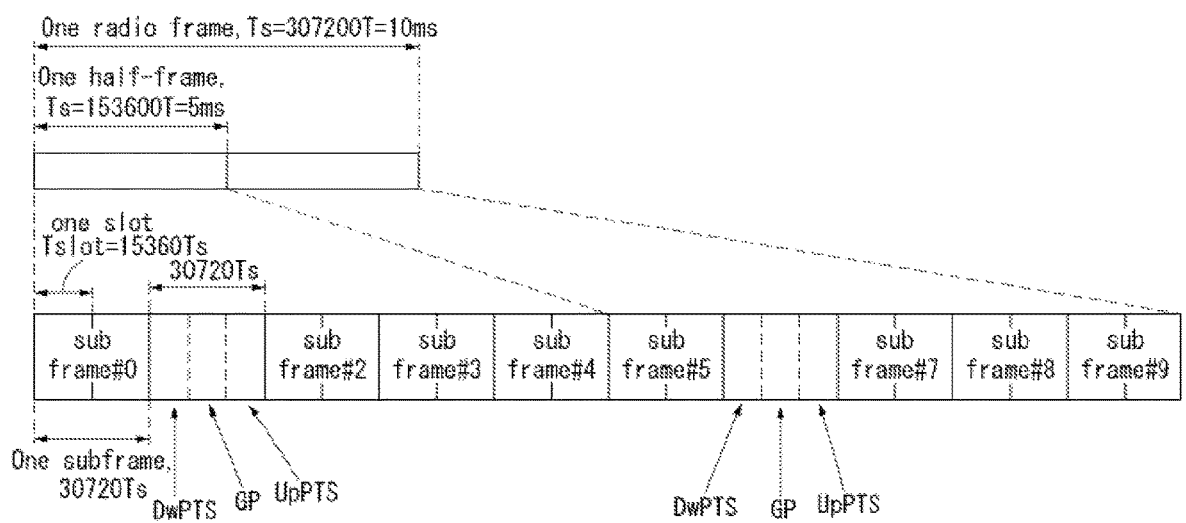

[FIG. 14]
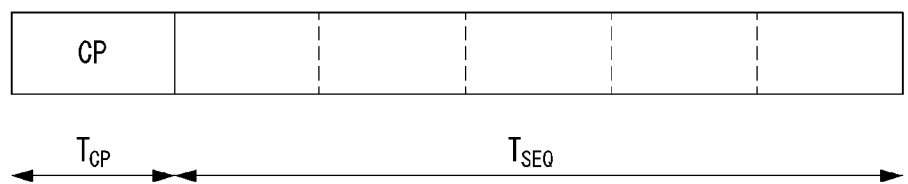

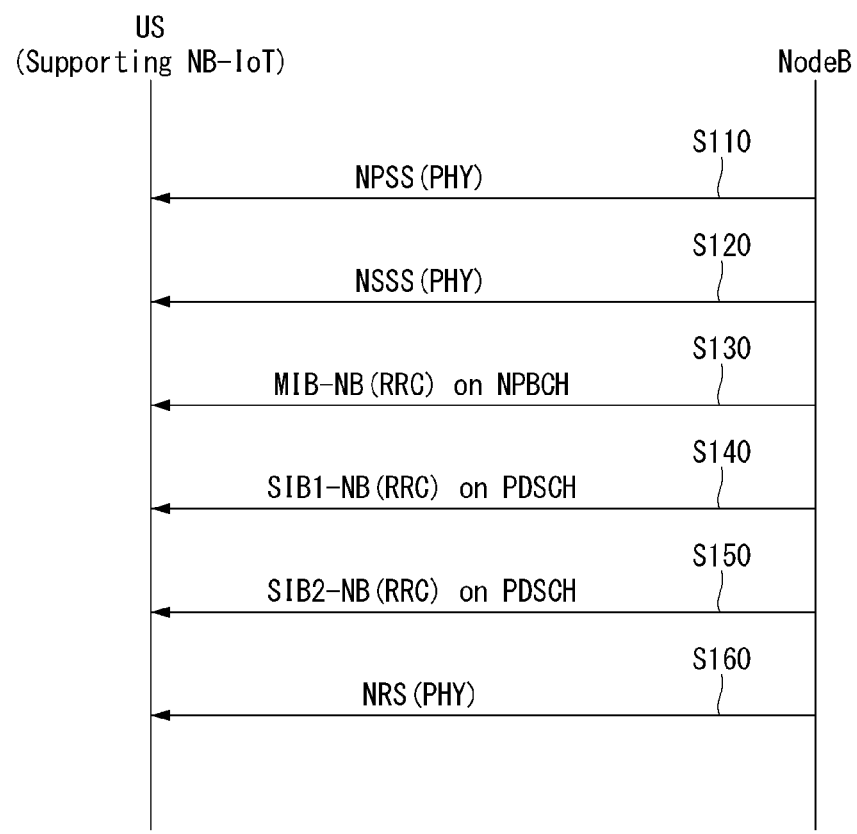
[FIG. 15]

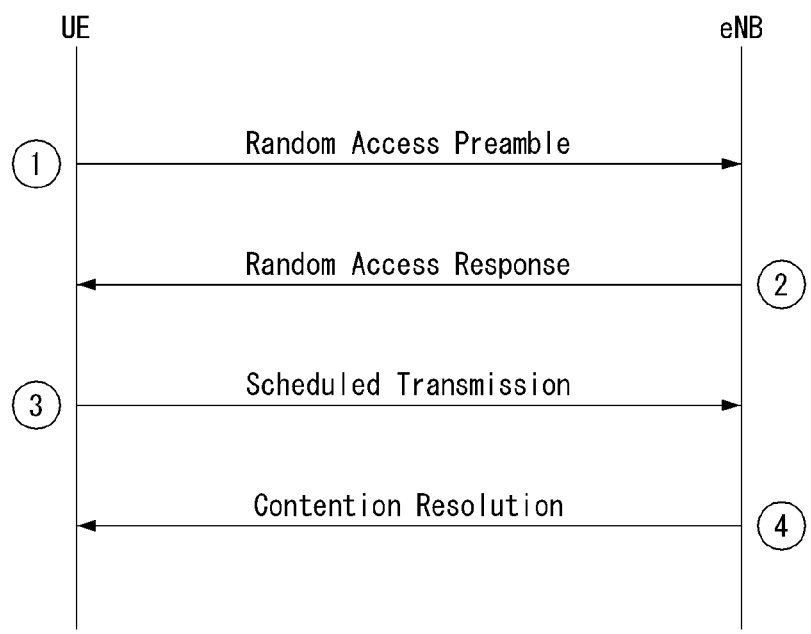
[FIG. 16]

[FIG. 17]
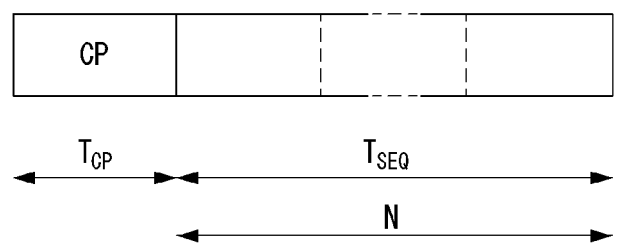

[FIG. 18]
(a) 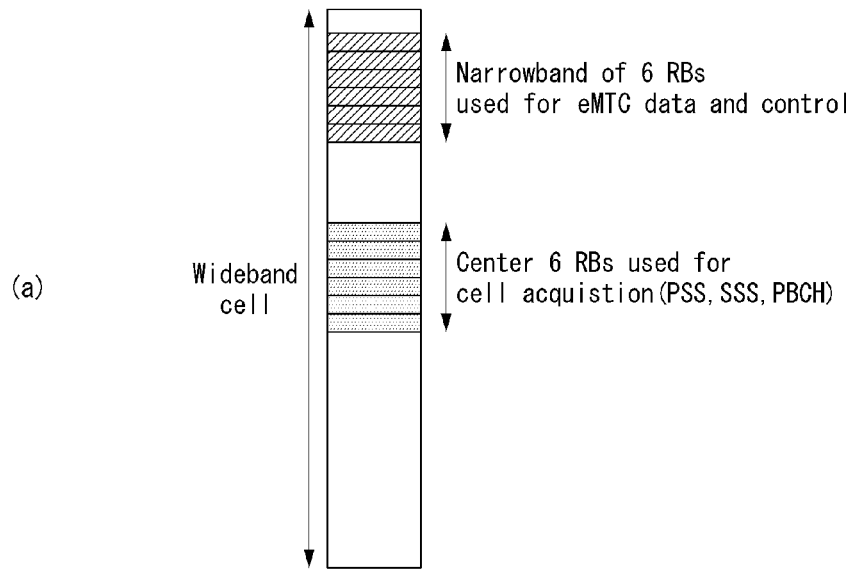
(b) 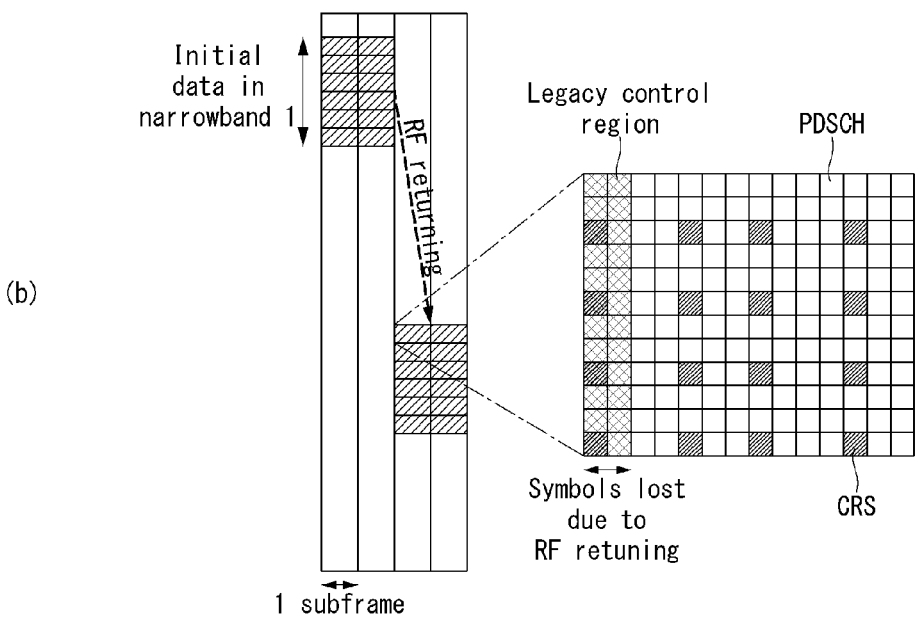

[FIG. 19]
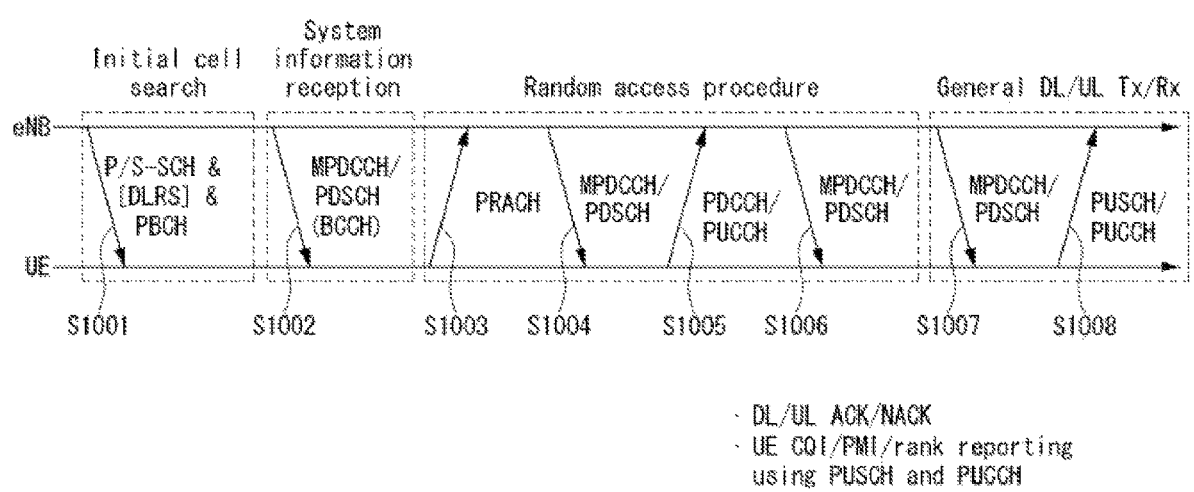

[FIG. 20]
(a)
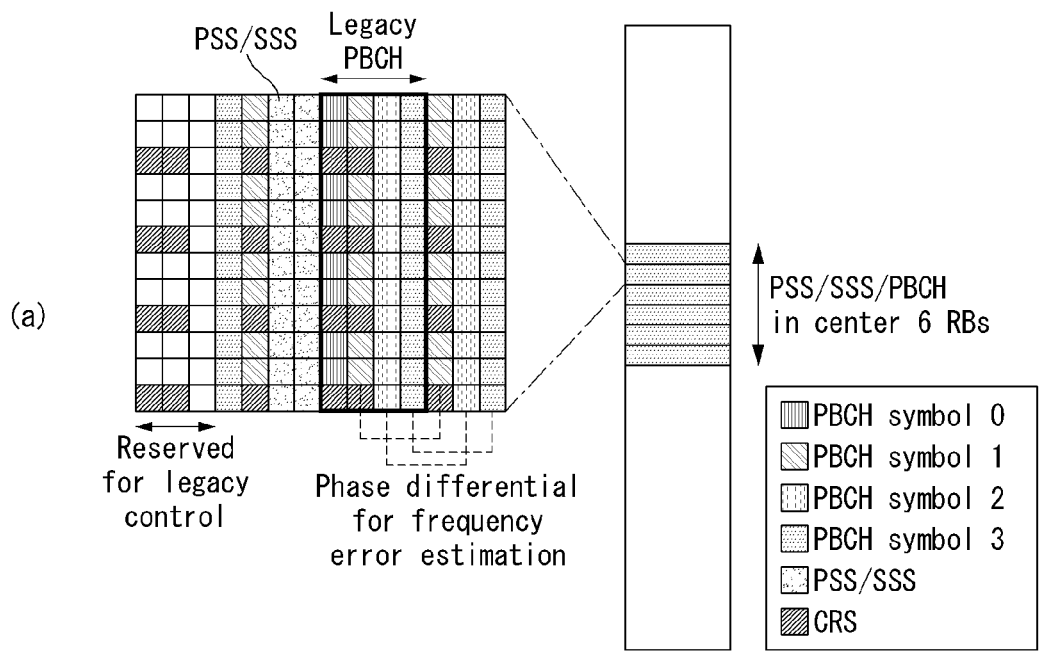
(b) SIB1-BR
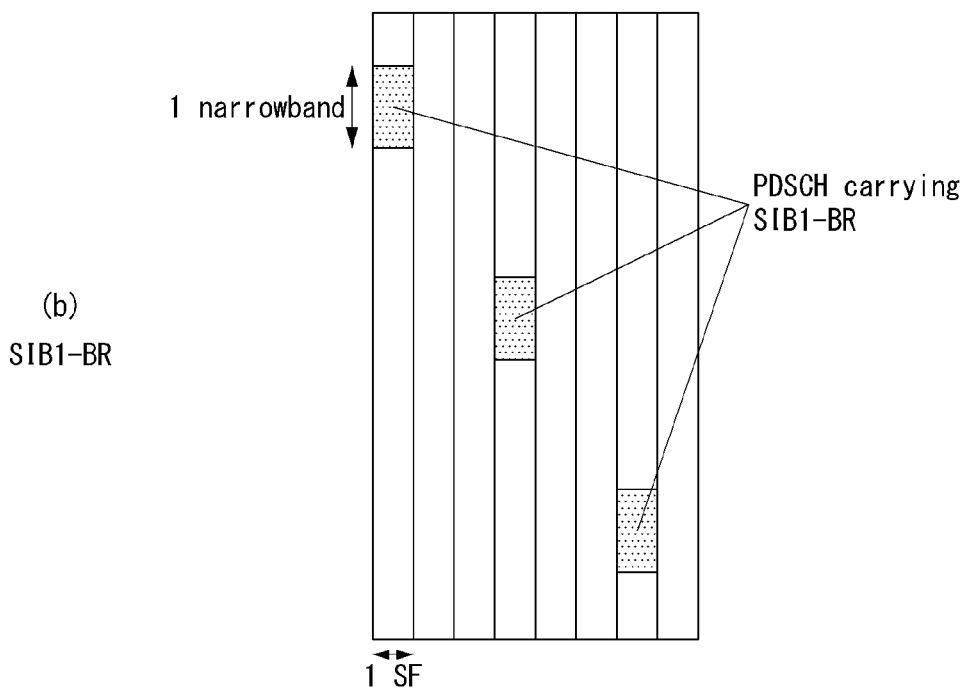

[FIG. 21]
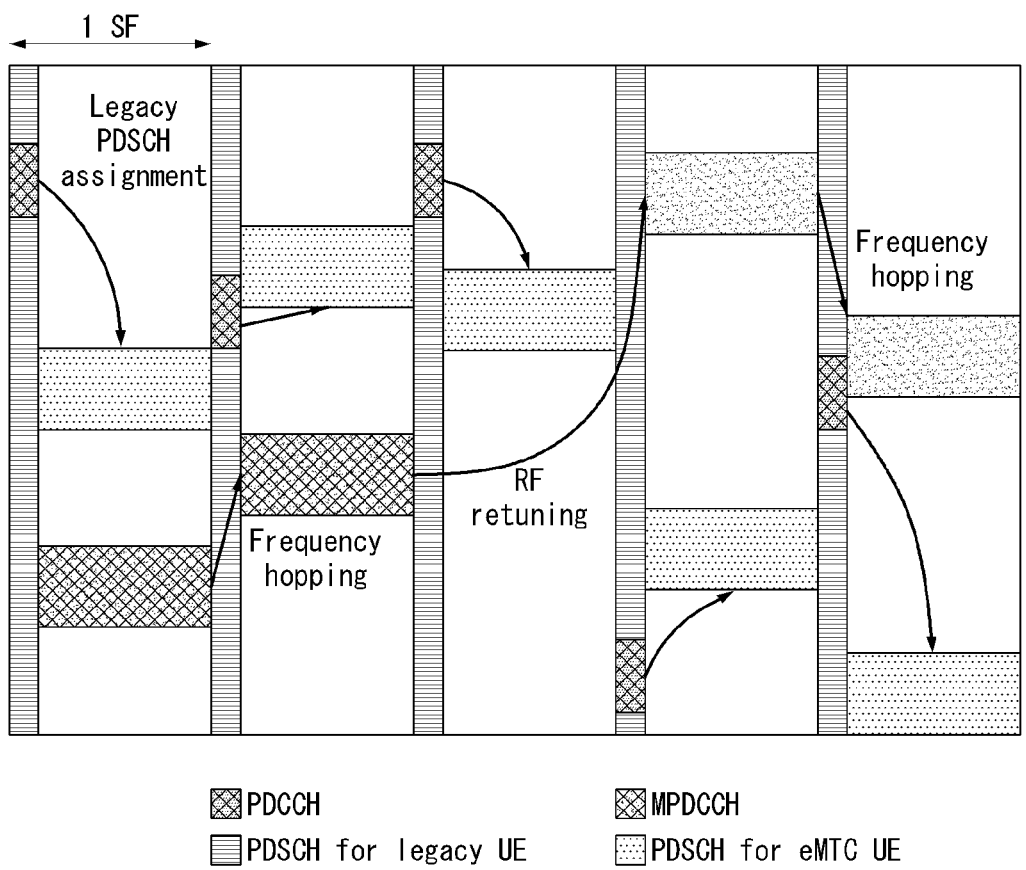

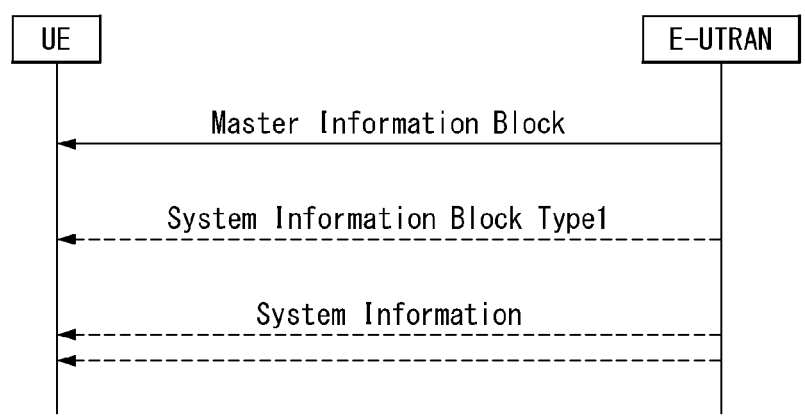
[FIG. 22]

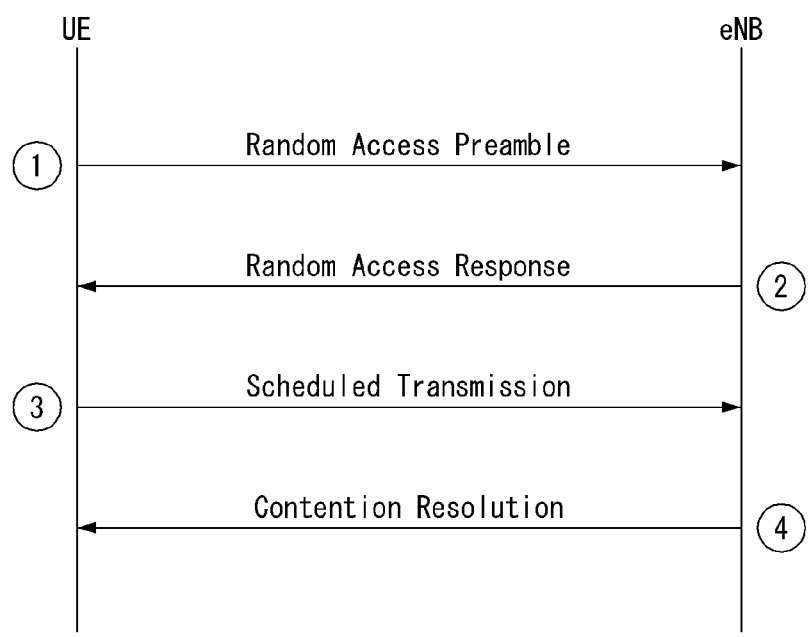
[FIG. 23]

[FIG. 24]
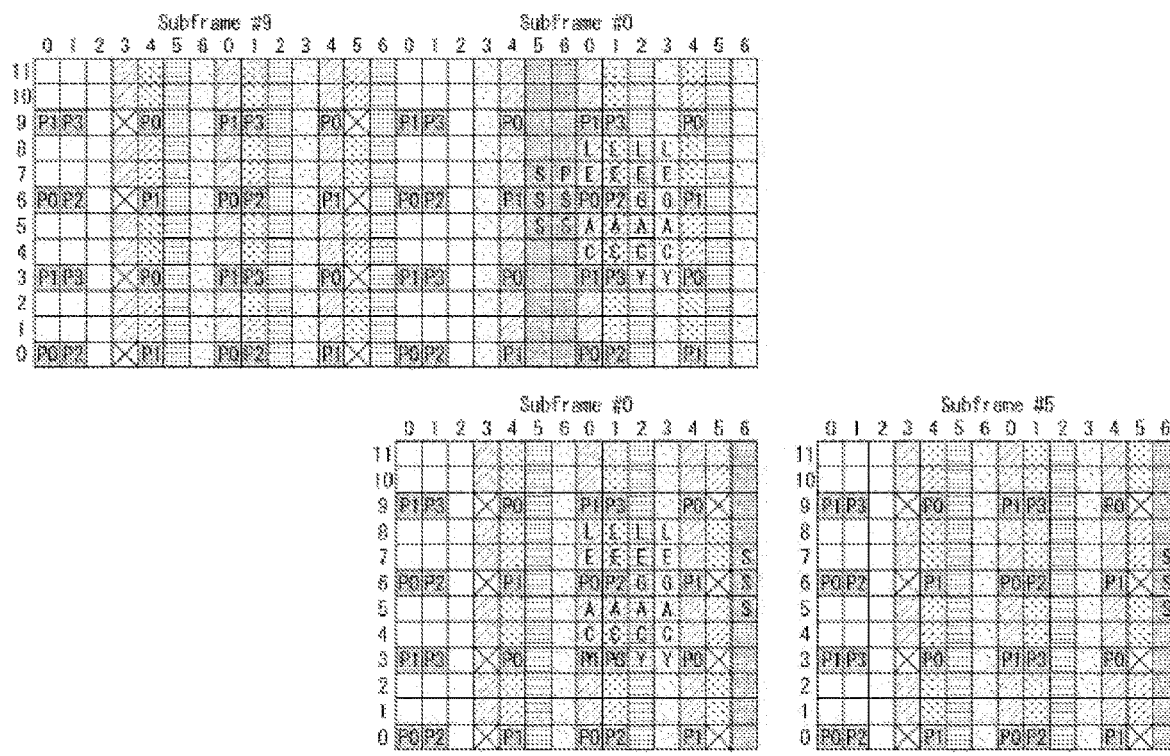

[FIG. 25]
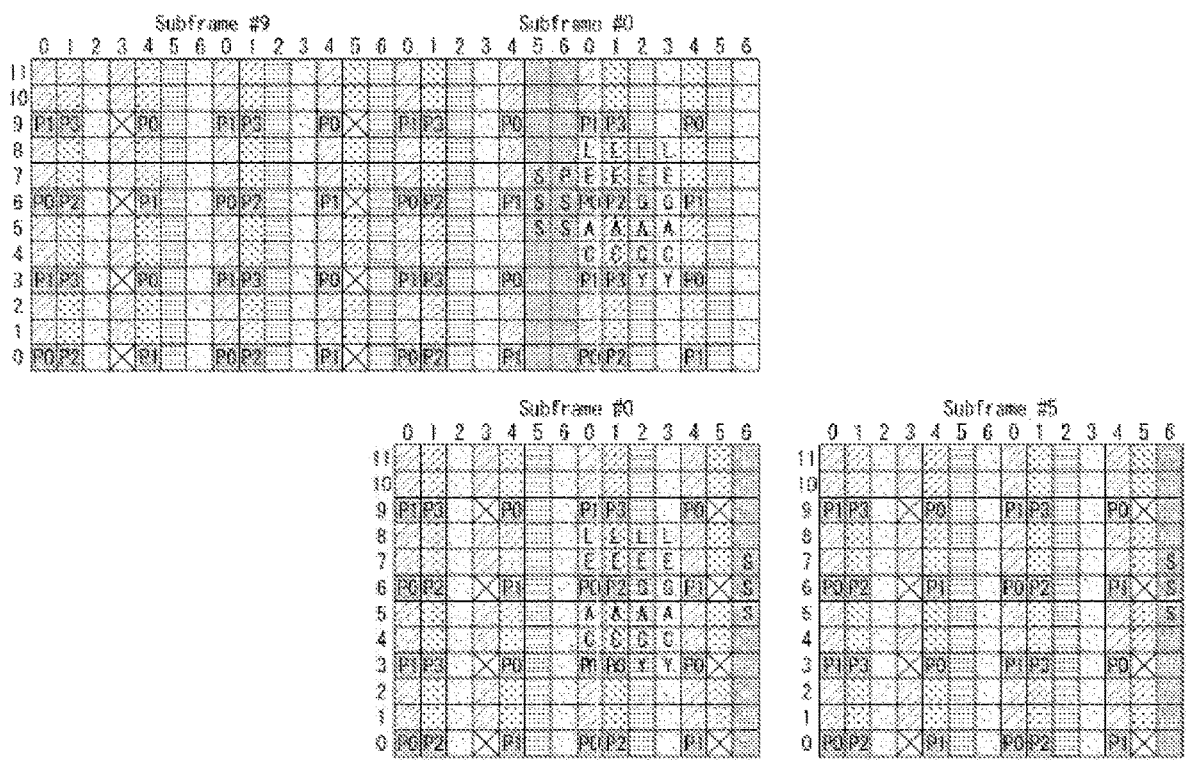

[FIG. 26]

[FIG. 27]
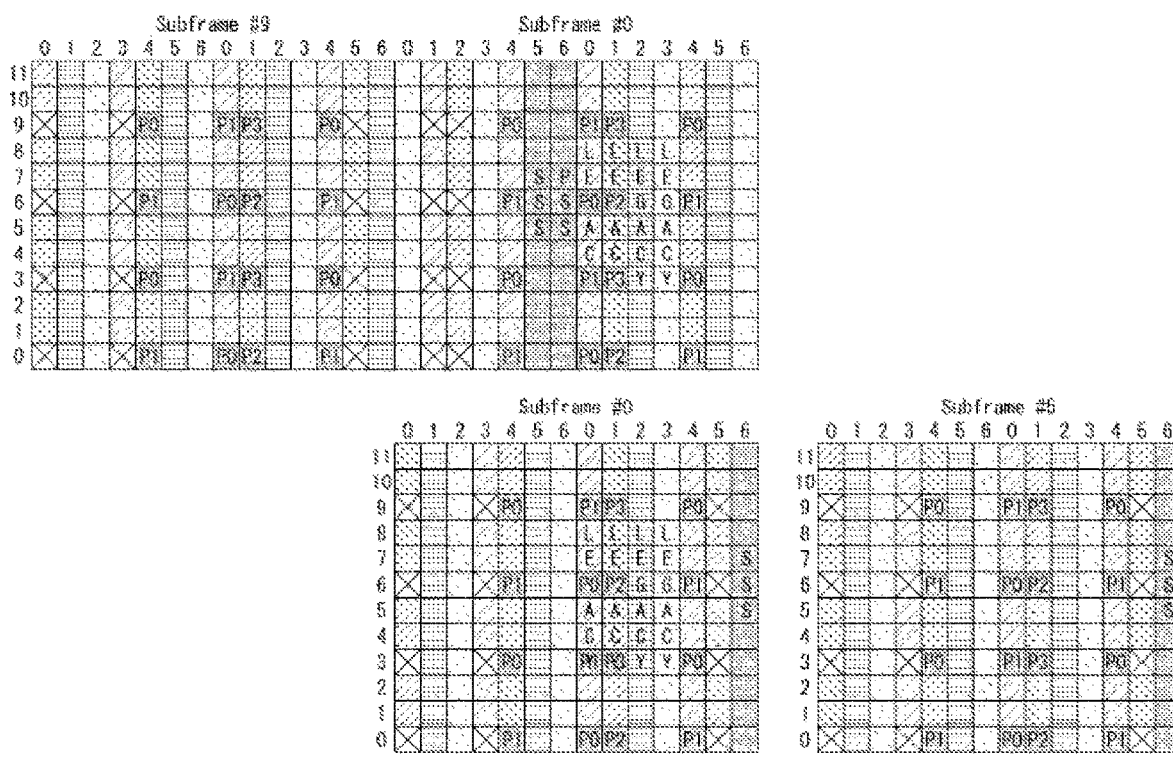

[FIG. 28]
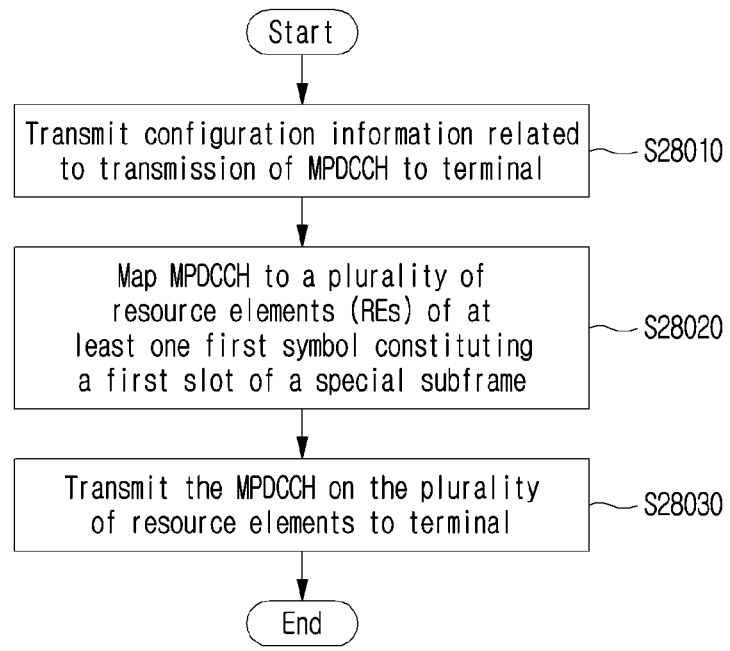

[FIG. 29]
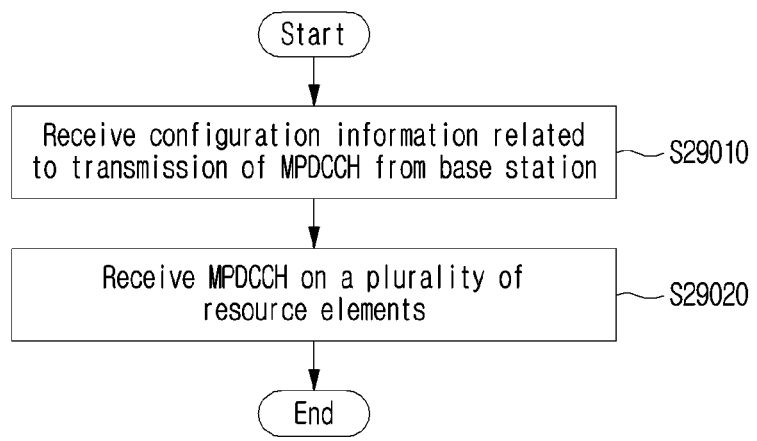

METHOD FOR TRANSMITTING/RECEIVING A MACHINE TYPE COMMUNICATION PHYSICAL DOWNLINK CONTROL CHANNEL This application is the National Stage filing under 35 U.S.C. 371 of International Application No. PCT/KR2019/010151, filed on Aug. 9, 2019, which claims the benefit of U.S. Provisional Application No. 62/716,984, filed on Aug. 9, 2018, U.S. Provisional Application No. 62/720,092, filed on Aug. 20, 2018, KR Application No. 10-2018-0113323, filed on Sep. 20, 2018, KR Application No. 10-2018-0120122, filed on Oct. 9, 2018, U.S. Provisional Application No. 62/755,370, filed on Nov. 2, 2018, KR Application No. 10-2019-0018221, filed on Feb. 15, 2019, KR Application No. 10-2019-0036410, filed on Mar. 28, 2019, the contents of which are all hereby incorporated by reference herein in their entirety.

TECHNICAL FIELD

The present disclosure relates to a wireless communication system, and more particularly, to a method for transmitting/receiving control information for supporting standalone operation of LTE-MTC (Machine Type Communication), and an apparatus supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

The present disclosure proposes a method for transmitting and receiving control information in a wireless communication system supporting Machine-Type Communication (MTC).

In addition, an object of the present disclosure is to provide a performance improvement of standalone MTC (sMTC) by making a mapping pattern of an MPDCCH of a special subframe composed of a certain number or less of symbols identical to the mapping pattern of symbols of other contiguous slots.

The technical objects to attain in the present disclosure are not limited to the above-described technical objects and other technical objects which are not described herein will become apparent to those skilled in the art from the following description.

Technical Solution

In the present disclosure, a method of transmitting an MTC Physical Downlink Control Channel (MPDCCH), by a base station, in a wireless communication system supporting Machine Type Communication (MTC), includes transmitting, to a terminal, configuration information related to transmission of an MPDCCH; mapping the MPDCCH to a plurality of resource elements (REs) of at least one first symbol constituting a first slot of a special subframe, wherein the special subframe is a subframe in which a number of symbols for data transmission among symbols constituting a subframe is less than a certain number; and transmitting, to the terminal, the MPDCCH on the plurality of resource elements, wherein the mapping is performed by copying at least one second symbol of a second slot contiguous to the first slot to the at least one first symbol and transmitting the MPDCCH on the REs to a terminal, where the mapping of the MPDCCH includes a step of copying REs used for the MPDCCH in at least one symbol of a second slot of a subframe to at least one symbol of a first slot of the subframe.

In addition, in the present disclosure, the MPDCCH is mapped to the plurality of REs through an identical mapping pattern in the at least one first symbol and the at least one second symbol.

In addition, in the present disclosure, a cell-specific reference signal is mapped to an identical RE in the at least one first symbol and the at least one second symbol.

In addition, in the present disclosure, the mapping is performed based on a start symbol of the at least one first symbol and a start symbol of the at least one second symbol.

In addition, in the present disclosure, the first slot is composed of a control region in which control information is transmitted and a data region in which the MPDCCH and/or a Physical Downlink Shared Channel (PDSCH) is transmitted.

In addition, in the present disclosure, a CRS for the MTC is mapped to at least one RE of the control region.

In addition, in the present disclosure, rate matching is performed in the data region in preference to the control region.

In addition, in the present disclosure, a channel estimation of the MPDCCH is performed using a channel estimation result of at least one other subframe contiguous to the special subframe.

In addition, the present disclosure provides a base station includes a transmitter for transmitting a radio signal; a receiver for receiving a radio signal; at least one processor; and at least one computer memory operably connectable to the at least one processor and storing instructions that, when executed by the at least one processor, perform operations, the operation comprising: transmitting, to a terminal, configuration information related to transmission of an MPDCCH; mapping the MPDCCH to a plurality of resource elements (REs) of at least one first symbol constituting a first slot of a special subframe,
  wherein the special subframe is a subframe in which a
    number of symbols for data transmission among symbols constituting a subframe is less than a certain
    number; and transmitting, to the terminal, the
    MPDCCH on the plurality of resource elements,
    wherein the mapping is performed by copying at least
    one second symbol of a second slot contiguous to the
    first slot to the at least one first symbol.

In addition, the present disclosure provides a method includes receiving, from a base station, configuration information related to transmission of an MPDCCH; and receiving, from the base station, the MPDCCH on the plurality of resource elements, wherein the MPDCCH is mapped to a plurality of resource elements (REs) of at least one first symbol constituting a first slot of a special subframe, wherein the special subframe is a subframe in which a number of symbols for data transmission among symbols constituting a subframe is less than a certain number; and wherein at least one second symbol of a second slot contiguous to the first slot is copied to the at least one first symbol.

Technical Effects

The present disclosure, in addition, the present disclosure has an effect of improving performance of standalone MTC (sMTC) by making a mapping pattern of an MPDCCH of a special subframe composed of a certain number or less of symbols identical to the mapping pattern of symbols of other contiguous slots.

The technical effects of the present disclosure are not limited to the technical effects described above, and other technical effects not mentioned herein may be understood to those skilled in the art from the description below.

DESCRIPTION OF DRAWINGS

The accompanying drawings, which are included herein as a part of the description for help understanding the present disclosure, provide embodiments of the present disclosure, and describe the technical features of the present disclosure with the description below.

FIG. 1 is a diagram illustrating an example of a 5G scenario to which the present disclosure can be applied.

FIG. 2 illustrates an AI device 100 according to an embodiment of the present disclosure.

FIG. 3 illustrates an AI server 200 according to an embodiment of the present disclosure.

FIG. 4 illustrates an AI system 1 according to an embodiment of the present disclosure.

FIG. 5 illustrates a communication system 1 to which the present disclosure is applied.

FIG. 6 illustrates a wireless communication device according to some embodiments of the present disclosure.

FIG. 7 is another example of a block diagram of a radio communication device according to some embodiments of the present disclosure.

FIG. 8 is a diagram illustrating an example of the structure of a radio frame of LTE.

FIG. 9 is a diagram illustrating an example of a resource grid for downlink slot.

FIG. 10 illustrates an example of the structure of downlink subframe.

FIG. 11 illustrates an example of the structure of uplink subframe.

FIG. 12 illustrates an example of the frame structure type 1.

FIG. 13 is a diagram illustrating another example of the frame structure type 2.

FIG. 14 illustrates an example of the random access symbol group.

FIG. 15 is an example of an initial access procedure of NB-IoT.

FIG. 16 is an example of an NB-IoT random access procedure.

FIG. 17 illustrates the structure of a random access symbol group.

FIG. 18(*a*) is a diagram illustrating an example of a narrowband operation, and FIG. 18(*b*) is a diagram illustrating an example of repetition with RF retuning.

FIG. 19 is a diagram illustrating physical channels that can be used for MTC and a general signal transmission method using them.

FIG. 20(*a*) illustrates an example of a frequency error estimation method for a repetition pattern for subframe #0, a general CP, and repeated symbols in FDD, and FIG. 20(*b*) illustrates an example of transmission of SIB-BR over a broadband LTE channel.

FIG. 21 is a diagram illustrating an example of scheduling for each of the MTC and legacy LTE.

FIG. 22 illustrates a normal system information acquisition procedure.

FIG. 23 illustrates a contention-based random access procedure.

FIG. 24 is a diagram to which 4 PBCH repetitions are applied in eMTC.

FIG. 25 illustrates an example of a method of extending a PBCH to an LTE control region for an sMTC UE proposed in the present disclosure.

Figure 26:
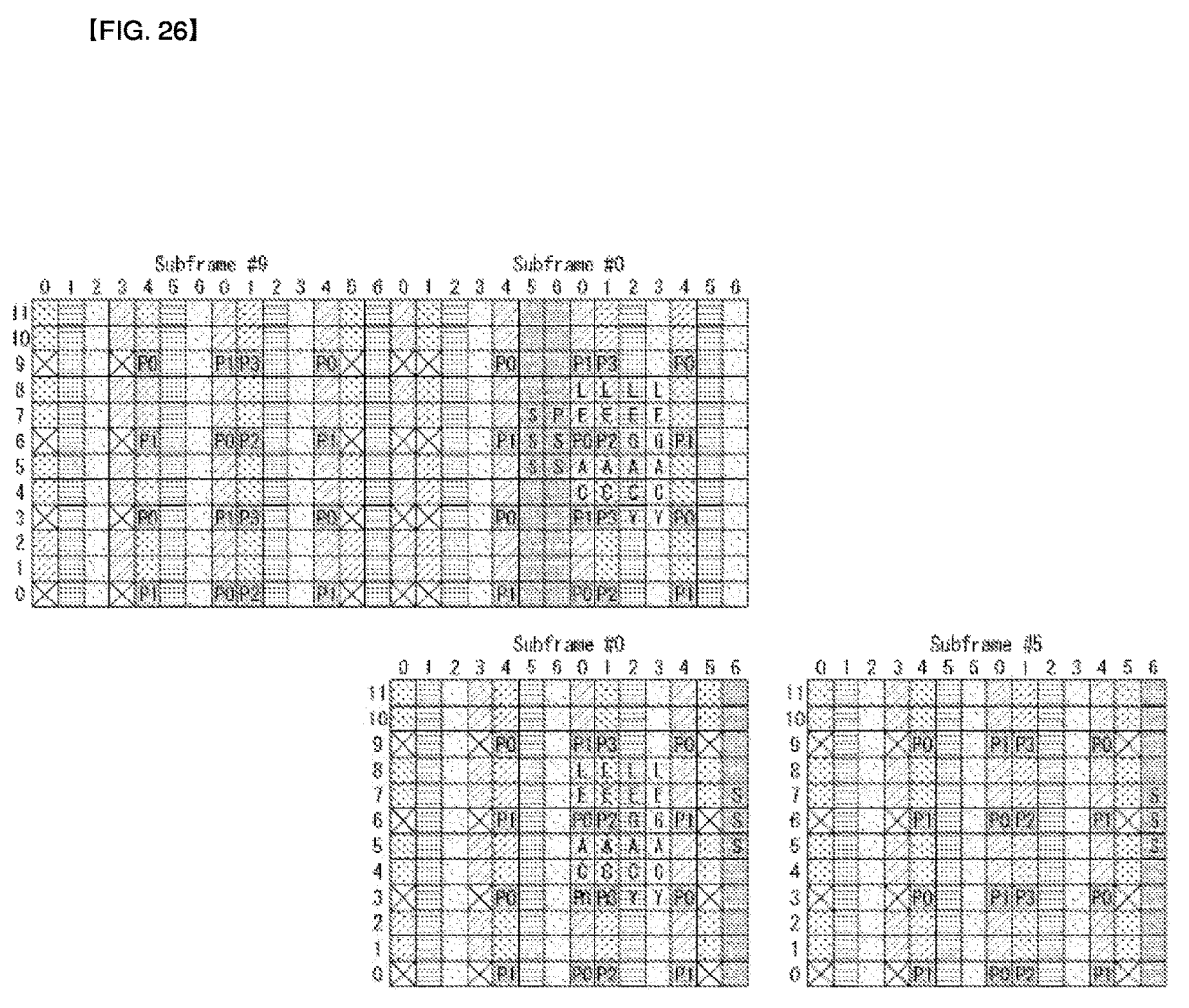

FIG. 26 illustrates another example of a method of extending a PBCH to an LTE control region for an sMTC UE proposed in the present disclosure.

FIG. 27 illustrates another example of a method of extending a PBCH to an LTE control region for an sMTC UE proposed in the present disclosure.

FIG. 28 is a flowchart illustrating an example of an MPDCCH transmission method of a base station proposed in the present disclosure.

FIG. 29 is a flowchart illustrating an example of a method for receiving an MPDCCH of a base station proposed in the present disclosure.

BEST MODE FOR INVENTION

Some embodiments of the present disclosure are described in detail with reference to the accompanying drawings. A detailed description to be disclosed along with the accompanying drawings are intended to describe some exemplary embodiments of the present disclosure and are not intended to describe a sole embodiment of the present disclosure. The following detailed description includes more details in order to provide full understanding of the present disclosure. However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present disclosure, and the use of such specific terms may be changed in various forms without departing from the technical sprit of the present disclosure.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

<5G Scenario>

FIG. 1 is a diagram illustrating an example of a 5G scenario to which the present disclosure can be applied.

The three main requirements areas of 5G include (1) Enhanced Mobile Broadband (eMBB) area, (2) Massive Machine Type Communication (mMTC) area, and (3) Ultra-reliable and Low Latency Communications (URLLC) area.

In some use cases, multiple areas may be required for optimization, and other use cases may be focused on only one key performance indicator (KPI). 5G supports these various use cases in a flexible and reliable way.

eMBB goes far beyond basic mobile Internet access, covering rich interactive work, media and entertainment applications in the cloud or augmented reality. Data is one of the key drivers of 5G, and it may not be possible to see dedicated voice services for the first time in the 5G era. In 5G, voice is expected to be processed as an application program simply using the data connection provided by the communication system. The main reasons for the increased traffic volume are the increase in content size and the increase in the number of applications requiring high data rates. Streaming services (audio and video), interactive video and mobile Internet connections will become more widely used as more devices connect to the Internet. Many of these applications require always-on connectivity to push real-time information and notifications to the user. Cloud storage and applications are rapidly increasing in mobile communication platforms, which can be applied to both work and entertainment. And, cloud storage is a special use case that drives the growth of the uplink data rate. 5G is also used for remote work in the cloud and requires much lower end-to-end latency to maintain a good user experience when tactile interfaces are used. Entertainment, for example, cloud gaming and video streaming is another key factor that is increasing the demand for mobile broadband capabilities. Entertainment is essential on smartphones and tablets anywhere, including high mobility environments such as trains, cars and airplanes. Another use case is augmented reality and information retrieval for entertainment. Here, augmented reality requires very low latency and an instantaneous amount of data.

In addition, one of the most anticipated 5G use cases concerns the ability to seamlessly connect embedded sensors in all fields, i.e. mMTC. By 2020, potential IoT devices are expected to reach 20.4 billion. Industrial IoT is one of the areas where 5G plays a major role in enabling smart cities, asset tracking, smart utilities, agriculture and security infrastructure.

URLLC includes new services that will transform the industry with ultra-reliable/low-latency links such as self-driving vehicles and remote control of critical infrastructure. The level of reliability and delay is essential for smart grid control, industrial automation, robotics, drone control and coordination.

Next, look at a number of examples in more detail.

5G can complement fiber-to-the-home (FTTH) and cable-based broadband (or DOCSIS) as a means of providing streams rated at hundreds of megabits per second to gigabits per second. These high speeds are required to deliver TVs in 4K or higher (6K, 8K and higher) resolutions as well as virtual and augmented reality. Virtual Reality (VR) and Augmented Reality (AR) applications involve almost immersive sports events. Certain application programs may require special network settings. For example, for VR games, game companies may need to integrate the core server with the network operator's edge network server to minimize latency.

Automotive is expected to be an important new driving force in 5G, with many use cases for mobile communication to vehicles. For example, entertainment for passengers demands simultaneous high capacity and high mobility mobile broadband. The reason is that future users will continue to expect high-quality connections, regardless of their location and speed. Another application example in the automotive field is an augmented reality dashboard. It identifies an object in the dark on top of what the driver sees through the front window and displays information that tells the driver about the distance and movement of the object. In the future, wireless modules enable communication between vehicles, exchange of information between the vehicle and supporting infrastructure, and exchange of information between the vehicle and other connected devices (e.g., devices carried by pedestrians). The safety system can lower the risk of an accident by guiding the driver through alternative courses of action to make driving safer. The next step will be a remote controlled or self-driven vehicle. It is very reliable and requires very fast communication between different self-driving vehicles and between the vehicle and the infrastructure. In the future, self-driving vehicles will perform all driving activities, and drivers will be forced to focus only on traffic anomalies that the vehicle itself cannot identify. The technical requirements of self-driving vehicles call for ultra-low latency and ultra-fast reliability to increase traffic safety to levels unachievable by humans.

Smart cities and smart homes, referred to as smart society, will be embedded with high-density wireless sensor networks. A distributed network of intelligent sensors will identify the conditions for cost and energy-efficient maintenance of a city or home. A similar setup can be done for each household. Temperature sensors, window and heating controllers, burglar alarms and appliances are all wirelessly connected. Many of these sensors are typically low data rates, low power and low cost. However, for example, real-time HD video may be required in certain types of devices for surveillance.

The consumption and distribution of energy including heat or gas is highly decentralized, requiring automated control of distributed sensor networks. The smart grid interconnects these sensors using digital information and communication technologies to gather information and act accordingly. This information can include the behavior of suppliers and consumers, allowing smart grids to improve efficiency, reliability, economics, sustainability of production and the distribution of fuels such as electricity in an automated manner. The smart grid can also be viewed as another low-latency sensor network.

The health sector has many applications that can benefit from mobile communications. The communication system can support telemedicine providing clinical care from remote locations. This can help reduce barriers to distance and improve access to medical services that are not consistently available in remote rural areas. It is also used to save lives in critical care and emergencies. A wireless sensor network based on mobile communication may provide sensors and remote monitoring of parameters such as heart rate and blood pressure.

Wireless and mobile communications are becoming increasingly important in industrial applications. Wiring is expensive to install and maintain. Thus, the possibility of replacing cables with reconfigurable wireless links is an attractive opportunity for many industries. However, achieving this requires that the wireless connection operates with a delay, reliability and capacity similar to that of the cable, and its management is simplified. Low latency and very low error probability are new requirements that need to be connected to 5G.

Logistics and freight tracking are important examples of use for mobile communications that enable tracking of inventory and packages from anywhere using location-based information systems. Logistics and freight tracking use cases typically require low data rates, but require a wide range and reliable location information.

<Artificial Intelligence (AI)>

Artificial intelligence refers to the field of researching artificial intelligence or the methodology to create it, and machine learning refers to the field of researching methodologies to define and solve various problems dealt with in the field of artificial intelligence. do. Machine learning is also defined as an algorithm that improves the performance of a task through continuous experience.

An Artificial neural network (ANN) is a model used in machine learning, and may refer to an overall model with problem-solving ability, which is composed of artificial neurons (nodes) that form a network by combining synapses. The artificial neural network may be defined by a connection pattern between neurons of different layers, a learning process for updating model parameters, and an activation function for generating an output value.

The artificial neural network may include input layer, output layer, and optionally one or more hidden layers. Each layer includes one or more neurons, and the artificial neural network may include neurons and synapses connecting neurons. In an artificial neural network, each neuron can output a function value of an activation function for input signals, weights, and biases input through synapses.

Model parameters refer to parameters that are determined through learning, and include weights of synaptic connections and biases of neurons. In addition, the hyperparameter refers to a parameter that must be set before learning in a machine learning algorithm, and includes a learning rate, iteration count, mini-batch size, and initialization function.

The purpose of learning artificial neural networks can be as determining model parameters that minimize the loss function. The loss function can be used as an index for determining an optimal model parameter in the learning process of the artificial neural network.

Machine learning can be classified into supervised learning, unsupervised learning, and reinforcement learning according to the learning method.

Supervised learning refers to a method of training an artificial neural network when a label for training data is given, and a label may mean the correct answer (or result value) that the artificial neural network must infer when training data is input to the artificial neural network. Unsupervised learning may mean a method of training an artificial neural network in a state where a label for training data is not given. Reinforcement learning may mean a learning method in which an agent defined in a certain environment learns to select an action or action sequence that maximizes the cumulative reward in each state.

Among artificial neural networks, machine learning implemented as a deep neural network (DNN) including a plurality of Hidden Layers is sometimes referred to as deep learning, and deep learning is a part of machine learning. Hereinafter, machine learning is used in the sense including deep learning.

<Robot>

A robot may refer to a machine that automatically processes or operates a task given by its own capabilities. In particular, a robot having a function of recognizing the environment and performing an operation by self-determining may be referred to as an intelligent robot.

Robots can be classified into industrial, medical, household, military, etc. depending on the purpose or field of use.

The robot may be provided with a driving unit including an actuator or a motor to perform various physical operations such as moving a robot joint. In addition, the movable robot includes a wheel, a brake, a propeller, and the like in a driving unit, and can travel on the ground or fly in the air through the driving unit.

<Self-Driving, Autonomous-Driving>

Autonomous driving refers to self-driving technology, and autonomous driving vehicle refers to a vehicle that is driven without a user's manipulation or with a user's minimal manipulation.

For example, in autonomous driving, a technology that maintains a driving lane, a technology that automatically adjusts the speed such as adaptive cruise control, a technology that automatically drives along a specified route, and a technology that automatically sets a route when a destination is set, etc. All of these can be included.

The vehicle includes all vehicles including only an internal combustion engine, a hybrid vehicle including an internal combustion engine and an electric motor, and an electric vehicle including only an electric motor, and may include not only automobiles, but also trains and motorcycles.

In this case, the autonomous vehicle can be viewed as a robot having an autonomous driving function.

<Extended Reality (XR)>

The extended reality collectively refers to virtual reality (VR), augmented reality (AR), and mixed reality (MR). VR technology provides only CG images of real world objects or backgrounds, AR technology provides virtually created CG images on top of real object images, and MR technology is a computer graphic technology that mixes and combines virtual objects in the real world.

MR technology is similar to AR technology in that it shows real and virtual objects together. However, in AR technology, virtual objects are used in a form that complements real objects, whereas in MR technology, virtual objects and real objects are used with equal characteristics.

XR technology can be applied to HMD (Head-Mount Display), HUD (Head-Up Display), mobile phones, tablet PCs, laptops, desktops, TVs, digital signage, etc., and devices applied with XR technology may be called as XR devices.

FIG. 2 illustrates an AI device 100 according to an embodiment of the present disclosure.

The AI device 100 may be implemented as a fixed device or a movable device such as a TV, a projector, a mobile phone, a smartphone, a desktop computer, a laptop computer, a digital broadcasting terminal, a personal digital assistants (PDA), a portable multimedia player (PMP), a navigation, a tablet PC, a wearable device, a set-top box (STB), a DMB receiver, a radio, a washing machine, a refrigerator, a desktop computer, a digital signage, a robot, a vehicle, and the like.

Referring to FIG. 2, the terminal 100 may include a communication unit 110, an input unit 120, a learning processor 130, a sensing unit 140, an output unit 150, a memory 170, and a processor 180.

The communication unit 110 may transmit and receive data with external devices such as other AI devices 100a to 100e or the AI server 200 using wired/wireless communication technology. For example, the communication unit 110 may transmit and receive sensor information, a user input, a learning model, and a control signal with external devices.

Here, the communication technologies used by the communication unit 110 include Global System for Mobile communication (GSM), Code Division Multi Access (CDMA), Long Term Evolution (LTE), 5G, Wireless LAN (WLAN), and Wireless-Fidelity (Wi-Fi), Bluetooth™, Radio Frequency Identification (RFID), Infrared Data Association (IrDA), ZigBee, and Near Field Communication (NFC) and the like.

The input unit 120 may acquire various types of data.

Here, the input unit 120 may include a camera for inputting an image signal, a microphone for receiving an audio signal, and a user input unit for receiving information from a user. Here, by treating a camera or microphone as a sensor, a signal acquired from the camera or microphone may be referred to as sensing data or sensor information.

The input unit 120 may acquire input data to be used when acquiring an output by using training data for model training and the training model. The input unit 120 may obtain unprocessed input data, and in this case, the processor 180 or the learning processor 130 may extract an input feature as a pre-process for the input data.

The learning processor 130 may train a model composed of an artificial neural network using the training data. Here, the learned artificial neural network may be referred to as a learning model. The learning model can be used to infer a result value for new input data other than the training data, and the inferred value can be used as a basis for a decision to perform a certain operation.

In this case, the learning processor 130 may perform AI processing together with the learning processor 240 of the AI server 200.

Here, the learning processor 130 may include a memory integrated or implemented in the AI device 100. Alternatively, the learning processor 130 may be implemented using the memory 170, an external memory directly coupled to the AI device 100, or a memory maintained in an external device.

The sensing unit 140 may acquire at least one of internal information of the AI device 100, information on the surrounding environment of the AI device 100, and user information by using various sensors.

Here, the sensors included in the sensing unit 140 include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and a lidar, a radar, etc.

The output unit 150 may generate output related to visual, auditory or tactile sense.

Here, the output unit 150 may include a display unit that outputs visual information, a speaker that outputs auditory information, and a haptic module that outputs tactile information.

The memory 170 may store data supporting various functions of the AI device 100. For example, the memory 170 may store input data, training data, a learning model, and a learning history acquired from the input unit 120.

The processor 180 may determine at least one executable operation of the AI device 100 based on information determined or generated using a data analysis algorithm or a machine learning algorithm. Further, the processor 180 may perform a determined operation by controlling the components of the AI device 100.

To this end, the processor 180 may request, search, receive, or utilize data from the learning processor 130 or the memory 170, and may control the components of the AI device 100 to perform a predicted or desirable operation among the at least one executable operation.

Here, if connection of an external device is required to perform the determined operation, the processor 180 may generate a control signal for controlling the corresponding external device and transmit the generated control signal to the corresponding external device.

The processor 180 may obtain intention information for a user input, and determine a user's requirement based on the obtained intention information.

Here, the processor 180 may obtain intention information corresponding to the user input by using at least one of a Speech To Text (STT) engine for converting a speech input into a character string or a Natural Language Processing (NLP) engine for obtaining intention information of a natural language.

Here, at least one or more of the STT engine and the NLP engine may be composed of an artificial neural network at least partially trained according to a machine learning algorithm. In addition, at least one of the STT engine or the NLP engine may be learned by the learning processor 130, learned by the learning processor 240 of the AI server 200, or learned by distributed processing thereof.

The processor 180 may collect history information including user feedback on the operation content or operation of the AI device 100, and store it in the memory 170 or the learning processor 130, or transfer to an external device such as the AI server 200. The collected historical information can be used to update the learning model.

The processor 180 may control at least some of the components of the AI device 100 to drive an application program stored in the memory 170. Further, the processor 180 may operate by combining two or more of the components included in the AI device 100 to drive the application program.

FIG. 3 illustrates an AI server 200 according to an embodiment of the present disclosure.

Referring to FIG. 3, the AI server 200 may refer to a device that trains an artificial neural network using a machine learning algorithm or uses the learned artificial neural network. Here, the AI server 200 may be composed of a plurality of servers to perform distributed processing, or may be defined as a 5G network. In this case, the AI server 200 may be included as a part of the AI device 100 to perform at least part of AI processing together.

The AI server 200 may include a communication unit 210, a memory 230, a learning processor 240, and a processor 260.

The communication unit 210 may transmit and receive data with an external device such as the AI device 100.

The memory 230 may include a model storage 231. The model storage 231 may store a model (or artificial neural network, 231a) being trained or trained through the learning processor 240.

The learning processor 240 may train the artificial neural network 231a using the training data. The learning model may be used while being mounted on the AI server 200 of an artificial neural network, or may be mounted on an external device such as the AI device 100 and used.

The learning model can be implemented in hardware, software, or a combination of hardware and software. When part or all of the learning model is implemented in software, one or more instructions constituting the learning model may be stored in the memory 230.

The processor 260 may infer a result value for new input data using the learning model, and generate a response or a control command based on the inferred result value.

FIG. 4 illustrates an AI system 1 according to an embodiment of the present disclosure.

Referring to FIG. 4, the AI system 1 includes at least one of an AI server 200, a robot 100a, a self-driving (autonomous) vehicle 100b, an XR device 100c, a smartphone 100d, or a home appliance 100e. connected with the cloud network 10. Here, the robot 100a to which the AI technology is applied, the self-driving vehicle 100b, the XR device 100c, the smart phone 100d, or the home appliance 100e may be referred to as the AI devices 100a to 100e.

The cloud network 10 may constitute a part of the cloud computing infrastructure or may mean a network that exists in the cloud computing infrastructure. Here, the cloud network 10 may be configured using a 3G network, a 4G or long term evolution (LTE) network, or a 5G network.

That is, the devices 100a to 100e and 200 constituting the AI system 1 may be connected to each other through the cloud network 10. In particular, the devices 100a to 100e and 200 may communicate with each other through a base station, but may communicate with each other directly without through a base station.

The AI server 200 may include a server that performs AI processing and a server that performs an operation on big data.

The AI server 200 is connected through the cloud network 10 with at least one of the robot 100a, the self-driving vehicle 100b, the XR device 100c, the smartphone 100d, or a home appliance 100e, which are AI devices constituting the AI system 1 and may help at least part of the AI processing of the connected AI devices 100a to 100e.

In this case, the AI server 200 may train an artificial neural network according to a machine learning algorithm in place of the AI devices 100a to 100e, and may directly store the learning model or transmit it to the AI devices 100a to 100e.

At this time, the AI server 200 may receive input data from the AI devices 100a to 100e, infer a result value for the received input data using a learning model, and generate a response or a control command based on the inferred result value, and transmit it to the AI devices 100a to 100e.

Alternatively, the AI devices 100a to 100e may infer a result value for input data using a direct learning model and generate a response or a control command based on the inferred result value.

Hereinafter, various embodiments of the AI devices 100a to 100e to which the above-described technology is applied will be described. Here, the AI devices 100a to 100e shown in FIG. 3 may be as a specific example of the AI device 100 shown in FIG. 1.

<AI+Robot>

The robot 100a is applied with AI technology and may be implemented as a guide robot, a transport robot, a cleaning robot, a wearable robot, an entertainment robot, a pet robot, an unmanned flying robot, and the like.

The robot 100a may include a robot control module for controlling an operation, and the robot control module may refer to a software module or a chip implementing the same as hardware.

The robot 100a may acquire status information of the robot 100a using sensor information obtained from various types of sensors, detect (recognizes) surrounding environments and objects, generate map data, decide a moving route and a driving plan, decide a response to user interaction, or decide an action.

Here, the robot 100a may use sensor information obtained from at least one sensor among a lidar, a radar, and a camera in order to determine the moving route and the driving plan.

The robot 100a may perform the above operations using a learning model composed of at least one artificial neural network. For example, the robot 100a may recognize a surrounding environment and an object using a learning model, and may determine an operation using the recognized surrounding environment information or object information. Here, the learning model may be directly learned by the robot 100a or learned by an external device such as the AI server 200.

Here, the robot 100a may perform an operation by generating a result using a direct learning model, but it may transmit sensor information to an external device such as the AI server 200 and perform the operation by receiving the result generated accordingly.

The robot 100a may determine the moving route and the driving plan using at least one of map data, object information detected from sensor information, or object information obtained from an external device, and may control the driving unit to drive the robot 100a according to the determined moving route and driving plan.

The map data may include object identification information on various objects arranged in a space in which the robot 100a moves. For example, the map data may include object identification information on fixed objects such as walls and doors and movable objects such as flower pots and desks. In addition, the object identification information may include a name, type, distance, and location.

In addition, the robot 100a may perform an operation or run by controlling a driving unit based on a user's control/interaction. In this case, the robot 100a may acquire interaction intention information according to a user's motion or voice speech, and determine a response based on the obtained intention information to perform the operation.

<AI+Autonomous Driving>

The self-driving (autonomous) vehicle 100b may be implemented as a mobile robot, vehicle, or unmanned aerial vehicle by applying AI technology.

The self-driving vehicle 100b may include an autonomous driving control module for controlling an autonomous driving function, and the autonomous driving control module may refer to a software module or a chip implementing the same as hardware. The autonomous driving control module may be included inside as a configuration of the self-driving vehicle 100b, but may be configured as separate hardware and connected to the exterior of the self-driving vehicle 100b.

The self-driving vehicle 100b may acquire status information of the self-driving vehicle 100b using sensor information obtained from various types of sensors, detect (recognizes) surrounding environments and objects, generate map data, decide a moving route and a driving plan, decide a response to user interaction, or decide an action.

Here, the self-driving vehicle 100b may use sensor information obtained from at least one sensor among a lidar, a radar, and a camera, similar to the robot 100a, in order to determine the moving route and the driving plan.

In particular, the self-driving vehicle 100b may recognize an environment or object in an area where the field of view is obscured or an area greater than a certain distance by receiving sensor information from external devices or directly recognized information from external devices.

The self-driving vehicle 100b may perform the above operations using a learning model composed of at least one artificial neural network. For example, the self-driving vehicle 100b may recognize a surrounding environment and an object using a learning model, and may determine a driving path using the recognized surrounding environment information or object information. Here, the learning model may be directly learned by the self-driving vehicle 100b or learned by an external device such as the AI server 200.

Here, the self-driving vehicle 100b may perform an operation by generating a result using a direct learning model, but it may transmit sensor information to an external device such as the AI server 200 and perform the operation by receiving the result generated accordingly.

The self-driving vehicle 100b may determine the moving route and the driving plan using at least one of map data, object information detected from sensor information, or object information obtained from an external device, and may control the driving unit to drive the self-driving vehicle 100b according to the determined moving route and driving plan.

The map data may include object identification information on various objects arranged in a space (e.g., road) in which the self-driving (autonomous) vehicle 100b moves. For example, the map data may include object identification information on fixed objects such as street lights, rocks, and buildings and movable objects such as vehicles and pedestrians. In addition, the object identification information may include a name, type, distance, and location.

In addition, the self-driving vehicle 100b may perform an operation or drive by controlling a driving unit based on a user's control/interaction. In this case, the self-driving vehicle 100b may acquire interaction intention information according to a user's motion or voice speech, and determine a response based on the obtained intention information to perform the operation.

<AI+XR>

The XR device 100c is applied with AI technology, and may be implemented as HMD (Head-Mount Display), HUD (Head-Up Display) provided in the vehicle, a TV, a mobile phone, a smart phone, a computer, a wearable device, a home appliance, a digital signage, a vehicle, a fixed robot or a mobile robot.

The XR device 100c may acquire information on a surrounding space or a real object by analyzing 3D point cloud data or image data acquired through various sensors or from an external device to generate location data and attribute data for 3D points, and may render the XR object to be displayed to output. For example, the XR apparatus 100c may output an XR object including additional information on the recognized object corresponding to the recognized object.

The XR apparatus 100c may perform the above operations using a learning model composed of at least one artificial neural network. For example, the XR device 100c may recognize a real object from 3D point cloud data or image data using a learning model, and may provide information corresponding to the recognized real object. Here, the learning model may be directly learned by the XR device 100c or learned by an external device such as the AI server 200.

At this time, the XR device 100c may directly generate a result using a learning model to perform an operation, but may also transmit sensor information to an external device such as the AI server 200 and receive the generated result to perform the operation.

<AI+Robot+Autonomous Driving>

The robot 100a may be implemented as a guide robot, a transport robot, a cleaning robot, a wearable robot, an entertainment robot, a pet robot, an unmanned flying robot, etc. by applying AI technology and autonomous driving technology.

The robot 100a to which AI technology and autonomous driving technology are applied may refer to a robot having an autonomous driving function or a robot 100a interacting with the self-driving vehicle 100b.

The robot 100a having an autonomous driving function may collectively refer to devices that move by themselves according to a given movement line without the user's control or by determining the movement line by themselves.

The robot 100a having an autonomous driving function and the self-driving vehicle 100b may use a common sensing method to determine one or more of a moving route or a driving plan. For example, the robot 100a having an autonomous driving function and the self-driving vehicle 100b may determine one or more of a movement route or a driving plan using information sensed through a lidar, a radar, and a camera.

The robot 100a interacting with the self-driving vehicle 100b exists separately from the self-driving vehicle 100b and may be linked to an autonomous driving function inside or outside the autonomous driving vehicle 100b, or may perform an operation associated with the user on board in the self-driving vehicle 100b.

Here, the robot 100a interacting with the self-driving vehicle 100b may control or assist the autonomous driving function of the self-driving vehicle 100b by acquiring sensor information on behalf of the self-driving (autonomous) vehicle 100b to provide it to the self-driving vehicle 100b, or acquiring sensor information and generating object information on the surrounding environment to provide it to the self-driving vehicle 100b.

Alternatively, the robot 100a interacting with the self-driving vehicle 100b may monitor a user in the self-driving vehicle 100b or control functions of the self-driving vehicle 100b through interaction with the user. For example, when it is determined that the driver is in a drowsy state, the robot 100a may activate an autonomous driving function of the self-driving vehicle 100b or assist in controlling the driving unit of the self-driving vehicle 100b. Here, the functions of the self-driving vehicle 100b controlled by the robot 100a may include not only an autonomous driving function, but also functions provided by a navigation system or an audio system provided inside the self-driving vehicle 100b.

Alternatively, the robot 100a interacting with the self-driving vehicle 100b may provide information or assist a function to the self-driving vehicle 100b from outside of the self-driving vehicle 100b. For example, the robot 100a may provide traffic information including signal information to the self-driving vehicle 100b, such as a smart traffic light, or automatically connect an electric charger to the charging port by interacting with the self-driving vehicle 100b, such as an automatic electric charger for an electric vehicle.

<AI+Robot+XR>

The robot 100a may be implemented as a guide robot, a transport robot, a cleaning robot, a wearable robot, an entertainment robot, a pet robot, an unmanned flying robot, a drone, etc. by applying AI technology and XR technology.

The robot 100a to which the XR technology is applied may refer to a robot to be controlled/interacted within an XR image. In this case, the robot 100a is distinguished from the XR device 100c and may be interacted with each other.

When the robot 100a, which is the object of control/interaction in the XR image, acquires sensor information from sensors including a camera, the robot 100a or the XR device 100c may generate an XR image based on the sensor information, and XR device 100c may output the generated XR image. In addition, the robot 100a may operate based on a control signal input through the XR device 100c or a user's interaction.

For example, the user may check the XR image corresponding to the viewpoint of the robot 100a linked remotely through an external device such as the XR device 100c, and may adjust the autonomous driving path of the robot 100a through the interaction, or control motion or driving, or check information on surrounding objects.

<AI+Autonomous Driving+XR>

The self-driving (autonomous) vehicle 100b may be implemented as a mobile robot, a vehicle, or an unmanned aerial vehicle by applying AI technology and XR technology.

The self-driving vehicle 100b to which the XR technology is applied may mean an autonomous driving vehicle including a means for providing an XR image, or an autonomous driving vehicle that is an object of control/interaction within the XR image. In particular, the self-driving vehicle 100b, which is an object of control/interaction in the XR image, is distinguished from the XR device 100c and may be interacted with each other.

The self-driving vehicle 100b having a means for providing an XR image may acquire sensor information from sensors including a camera, and may output an XR image generated based on the acquired sensor information. For example, the self-driving vehicle 100b may provide an XR object corresponding to a real object or an object in a screen to the occupant by outputting an XR image with a HUD.

In this case, when the XR object is output to the HUD, at least a part of the XR object may be output to overlap the actual object facing the occupant's gaze. On the other hand, when the XR object is output on a display provided inside the self-driving vehicle 100b, at least a part of the XR object may be output to overlap an object in the screen. For example, the self-driving vehicle 100b may output XR objects corresponding to objects such as lanes, other vehicles, traffic lights, traffic signs, motorcycles, pedestrians, and buildings.

When the self-driving vehicle 100b, which is an object of control/interaction in the XR image, acquires sensor information from sensors including a camera, the self-driving vehicle 100b or the XR device 100c may generate an XR image based on the sensor information, and output the generated XR image. In addition, the self-driving vehicle 100b may operate based on a control signal input through an external device such as the XR device 100c or a user's interaction.

Example of Communication System to which the Present Disclosure is Applied

FIG. 5 illustrates a communication system 1 to which the present disclosure is applied.

Referring to FIG. 5, a communication system 1 applied to the present disclosure includes a wireless device, a base station, and a network. Here, the wireless device means a device that performs communication using a wireless access technology (e.g., 5G NR (New RAT), LTE (Long Term Evolution)), and may be referred to as a communication/wireless/5G device. Although not limited thereto, the wireless device may include robots 100a, vehicles 100b-1 and 100b-2, an extended reality (XR) device 100c, a hand-held device 100d, and a home appliance 100e. an Internet of Thing (IoT) device (100f), and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). The XR device includes AR (Augmented Reality)/VR (Virtual Reality)/MR (Mixed Reality) devices, and it may be implemented in the form of a HMD (Head-Mounted Device), a HUD (Head-Up Display) in a vehicle, a TV, a smartphone, a computer, a wearable device, a home appliance, a digital signage, a vehicle, a robot, and the like. The hand-held device may include a smart phone, a smart pad, a wearable device (e.g., a smart watch, a smart glass), a computer (e.g., a notebook computer, etc.). The home appliance may include a TV, a refrigerator, a washing machine, and the like. The IoT device may include a sensor, a smart meter, and the like. For example, the base station and the network may be implemented as a wireless device, and the specific wireless device 200a may operate as a base station/network node to other wireless devices.

The wireless devices 100a to 100f may be connected to the network 300 through the base station 200. AI (Artificial Intelligence) technology may be applied to the wireless devices 100a to 100f, and the wireless devices 100a to 100f may be connected to the AI server 400 through the network 300. The network 300 may be configured using a 3G network, a 4G (e.g., LTE) network, or a 5G (eg, NR) network, and the like. The wireless devices 100a to 100f may communicate with each other through the base station 200/network 300, but may communicate directly (e.g. sidelink communication) without passing through the base station/network. For example, the vehicles 100b-1 and 100b-2 may perform direct communication (e.g. V2V (Vehicle to Vehicle)/V2X (Vehicle to everything) communication). In addition, the IoT device (e.g., sensor) may directly communicate with other IoT devices (e.g., sensors) or other wireless devices 100a to 100f.

Wireless communication/connections 150a, 150b, and 150c may be established between the wireless devices 100a to 100f/base station 200 and the base station 200/base station 200. Here, wireless communication/connection may be achieved through various wireless access technologies (e.g. 5G NR) such as uplink/downlink communication 150a, sidelink communication 150b (or D2D communication), base station communication 150c (e.g., relay, Integrated Access Backhaul (IAB)). Through wireless communication/connections 150a, 150b, 150c, the wireless device and the base station/wireless device, and the base station and the base station can transmit/receive radio signals to each other. For example, the wireless communication/connection 150a, 150b, 150c may transmit/receive signals through various physical channels. To this end, based on various proposals of the present disclosure, for transmitting/receiving radio signals, at least some of a process of configuring various configuration information, various signal processing processes (e.g., channel encoding/decoding, modulation/demodulation, resource mapping/demapping, etc.), and resource allocation process may be performed.

Example of Device to which the Present Disclosure is Applied

FIG. 6 illustrates a wireless communication device according to some embodiments of the present disclosure.

Referring to FIG. 6, the wireless communication system may include a first device 610 and a second device 620.

The first device 610 includes a base station, a network node, a transmitting terminal, a receiving terminal, a wireless device, a wireless communication device, a vehicle, a vehicle equipped with an autonomous driving function, a connected car, a drone (Unmanned Aerial Vehicle, UAV), an AI (Artificial Intelligence) module, a robot, an Augmented Reality (AR) device, a Virtual Reality (VR) device, a Mixed Reality (MR) device, a hologram device, a public safety device, a MTC device, an IoT device, a medical device, a FinTech device (or financial device), a security device, a climate/environment device, a device related to 5G service, or a device related to the 4th industrial revolution field.

The second device 620 includes a base station, a network node, a transmitting terminal, a receiving terminal, a wireless device, a wireless communication device, a vehicle, a vehicle equipped with an autonomous driving function, a connected car, a drone (Unmanned Aerial Vehicle, UAV), an AI (Artificial Intelligence) module, a robot, an Augmented Reality (AR) device, a Virtual Reality (VR) device, a Mixed Reality (MR) device, a hologram device, a public safety device, a MTC device, an IoT device, a medical device, a FinTech device (or financial device), a security device, a climate/environment device, a device related to 5G service, or a device related to the 4th industrial revolution field.

For example, the terminal may include a mobile phone, a smart phone, a laptop computer, a digital broadcasting terminal, a personal digital assistants (PDA), a portable multimedia player (PMP), a navigation system, a slate PC, and a tablet PC, a ultrabook, a wearable device (for example, a watch-type terminal (smartwatch), glass-type terminal (smart glass), HMD (head mounted display)), and the like. For example, the HMD may be a display device worn on the head. For example, HMD can be used to implement VR, AR or MR.

For example, a drone may be a vehicle that is not a human being and is flying by a radio control signal. For example, the VR device may include a device that implements an object or a background of a virtual world. For example, the AR device may include a device that connects an object or background of a virtual world to an object or background of the real world and implements it. For example, the MR device may include a device that combines and implements an object or background of a virtual world to an object or background of the real world. For example, the hologram device may include a device that implements a 360-degree stereoscopic image by recording and reproducing stereoscopic information by utilizing an interference phenomenon of light generated when two laser lights meet, called holography. For example, the public safety device may include an image relay device or an image device wearable on a user's human body. For example, the MTC device and the IoT device may be devices that do not require direct human intervention or manipulation. For example, the MTC device and the IoT device may include a smart meter, a bending machine, a thermometer, a smart light bulb, a door lock, or various sensors. For example, the medical device may be a device used for the purpose of diagnosing, treating, alleviating, treating or preventing a disease. For example, the medical device may be a device used for the purpose of diagnosing, treating, alleviating or correcting an injury or disorder. For example, a medical device may be a device used for the purpose of examining, replacing or modifying a structure or function. For example, the medical device may be a device used for the purpose of controlling pregnancy. For example, the medical device may include a device for treatment, a device for surgery, a device for (extra-corporeal) diagnosis, a hearing aid or a device for procedure. For example, the security device may be a device installed to prevent a risk that may occur and maintain safety. For example, the security device may be a camera, CCTV, recorder, or black box. For example, the fintech device may be a device capable of providing financial services such as mobile payment. For example, the fintech device may include a payment device or a point of sales (POS). For example, the climate/environment device may include a device that monitors or predicts the climate/environment.

The first device 610 may include at least one or more processors such as the processor 611, at least one or more memories such as the memory 612, and at least one or more transceivers such as the transceiver 613. The processor 611 may perform the functions, procedures, and/or methods described above. The processor 611 may perform one or more protocols. For example, the processor 611 may perform one or more layers of a radio interface protocol. The memory 612 is connected to the processor 611 and may store various types of information and/or commands. The transceiver 613 may be connected to the processor 611 and controlled to transmit and receive radio signals.

The second device 620 may include at least one or more processors such as the processor 621, at least one or more memories such as the memory 622, and at least one or more transceivers such as the transceiver 623. The processor 621 may perform the functions, procedures, and/or methods described above. The processor 621 may perform one or more protocols. For example, the processor 621 may perform one or more layers of a radio interface protocol. The memory 622 is connected to the processor 621 and may store various types of information and/or commands. The transceiver 623 may be connected to the processor 621 and controlled to transmit and receive radio signals.

The memory 612 and/or the memory 622 may be connected inside or outside the processor 611 and/or the processor 621, respectively, and also be connected to other processors through various technologies such as wired or wireless connection.

The first device 610 and/or the second device 620 may have one or more antennas. For example, the antenna 614 and/or the antenna 624 may be configured to transmit and receive wireless signals.

FIG. 7 is another example of a block diagram of a radio communication device according to some embodiments of the present disclosure.

In reference to FIG. 7, a radio communication system includes a base station 710 and a plurality of terminals 720 positioned in a region of a base station. A base station may be represented as a transmission device and a terminal may be represented as a reception device, and vice versa. A base station and a terminal include processors 711 and 721, memories 714 and 724, one or more Tx/Rx radio frequency (RF) modules 715 and 725, Tx processors 712 and 722, Rx processors 713 and 723 and antennas 716 and 726. A processor implements the above-described function, process and/or method. In more detail, an upper layer packet from a core network is provided for a processor 711 in a DL (a communication from a base station to a terminal). A processor implements a function of a L2 layer. In a DL, a processor provides radio resource allocation and multiplexing between a logical channel and a transmission channel for a terminal 720 and takes charge of signaling to a terminal. A transmission (TX) processor 712 implements a variety of signal processing functions for a L1 layer (e.g., a physical layer). A signal processing function facilitates forward error correction (FEC) in a terminal and includes coding and interleaving. An encoded and modulated symbol is partitioned into parallel streams, and each stream is mapped to an OFDM subcarrier, is multiplexed with a reference signal (RS) in a time and/or frequency domain and is combined together by using Inverse Fast Fourier Transform (IFFT) to generate a physical channel which transmits a time domain OFDMA symbol stream. An OFDM stream is spatially precoded to generate a multiple spatial stream. Each spatial stream may be provided for a different antenna 716 in each Tx/Rx module (or a transmitter-receiver 715). Each Tx/Rx module may modulate a RF carrier in each spatial stream for transmission. In a terminal, each Tx/Rx module (or a transmitter-receiver 725) receives a signal through each antenna 726 of each Tx/Rx module. Each Tx/Rx module reconstructs information modulated by a RF carrier to provide it for a reception (RX) processor 722. A RX processor implements a variety of signal processing functions of a layer 1. A RX processor may perform a spatial processing for information to reconstruct an arbitrary spatial stream heading for a terminal. When a plurality of spatial streams head for a terminal, they may be combined into a single OFDMA symbol stream by a plurality of RX processors. A RX processor transforms an OFDMA symbol stream from a time domain to a frequency domain by using Fast Fourier Transform (FFT). A frequency domain signal includes an individual OFDMA symbol stream for each subcarrier of an OFDM signal. Symbols and a reference signal in each subcarrier are reconstructed and demodulated by determining the most probable signal arrangement points transmitted by a base station. Such soft decisions may be based on channel estimated values. Soft decisions are decoded and deinterleaved to reconstruct data and a control signal transmitted by a base station in a physical channel. The corresponding data and control signal are provided for a processor 721.

An UL (a communication from a terminal to a base station) is processed in a base station 710 by a method similar to that described in a terminal 720 in relation to a function of a receiver. Each Tx/Rx module 725 receives a signal through each antenna 726. Each Tx/Rx module provides a RF carrier and information for a RX processor 723. A processor 721 may be related to a memory 724 which stores a program code and data. A memory may be referred to as a computer readable medium.

General LTE System

FIG. 8 is a diagram illustrating an example of the structure of a radio frame of LTE.

In FIG. 8, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

FIG. 9 is a diagram illustrating an example of a resource grid for downlink slot.

In FIG. 9, a downlink slot includes a plurality of OFDM symbols in time domain. It is described herein that one downlink slot includes 7 OFDM symbols, and one resource block (RB) includes 12 subcarriers in frequency domain as an example. However, the present disclosure is not limited thereto. Each element on the resource grid is referred to as a resource element (RE). One RB includes 12×7 REs. The number NDL of RBs included in the downlink slot depends on a downlink transmit bandwidth. The structure of an uplink slot may be same as that of the downlink slot.

FIG. 10 illustrates an example of the structure of downlink subframe.

In FIG. 10, a maximum of three OFDM symbols located in a front portion of a first slot within a subframe correspond to a control region to be assigned with a control channel. The remaining OFDM symbols correspond to a data region to be assigned with a physical downlink shared chanel (PDSCH). Examples of downlink control channels used in the 3GPP LTE includes a physical control format indicator channel (PCFICH), a physical downlink control channel (PDCCH), a physical hybrid ARQ indicator channel (PH ICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

FIG. 11 illustrates an example of the structure of uplink subframe.

In FIG. 11, an uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Hereinafter, the LTE frame structure will be described in more detail.

Throughout LTE specification, unless otherwise noted, the size of various fields in the time domain is expressed as a number of time units $T_s=1/(15000 \times 2048)$ seconds.

Downlink and uplink transmissions are organized into radio frames with $T_f=307200 \times T_s=10$ ms duration. Two radio frame structures are supported:

Type 1, applicable to FDD

Type 2, applicable to TDD

Frame Structure Type 1

FIG. 12 illustrates an example of frame structure type 1.

Frame structure type 1 is applicable to both full duplex and half duplex FDD. Each radio frame is $T_f=307200\,T_s=10$ ms long and consists of 20 slots of length $T_{slot}=15360\,T_s=0.5$ ms, numbered from 0 to 19. A subframe is defined as two consecutive slots where subframe i consists of slots 2i and 2i+1.

For FDD, 10 subframes are available for downlink transmission and 10 subframes are available for uplink transmissions in each 10 ms interval.

Uplink and downlink transmissions are separated in the frequency domain. In half-duplex FDD operation, the UE cannot transmit and receive at the same time while there are no such restrictions in full-duplex FDD.

Frame Structure Type 2

Frame structure type 2 is applicable to FDD. Each radio frame of length $T_f=307200 \times T_s=10$ ms consists of two half-frames of length $15360 \cdot T_s=0.5$ ms each. Each half-frame consists of five subframes of length $30720 \cdot T_s=1$ ms. The supported uplink-downlink configurations are listed in Table 2 where, for each subframe in a radio frame, "D" denotes the subframe is reserved for downlink transmissions, "U" denotes the subframe is reserved for uplink transmissions and "S" denotes a special subframe with the three fields DwPTS, GP and UpPTS. The length of DwPTS and UpPTS is given by Table 1 subject to the total length of DwPTS, GP and UpPTS being equal to $30720\,T_s=1$ ms. Each subframe i is defined as two slots, 2i and 2i+1 of length $T_{slot}=15360 \cdot T_s=0.5$ ms in each subframe.

Uplink-downlink configurations with both 5 ms and 10 ms downlink-to-uplink switch-point periodicity are supported. In case of 5 ms downlink-to-uplink switch-point periodicity, the special subframe exists in both half-frames. In case of 10 ms downlink-to-uplink switch-point periodicity, the special subframe exists in the first half-frame only. Subframes 0 and 5 and DwPTS are always reserved for downlink transmission. UpPTS and the subframe immediately following the special subframe are always reserved for uplink transmission. FIG. 13 is a diagram illustrating another example of the frame structure type 2.

Table 1 shows an example of a configuration of a special subframe.

TABLE 1

|  | normal cyclic prefix in downlink | | | extended cyclic prefix in downlink | | |
| --- | --- | --- | --- | --- | --- | --- |
|  |  | UpPTS | | | UpPTS | |
| Special subframe configuration | DwPTS | normal cyclic prefix in uplink | extended cyclic prefix in uplink | DwPTS | normal cyclic prefix in uplink | extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Table 2 shows an example of an uplink-downlink configuration.

TABLE 2

| Uplink-Downlink configuration | Downlink-to-Uplink Switch-point periodicity | Subframe number | | | | | | | | | |
| --- | --- | --- | --- | --- | --- | --- | --- | --- | --- | --- | --- |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

<NB-IoT>

NB-IoT (narrowband-internet of things) is a standard for supporting low complexity and low cost devices and is defined to perform only relatively simple operations compared to existing LTE devices. NB-IoT follows the basic structure of LTE, but operates based on the contents defined below. If the NB-IoT reuses an LTE channel or signal, it may follow the standard defined in the existing LTE.

Uplink

The following narrowband physical channels are defined:
NPUSCH (Narrowband Physical Uplink Shared Channel)
NPRACH (Narrowband Physical Random Access Channel)

The following uplink narrowband physical signals are defined:
Narrowband demodulation reference signal The uplink bandwidth in terms of subcarriers $N_{sc}^{UL}$, and the slot duration $T_{slot}$ are given in Table 3.
Table 3 shows an example of NB-IoT parameters.

TABLE 3

| Subcarrier spacing | $N_{sc}^{UL}$ | $T_{slot}$ |
| --- | --- | --- |
| $\Delta f$ = 3.75 kHz | 48 | 61440 · $T_s$ |
| $\Delta f$ = 15 kHz | 12 | 15360 · $T_s$ |

A single antenna port p=0 is used for all uplink transmissions.

Resource Unit

Resource units are used to describe the mapping of the NPUSCH to resource elements. A resource unit is defined as $N_{symb}^{UL}N_{slots}^{UL}$ consecutive SC-FDMA symbols in the time domain and $N_{sc}^{RU}$ consecutive subcarriers in the frequency domain, where $N_{sc}^{RU}$ and $N_{symb}^{UL}$ given by Table 4.

Table 4 shows an example of supported combinations of $N_{sc}^{RU}$, $N_{slots}^{UL}$ and $N_{symb}^{UL}$.

TABLE 4

| NPUSCH format | $\Delta f$ | $N_{sc}^{RU}$ | $N_{slots}^{UL}$ | $N_{symb}^{UL}$ |
| --- | --- | --- | --- | --- |
| 1 | 3.75 kHz | 1 | 16 | 7 |
| | 15 kHz | 1 | 16 | |
| | | 3 | 8 | |
| | | 6 | 4 | |
| | | 12 | 2 | |
| 2 | 3.75 kHz | 1 | 4 | |
| | 15 kHz | 1 | 4 | |

Narrowband Uplink Shared Channel (NPUSCH)

The narrowband physical uplink shared channel supports two formats:

NPUSCH format 1, used to carry the UL-SCH

NPUSCH format 2, used to carry uplink control information

Scrambling shall be done according to clause 5.3.1 of TS36.211. The scrambling sequence generator shall be initialized with $c_{ini}=n_{RNTI} \cdot 2^{14}+n_f \bmod 2 \cdot 2^{13}+\lfloor n_s/2 \rfloor+N_{ID}^{Ncell}$ where $n_s$ is the first slot of the transmission of the codeword. In case of NPUSCH repetitions, the scrambling sequence shall be reinitialized according to the above formula after every $M_{idendical}^{NPUSCH}$ transmission of the codeword with $n_s$ and $n_f$ set to the first slot and the frame, respectively, used for the transmission of the repetition. The quantity $M_{idendical}^{NPUSCH}$ is given by clause 10.1.3.6 in TS36.211.

Table 5 specifies the modulation mappings applicable for the narrowband physical uplink shared channel.

TABLE 5

| NPUSCH format | $N_{sc}^{RU}$ | Modulation scheme |
|---|---|---|
| 1 | 1 | BPSK, QPSK |
|   | >1 | QPSK |
| 2 | 1 | BPSK |

NPUSCH can be mapped to one or more than one resource units, $N_{RU}$, as given by clause 16.5.1.2 of 3GPP TS 36.213, each of which shall be transmitted $M_{rep}^{NPUSCH}$ times.

The block of complex-valued symbols $z(0), \ldots, z(M_{rep}^{NPUSCH}-1)$ shall be multiplied with the amplitude scaling factor $\beta_{NPUSCH}$ in order to conform to the transmit power $P_{NPUSCH}$ specified in 3GPP TS 36.213, and mapped in sequence starting with z(0) to subcarriers assigned for transmission of NPUSCH. The mapping to resource elements (k, l) corresponding to the subcarriers assigned for transmission and not used for transmission of reference signals, shall be in increasing order of first the index k, then the index l, starting with the first slot in the assigned resource unit.

After mapping to $N_{slots}$ slots, the $N_{slots}$ slots shall be repeated $M_{idendical}^{NPUSCH}-1$ additional times, before continuing the mapping of z(•) to the following slot, where Equation 1, $$M_{idendical}^{NPUSCH} = \begin{cases} \min(\lceil M_{rep}^{NPUSCH}/2 \rceil, 4) & N_{sc}^{RU} > 1 \\ 1 & N_{sc}^{RU} = 1 \end{cases}$$ (Equation 1)

$$N_{slots} = \begin{cases} 1 & \Delta f = 3.75 \text{ kHz} \\ 2 & \Delta f = 15 \text{ kHz} \end{cases}$$

If a mapping to $N_{slots}$ slots or a repetition of the mapping contains a resource element which overlaps with any configured NPRACH resource according to NPRACH-ConfigSIB-NB, the NPUSCH transmission in overlapped $N_{slots}$ slots is postponed until the next $N_{slots}$ slots not overlapping with any configured NPRACH resource.

The mapping of $z(0), \ldots, z(M_{rep}^{NPUSCH}-1)$ is then repeated until $M_{rep}^{NPUSCH} N_{RU} N_{slots}^{UL}$ slots have been transmitted. After transmissions and/or postponements due to NPRACH of $256 \cdot 30720 T_s$ time units, a gap of $40 \cdot 30720 T_s$ time units shall be inserted where the NPUSCH transmission is postponed. The portion of a postponement due to NPRACH which coincides with a gap is counted as part of the gap.

When higher layer parameter npusch-AllSymbols is set to false, resource elements in SC-FDMA symbols overlapping with a symbol configured with SRS according to srs-SubframeConfig shall be counted in the NPUSCH mapping but not used for transmission of the NPUSCH. When higher layer parameter npusch-AllSymbols is set to true, all symbols are transmitted.

Uplink Control Information on NPUSCH without UL-SCH Data

The one bit information of HARQ-ACK $o_0^{ACK}$ is coded according to Table 6, where for a positive acknowledgement $o_0^{ACK}=1$ and for a negative acknowledgement $o_0^{ACK}=0$.

Table 6 shows an example of HARQ-ACK code words.

TABLE 6

| HARQ-ACK $<o_0^{ACK}>$ | HARQ-ACK $<b_0, b_1, b_2, \ldots, b_{15}>$ |
|---|---|
| 0 | <0, 0, 0, 0, 0, 0, 0, 0, 0, 0, 0, 0, 0, 0, 0, 0> |
| 1 | <1, 1, 1, 1, 1, 1, 1, 1, 1, 1, 1, 1, 1, 1, 1, 1> |

Power Control

The UE transmit power for NPUSCH transmission in NB-IoT UL slot i for the serving cell is given by Equation 2 and 3 below.

If the number of repetitions of the allocated NPUSCH RUs is greater than 2, $$P_{NPUSCH,c}(i) = P_{CMAX,c}(i) \text{ [dBm]}$$ [Equation 2]

Otherwise, $$P_{NPUSCH,c}(i) = \min \begin{cases} P_{CMAX,c}(i), \\ 10\log_{10}(M_{NPUSCH,c}(i)) + \\ P_{O\_NPUSCH,c}(j) + \alpha_c(j) \cdot PL_c \end{cases} \text{[dBm]}$$ (Equation 3)

where, $P_{CMAX,c}(i)$ is the configured UE transmit power defined in 3GPP TS36.101 in NB-IoT UL slot i for serving cell c.

$M_{NPUSCH,c}$ is {¼} for 3.75 kHz subcarrier spacing and {1, 3, 6, 12} for 15 kHz subcarrier spacing $P_{O\_NPUSCH,c}(j)$ is a parameter composed of the sum of a component $P_{O\_NOMINAL\_NPUSCH,c}(j)$ provided from higher layers and a component $P_{O\_UE\_NPUSCH,c}(j)$ provided by higher layers for j=1 and for serving cell c where j∈{1, 2}. For NPUSCH (re)transmissions corresponding to a dynamic scheduled grant then j=1 and for NPUSCH (re)transmissions corresponding to the random access response grant then j=2.

$P_{O\_UE\_NPUSCH,c}(2)=0$ and $P_{O\_NORMINAL\_NPUSCH,c}(2)=P_{O\_PRE}+\Delta_{PREAMBLE\_Msg3}$, where the parameter preambleInitialReceivedTargetPower $P_{O\_PRE}$ and $\Delta_{PREAMBLE\_Msg3}$ are signalled from higher layers for serving cell c.

For j=1, for NPUSCH format 2, $\alpha_c(j)=1$; for NPUSCH format 1, $\alpha_c(j)$ is provided by higher layers for serving cell c. For j=2, $\alpha_c(j)=1$.

$PL_c$ is the downlink path loss estimate calculated in the UE for serving cell c in dB and $PL_c$=nrs-Power+nrs-PowerOffsetNonAnchor–higher layer filtered NRSRP, where nrs-Power is provided by higher layers and Subclause 16.2.2 in 3GPP 36.213, and nrs-powerOffsetNonAnchor is set to zero if it is not provided by higher layers and NRSRP is defined in 3GPP TS 36.214 for serving cell c and the higher layer filter configuration is defined in 3GPP TS 36.331 for serving cell c.

If the UE transmits NPUSCH in NB-IoT UL slot i for serving cell c, power headroom is computed using Equation 4 below.

$$PH_c(i) = P_{CMAX,c}(i) - \{P_{O\_NPUSCH,c}(1) + \alpha_c(1) \cdot PL_c\} \text{ [dB]}$$ [Equation 4]

UE Procedure for Transmitting Format 1 NPUSCH

A UE shall upon detection on a given serving cell of a NPDCCH with DCI format N0 ending in NB-IoT DL subframe n intended for the UE, perform, at the end of $n+k_0$ DL subframe, a corresponding NPUSCH transmission using NPUSCH format 1 in N consecutive NB-IoT UL slots $n_i$ with i=0, 1, . . . , N−1 according to the NPDCCH information where subframe n is the last subframe in which the NPDCCH is transmitted and is determined from the starting subframe of NPDCCH transmission and the DCI subframe repetition number field in the corresponding DCI; and $N=N_{Rep}N_{RU}N_{slots}^{UL}$, where the value of $N_{Rep}$ is determined by the repetition number field in the corresponding DCI, the value of $N_{RU}$ is determined by the resource assignment field in the corresponding DCI, and the value of $N_{slots}^{UL}$ is the number of NB-IoT UL slots of the resource unit corresponding to the allocated number of subcarriers in the corresponding DCI, $n_0$ is the first NB-IoT UL slot starting after the end of subframe $n+k_0$ value of $k_0$ is determined by the scheduling delay field ($I_{Delay}$) in the corresponding DCI according to Table 7. Table 7 shows an example of k0 for DCI format N0.

TABLE 7

| $I_{Delay}$ | $k_0$ |
|---|---|
| 0 | 8 |
| 1 | 16 |
| 2 | 32 |
| 3 | 64 |

The resource allocation information in uplink DCI format N0 for NPUSCH transmission indicates to a scheduled UE
- a set of contiguously allocated subcarriers ($n_{sc}$) of a resource unit determined by the Subcarrier indication field in the corresponding DCI,
- a number of resource units ($N_{RU}$) determined by the resource assignment field in the corresponding DCI according to Table 9,
- a repetition number ($N_{Rep}$) determined by the repetition number field in the corresponding DCI according to Table 10.

The subcarrier spacing $\Delta f$ of NPUSCH transmission is determined by the uplink subcarrier spacing field in the Narrowband Random Access Response Grant according to Subclause 16.3.3 in 3GPP TS36.213.

For NPUSCH transmission with subcarrier spacing $\Delta f=3.75$ kHz, $n_{sc}=I_{sc}$ where $I_{sc}$ is the subcarrier indication field in the DCI.

For NPUSCH transmission with subcarrier spacing $\Delta f=15$ kHz, the subcarrier indication field ($I_{sc}$) in the DCI determines the set of contiguously allocated subcarriers ($n_{sc}$) according to Table 8.

Table 8 shows an example of subcarriers allocated to the NPUSCH having $\Delta f=15$ kHz.

TABLE 8

| Subcarrier indication field ($I^{sc}$) | Set of Allocated subcarriers ($n_{sc}$) |
|---|---|
| 0-11 | $I_{sc}$ |
| 12-15 | $3(I_{sc}-12) + \{0, 1, 2\}$ |
| 16-17 | $6(I_{SC}-16) + \{0, 1, 2, 3, 4, 5\}$ |
| 18 | $\{0, 1, 2, 3, 4, 5, 6, 7, 8, 9, 10, 11\}$ |
| 19-63 | Reserved |

Table 9 shows an example of the number of resource units for NPUSCH.

TABLE 9

| $I_{RU}$ | $N_{RU}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

Table 10 shows an example of the number of repetitions for NPUSCH.

TABLE 10

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |

Demodulation Reference Signal (DMRS)

The reference signal sequence $\bar{r}_u(n)$ for $N_{sc}^{RU}=1$ is defined by Equation 5 below.

$$\bar{r}_u(n) = \frac{1}{\sqrt{2}}(1 + j)(1 - 2c(n))w(n \bmod 16), \quad \text{(Equation 5)}$$

$$0 \leq n < M_{rep}^{NPUSCH} N_{RU} N_{slots}^{UL}$$

where the binary sequence c(n) is defined by clause 7.2 of TS36.211 and shall be initialized with $c_{init}=35$ at the start of the NPUSCH transmission. The quantity w(n) is given by where $u=M_{ID}^{Ncell}$ mod 16 for NPUSCH format 2, and for NPUSCH format 1 if group hopping is not enabled, and by clause 10.1.4.1.3 of 3GPP TS36.211 if group hopping is enabled for NPUSCH format 1.

Table 11 shows an example of w(n).

TABLE 11

| u | w(0), . . . , w(15) | | | | | | | | | | | | | | | |
|---|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 | 1 |
| 1 | 1 | −1 | 1 | −1 | 1 | −1 | 1 | −1 | 1 | −1 | 1 | −1 | 1 | −1 | 1 | −1 |
| 2 | 1 | 1 | −1 | −1 | 1 | 1 | −1 | −1 | 1 | 1 | −1 | −1 | 1 | 1 | −1 | −1 |
| 3 | 1 | −1 | −1 | 1 | 1 | −1 | −1 | 1 | 1 | −1 | −1 | 1 | 1 | −1 | −1 | 1 |
| 4 | 1 | 1 | 1 | 1 | −1 | −1 | −1 | −1 | 1 | 1 | 1 | 1 | −1 | −1 | −1 | −1 |
| 5 | 1 | −1 | 1 | −1 | −1 | 1 | −1 | 1 | 1 | −1 | 1 | −1 | −1 | 1 | −1 | 1 |
| 6 | 1 | 1 | −1 | −1 | −1 | −1 | 1 | 1 | 1 | 1 | −1 | −1 | −1 | −1 | 1 | 1 |
| 7 | 1 | −1 | −1 | 1 | −1 | 1 | 1 | −1 | 1 | −1 | −1 | 1 | −1 | 1 | 1 | −1 |
| 8 | 1 | 1 | 1 | 1 | 1 | 1 | 1 | 1 | −1 | −1 | −1 | −1 | −1 | −1 | −1 | −1 |

TABLE 11-continued

| u | w(0), . . . , w(15) | | | | | | | | | | | | | | | |
|---|---|---|---|---|---|---|---|---|---|---|---|---|---|---|---|---|
| 9  | 1 | −1 | 1  | −1 | 1  | −1 | 1  | −1 | −1 | 1  | −1 | 1  | −1 | 1  | −1 | 1  |
| 10 | 1 | 1  | −1 | −1 | 1  | 1  | −1 | −1 | −1 | −1 | 1  | 1  | −1 | −1 | 1  | 1  |
| 11 | 1 | −1 | −1 | 1  | 1  | −1 | −1 | 1  | −1 | 1  | 1  | −1 | −1 | 1  | 1  | −1 |
| 12 | 1 | 1  | 1  | 1  | −1 | −1 | −1 | −1 | −1 | −1 | −1 | −1 | 1  | 1  | 1  | 1  |
| 13 | 1 | −1 | 1  | −1 | −1 | 1  | −1 | 1  | −1 | 1  | −1 | 1  | 1  | −1 | 1  | −1 |
| 14 | 1 | 1  | −1 | −1 | −1 | −1 | 1  | 1  | −1 | −1 | 1  | 1  | 1  | 1  | −1 | −1 |
| 15 | 1 | −1 | −1 | 1  | −1 | 1  | 1  | −1 | −1 | 1  | 1  | −1 | 1  | −1 | −1 | 1  |

The reference signal sequence for NPUSCH format 1 is given by Equation 6 below.

$$r_u(n) = \bar{r}_u(n) \quad \text{[Equation 6]}$$

The reference signal sequence for NPUSCH format 2 is given by Equation 7 below.

$$r_u(3n+m) = \bar{w}(m)\bar{r}_u(n) \quad m=0,1,2 \quad \text{[Equation 7]}$$

where $\bar{w}(m)$ is defined in Table 5.5.2.2.1-2 of 3GPP TS36.211 with the sequence index chosen according to $$\left(\sum_{i=0}^{7} c(8n_s + i)2^i\right) \bmod 3$$

with $c_{init} = N_{ID}^{Ncell}$.

The reference signal sequences $r_u(n)$ for $N_{sc}^{RU} > 1$ is defined by a cyclic shift α of a base sequence according to Equation 8 below.

$$r_u(n) = e^{j\alpha n} e^{j\phi(n)\pi/4}, \ 0 \leq n < N_{sc}^{RU} \quad \text{[Equation 8]}$$

where φ(n) is given by Table 10.1.4.1.2-1 for $N_{sc}^{RU}=3$, Table 12 for $N_{sc}^{RU}=6$ and Table 13 for $N_{sc}^{RU}=12$.

If group hopping is not enabled, the base sequence index u is given by higher layer parameters threeTone-BaseSequence, sixTone-BaseSequence, and twelveTone-BaseSequence for $N_{sc}^{RU}=3$, $N_{sc}^{RU}=6$, and $N_{sc}^{RU}=12$, respectively. If not signalled by higher layers, the base sequence is given by Equation 9 below.

$$u = \begin{cases} N_{ID}^{Ncell} \bmod 12 & \text{for } N_{sc}^{RU} = 3 \\ N_{ID}^{Ncell} \bmod 14 & \text{for } N_{sc}^{RU} = 6 \\ N_{ID}^{Ncell} \bmod 30 & \text{for } N_{sc}^{RU} = 12 \end{cases} \quad \text{(Equation 9)}$$

If group hopping is enabled, the base sequence index u is given by clause 10.1.4.1.3 of 3GPP TS36.211.

The cyclic shift α for $N_{sc}^{RU}=3$ and $N_{sc}^{RU}=6$ is derived from higher layer parameters threeTone-CyclicShift and sixTone-CyclicShift, respectively, as defined in Table 14. For $N_{sc}^{RU}=12$, α=0.

Table 12 shows an example of φ(n) for $N_{sc}^{RU}=3$

TABLE 12

| u | φ(0), φ(1), φ(2) | | |
|---|---|---|---|
| 0 | 1 | −3 | −3 |
| 1 | 1 | −3 | −1 |
| 2 | 1 | −3 | 3  |
| 3 | 1 | −1 | −1 |
| 4 | 1 | −1 | 1  |
| 5 | 1 | −1 | 3  |
| 6 | 1 | 1  | −3 |
| 7 | 1 | 1  | −1 |
| 8 | 1 | 1  | 3  |

TABLE 12-continued

| u | φ(0), φ(1), φ(2) | | |
|---|---|---|---|
| 9  | 1 | 3 | −1 |
| 10 | 1 | 3 | 1  |
| 11 | 1 | 3 | 3  |

Table 13 shows another example of φ(n) for $N_{sc}^{RU}=6$

TABLE 13

| u | φ(0), . . . , φ(5) | | | | | |
|---|---|---|---|---|---|---|
| 0  | 1  | 1  | 1  | 1  | 3  | −3 |
| 1  | 1  | 1  | 3  | 1  | −3 | 3  |
| 2  | 1  | −1 | −1 | −1 | 1  | −3 |
| 3  | 1  | −1 | 3  | −3 | −1 | −1 |
| 4  | 1  | 3  | 1  | −1 | −1 | 3  |
| 5  | 1  | −3 | −3 | 1  | 3  | 1  |
| 6  | −1 | −1 | 1  | −3 | −3 | −1 |
| 7  | −1 | −1 | −1 | 3  | −3 | −1 |
| 8  | 3  | −1 | 1  | −3 | −3 | 3  |
| 9  | 3  | −1 | 3  | −3 | −1 | 1  |
| 10 | 3  | −3 | 3  | −1 | 3  | 3  |
| 11 | −3 | 1  | 3  | 1  | −3 | −1 |
| 12 | −3 | 1  | −3 | 3  | −3 | −1 |
| 13 | −3 | 3  | −3 | 1  | 1  | −3 |

Table 14 shows an example of α

TABLE 14

| $N_{sc}^{RU} = 3$ | | $N_{sc}^{RU} = 6$ | |
|---|---|---|---|
| threeTone-CyclicShift | α | sixTone-CyclicShift | α |
| 0 | 0    | 0 | 0    |
| 1 | 2π/3 | 1 | 2π/6 |
| 2 | 4π/3 | 2 | 4π/6 |
|   |      | 3 | 8π/6 |

For the reference signal for NPUSCH format 1, sequence-group hopping can be enabled where the sequence-group number u in slot $n_s$ is defined by a group hopping pattern $f_{gh}(n_s)$ and a sequence-shift pattern $f_{ss}$ according to Equation 10 below.

$$u = (f_{gh}(n_s) + f_{ss}) \bmod N_{seq}^{RU} \quad \text{[Equation 10]}$$

where the number of reference signal sequences available for each resource unit size, $N_{seq}^{RU}$ is given by Table 15.

Table 15 shows an example of $N_{seq}^{RU}$

TABLE 15

| $N_{sc}^{RU}$ | $N_{seq}^{RU}$ |
|---|---|
| 1 | 16 |
| 3 | 12 |

TABLE 15-continued

| $N_{sc}^{RU}$ | $N_{seq}^{RU}$ |
|---|---|
| 6 | 14 |
| 12 | 30 |

Sequence-group hopping can be enabled or disabled by means of the cell-specific parameter groupHoppingEnabled provided by higher layers. Sequence-group hopping for NPUSCH can be disabled for a certain UE through the higher-layer parameter groupHoppingDisabled despite being enabled on a cell basis unless the NPUSCH transmission corresponds to a Random Access Response Grant or a retransmission of the same transport block as part of the contention based random access procedure.

The group hopping pattern $f_{gh}(n_s)$ is given by Equation 11 below.

$$f_{gh}(n_s) = \left(\sum_{i=0}^{7} c(8n'_s + i) \cdot 2^i\right) \bmod N_{seq}^{RU} \qquad \text{(Equation 11)}$$

where $n_s'=n_s$ for $N_{sc}^{RU}>1$ and $n_s'$ is the slot number of the first slot of the resource unit for $N_{sc}^{RU}=1$. The pseudo-random sequence $c(i)$ is defined by clause 7.2. The pseudo-random sequence generator shall be initialized with $$c_{init} = \left\lfloor \frac{N_{ID}^{Ncell}}{N_{seq}^{RU}} \right\rfloor$$

at the beginning of the resource unit for $N_{sc}^{RU}=1$ and in every even slot for $N_{sc}^{RU}>1$.

The sequence-shift pattern $f_{ss}$ is given by Equation 12 below.

$$f_{ss} = (N_{ID}^{Ncell} + \Delta_{ss}) \bmod N_{seq}^{RU} \qquad \text{[Equation 12]}$$

where $\Delta_{ss} \in \{0, 1, \ldots, 29\}$ is given by higher-layer parameter groupAssignmentNPUSCH. If no value is signalled, $\Delta_{ss}=0$.

The sequence $r(\cdot)$ shall be multiplied with the amplitude scaling factor $\beta_{NPUSCH}$ and mapped in sequence starting with $r(0)$ to the sub-carriers.

The set of sub-carriers used in the mapping process shall be identical to the corresponding NPUSCH transmission as defined in clause 10.1.3.6 in 3GPP 36.211.

The mapping to resource elements (k, l) shall be in increasing order of first k, then l, and finally the slot number. The values of the symbol index l in a slot are given in Table 16.

Table 16 shows an example of demodulation reference signal location for NPUSCH

TABLE 16

| NPUSCH format | Values for l | |
|---|---|---|
| | $\Delta f = 3.75$ kHz | $\Delta f = 15$ kHz |
| 1 | 4 | 3 |
| 2 | 0, 1, 2 | 2, 3, 4 |

SF-FDMA Baseband Signal Generation

For $N_{sc}^{RU}>1$, the time-continuous signal $s_l(t)$ in SC-FDMA symbol l in a slot is defined by clause 5.6 with the quantity $N_{RB}^{UL}N_{sc}^{RB}$ replaced by $N_{sc}^{UL}$.

For $N_{sc}^{RU}=1$, the time-continuous signal $s_{k,l}(t)$ for sub-carrier index k in SC-FDMA symbol l in an uplink slot is defined by Equation 13 below $$s_{k,l}(t) = a_{k^{(-)},l} \cdot e^{j\varphi_{k,l}} \cdot e^{j2\pi(k+1/2)\Delta f(t-N_{CP,l}T_s)}$$

$$k^{(-)} = k + \lfloor N_{sc}^{UL}/2 \rfloor \qquad \text{[Equation 13]}$$

For $0 \le t < (N_{CP,l}+N)T_s$ where parameters for $\Delta f=15$ kHz and $\Delta f=3.75$ kHz are given in Table 17, $a_{k^{(-)},l}$ is the modulation value of symbol l and the phase rotation $\varphi_{k,l}$ is defined by Equation 14 below.

$$\varphi_{k,l} = \rho(\tilde{l} \bmod 2) + \hat{\varphi}_k(\tilde{l}) \qquad \text{(Equation 14)}$$

$$\rho = \begin{cases} \frac{\pi}{2} & \text{for } BPSK \\ \frac{\pi}{4} & \text{for } QPSK \end{cases}$$

$$\hat{\varphi}_k(\tilde{l}) = \begin{cases} 0 & \tilde{l} = 0 \\ \hat{\varphi}_k(\tilde{l}-1) + 2\pi\Delta f(k+1/2)(N+N_{CP,l})T_s & \tilde{l} > 0 \end{cases}$$

$$\tilde{l} = 0, 1, \ldots, M_{rep}^{NPUSCH}N_{RU}N_{slots}^{UL}N_{symb}^{UL} - 1$$

$$l = \tilde{l} \bmod N_{symb}^{UL}$$

where $\tilde{l}$ is a symbol counter that is reset at the start of a transmission and incremented for each symbol during the transmission.

Table 17 shows an example of SC-FDMA parameters for $N_{sc}^{RU}=1$.

TABLE 17

| | Parameter | |
|---|---|---|
| | $\Delta f = 3.75$ kHz | $\Delta f = 15$ kHz |
| N | 8192 | 2048 |
| Cyclic prefix length $N_{CP,\,l}$ | 256 | 160 for l = 0 |
| | | 144 for l = 1, 2, . . . , 6 |
| Set of values for k | −24, −23, . . . , 23 | −6, −5, . . . , 5 |

The SC-FDMA symbols in a slot shall be transmitted in increasing order of l, starting with l=0, where SC-FDMA symbol l>0 starts at time $\sum_{l'=0}^{l-1}(N_{CP,l'}+N)T_s$ within the slot. For $\Delta f=3.75$ kHz, the remaining $2304T_s$ in $T_{slot}$ are not transmitted and used for guard period.

Narrowband Physical Random Access Channel (NPRACH)

The physical layer random access preamble is based on single-subcarrier frequency-hopping symbol groups. A symbol group is illustrated in, consisting of a cyclic prefix of length $T_{CP}$ and a sequence of 5 identical symbols with total length $T_{SEQ}$. The parameter values are listed in Table 18.

FIG. 14 illustrates an example of the random access symbol group.

Table 18 shows an example of Random access preamble parameters.

TABLE 18

| Preamble format | $T_{CP}$ | $T_{SEQ}$ |
|---|---|---|
| 0 | $2048T_s$ | $5 \cdot 8192T_s$ |
| 1 | $8192T_s$ | $5 \cdot 8192T_s$ |

The preamble consisting of 4 symbol groups transmitted without gaps shall be transmitted $N_{rep}^{NPRACH}$ times.

The transmission of a random access preamble, if triggered by the MAC layer, is restricted to certain time and frequency resources.

A NPRACH configuration provided by higher layers contains the following:
- NPRACH resource periodicity $N_{period}^{NPRACH}$ (nprach-Periodicity),
- frequency location of the first subcarrier allocated to NPRACH $N_{scoffset}^{NPRACH}$ (nprach-SubcarrierOffset),
- number of subcarriers allocated to NPRACH $N_{sc}^{PRACH}$ (nprach-NumSubcarriers),
- number of starting sub-carriers allocated to contention based NPRACH random access $N_{ss\_cont}^{NPRACH}$ (nprach-NumCBRA-StartSubcarriers),
- number of NPRACH repetitions per attempt $N_{rep}^{NPRACH}$ (numRepetitionsPerPreambleAttempt),
- NPRACH starting time $N_{start}^{NPRACH}$ (nprach-StartTime),
- Fraction for calculating starting subcarrier index for the range of NPRACH subcarriers reserved for indication of UE support for multi-tone msg3 transmission $N_{MSG3}^{NPRACH}$ (nprach-SubcarrierMSG3-RangeStart).

NPRACH transmission can start only $N_{start}^{NPRACH} \cdot 30720 T_s$ time units after the start of a radio frame fulfilling $n_f \bmod(N_{period}^{NPRACH}/10)=0$. After transmissions of $4 \cdot 64(T_{CP}+T_{SEQ})$ time units, a gap of $40 \cdot 30720 T_s$ time units shall be inserted.

NPRACH configurations where $N_{scoffset}^{NPRACH} + N_{sc}^{NPRACH} > N_{sc}^{UL}$ are invalid.

The NPRACH starting subcarriers allocated to contention based random access are split in two sets of subcarriers, $\{0, 1, \ldots, N_{sc\_cont}^{NPRACH} N_{MSG3}^{NPRACH}-1\}$ and $\{N_{sc\_cont}^{NPRACH} N_{MSG3}^{NPRACH}, \ldots, N_{sc_{cont}}^{NPRACH}-1\}$, where the second set, if present, indicate UE support for multi-tone msg3 transmission.

The frequency location of the NPRACH transmission is constrained within $N_{sc}^{RA}=12$ sub-carriers. Frequency hopping shall be used within the 12 subcarriers, where the frequency location of the $i^{th}$ symbol group is given by $n_{sc}^{RA}(i)=n_{start}+\tilde{n}_{sc}^{RA}(i)$ where $n_{start}=N_{scoffset}^{NPRACH}+\lfloor n_{init}/N_{sc}^{RA} \rfloor \cdot N_{sc}^{RA}$ and Equation 15, Where $0 \leq t < T_{SEQ}+T_{CP}$, $\beta_{NPRACH}$ is an amplitude scaling factor in order to conform to the transmit power $P_{NPRACH}$ specified in clause 16.3.1 in 3GPP TS 36.213, $k_0=-N_{sc}^{UL}/2$, $K=\Delta f/\Delta f_{RA}$ accounts for the difference in subcarrier spacing between the random access preamble and uplink data transmission, and the location in the frequency domain controlled by the parameter $n_{sc}^{RA}(i)$ is derived from clause 10.1.6.1 of 3GPP TS36.211. The variable $\Delta f_{RA}$ is given by Table 19 below.

Table 19 shows an example of random access baseband parameters.

TABLE 19

| Preamble format | $\Delta f_{RA}$ |
|---|---|
| 0, 1 | 3.75 kHz |

Downlink

A downlink narrowband physical channel corresponds to a set of resource elements carrying information originating from higher layers and is the interface defined between 3GPP TS 36.212 and 3GPP TS 36.211.

The following downlink physical channels are defined:
- NPDSCH (Narrowband Physical Downlink Shared Channel)
- NPBCH (Narrowband Physical Broadcast Channel)
- NPDCCH (Narrowband Physical Downlink Control Channel)

A downlink narrowband physical signal corresponds to a set of resource elements used by the physical layer but does not carry information originating from higher layers. The following downlink physical signals are defined:
- NRS (Narrowband reference signal)
- Narrowband synchronization signal Narrowband physical downlink shared channel (NPDSCH)

The scrambling sequence generator shall be initialized with $c_{init}=n_{RNTI} \cdot 2^{14}+n_f \bmod 2 \cdot 2^{13}+\lfloor n_s/2 \rfloor +N_{ID}^{Ncell}$ where $n_s$ is the first slot of the transmission of the codeword. In case of $$\tilde{n}_{sc}^{RA}(i) = \begin{cases} (\tilde{n}_{sc}^{RA}(0) + f(i/4)) \bmod N_{sc}^{RA} & i \bmod 4 = 0 \text{ and } i > 0 \\ \tilde{n}_{sc}^{RA}(i-1)+1 & i \bmod 4 = 1, 3 \text{ and } \tilde{n}_{sc}^{RA}(i-1) \bmod 2 = 0 \\ \tilde{n}_{sc}^{RA}(i-1)-1 & i \bmod 4 = 1, 3 \text{ and } \tilde{n}_{sc}^{RA}(i-1) \bmod 2 = 1 \\ \tilde{n}_{sc}^{RA}(i-1)+6 & i \bmod 4 = 0 \text{ and } \tilde{n}_{sc}^{RA}(i-1) < 6 \\ \tilde{n}_{sc}^{RA}(i-1)-6 & i \bmod 4 = 0 \text{ and } \tilde{n}_{sc}^{RA}(i-1) \geq 6 \end{cases}$$

$$f(t) = \left( f(t-1) + \left( \sum_{n=10t+1}^{10t+9} c(n) 2^{n-(10t+1)} \right) \bmod (N_{sc}^{RA} - 1) + 1 \right) \bmod N_{sc}^{RA}$$

$$f(-1) = 0$$

(Equation 15)

where $\tilde{n}_{sc}^{RA}(0)=n_{innt} \bmod N_{sc}^{RA}$ with $n_{init}$ being the subcarrier selected by the MAC layer from $\{0, 1, \ldots, N_{sc}^{NPRACH}-1\}$, and the pseudo random sequence $c(n)$ is given by clause 7.2 of 3GPP TS36.211. The pseudo random sequence generator shall be initialised with $c_{init}=N_{ID}^{Ncell}$.

The time-continuous random access signal $s_i(t)$ for symbol group i is defined by Equation 16 below.

$$s_i(t) = \beta_{NPRACH} e^{j2\pi(n_{SC}^{RA}(i)+Kk_0+1/2)\Delta f_{RA}(t-T_{CP})}$$

(Equation 16)

NPDSCH repetitions and the NPDSCH carrying the BCCH, the scrambling sequence generator shall be reinitialized according to the expression above for each repetition. In case of NPDSCH repetitions and the NPDSCH is not carrying the BCCH, the scrambling sequence generator shall be reinitialized according to the expression above after every $\min(M_{rep}^{NPDSCH}, 4)$ transmission of the codeword with $n_s$ and $n_f$ set to the first slot and the frame, respectively, used for the transmission of the repetition.

Modulation should be done using QPSK modulation scheme.

NPDSCH can be mapped to one or more than one subframes, $N_{SF}$, as given by clause 16.4.1.5 of 3GPP TS 36.213, each of which shall be transmitted NPDSCH $M_{rep}^{NPDSCH}$ times.

For each of the antenna ports used for transmission of the physical channel, the block of complex-valued symbols $y^{(p)}(0), \ldots, y^{(p)}(M_{symb}^{ap}-1)$ shall be mapped to resource elements (k, l) which meet all of the following criteria in the current subframe:

the subframe is not used for transmission of NPBCH, NPSS, or NSSS, and they are assumed by the UE not to be used for NRS, and they are not overlapping with resource elements used for CRS (if any), and the index l in the first slot in a subframe fulfils $l \geq l_{DataStart}$ where $l_{DataStart}$ is given by clause 16.4.1.4 of 3GPP TS 36.213.

The mapping of $y^{(p)}(0), \ldots, y^{(p)}(M_{symb}^{ap}-1)$ in sequence starting with $y^{(p)}(0)$ to resource elements (k, l) on antenna port p meeting the criteria above shall be increasing order of the first the index k and the index l, starting with the first slot and ending with the second slot in a subframe. For NPDSCH not carrying BCCH, after mapping to a subframe, the subframe shall be repeated for $M_{rep}^{NPDSCH}-1$ additional subframes, before continuing the mapping of $y^{(p)}(\cdot)$ to the following subframe. The mapping of $y^{(p)}(0), \ldots, y^{(p)}(M_{symb}^{ap}-1)$ is then repeated until $M_{rep}^{NPDSCH}N_{SF}$ subframes have been transmitted. For NPDSCH carrying BCCH, the $y^{(p)}(0), \ldots, y^{(p)}(M_{symb}^{ap}-1)$ is mapped to $N_{SF}$ subframes in sequence and then repeated until $M_{rep}^{NDSCH}N_{SF}$ subframes have been transmitted.

The NPDSCH transmission can be configured by higher layers with transmission gaps where the NPSDCH transmission is postponed. There are no gaps in the NPDSCH transmission if $R_{max} < N_{gap,threshold}$ where $N_{gap,threshold}$ is given by the higher layer parameter dl-GapThreshold and $R_{max}$ is given by 3GPP TS 36.213. The gap starting frame and subframe is given by $(10n_f + \lfloor n_s/2 \rfloor) \bmod N_{gap,period} = 0$ where the gap periodicity, $N_{gap,period}$, is given by the higher layer parameter dl-GapPeriodicity. The gap duration in number of subframes is given by $N_{gap,duration} = N_{gap,coeff} N_{gap,period}$ where $N_{gap,coeff}$ is given by the higher layer parameter dl-GapDurationCoeff. For NPDSCH carrying the BCCH there are no gaps in the transmission.

The UE shall not expect NPDSCH in subframe i if it is not a NB-IoT downlink subframe, except for transmissions of NPDSCH carrying SystemInformationBlockType1-NB in subframe 4. In case of NPDSCH transmissions, in subframes that are not NB-IoT downlink subframes, the NPDSCH transmission is postponed until the next NB-IoT downlink subframe.

UE Procedure for Receiving the NPDSCH

A NB-IoT UE shall assume a subframe as a NB-IoT DL subframe if the UE determines that the subframe does not contain NPSS/NSSS/NPBCH/NB-SIB1 transmission, and for a NB-IoT carrier that a UE receives higher layer parameter operationModeInfo, the subframe is configured as NB-IoT DL subframe after the UE has obtained SystemInformationBlockType1-NB.

for a NB-IoT carrier that DL-CarrierConfigCommon-NB is present, the subframe is configured as NB-IoT DL subframe by the higher layer parameter downlinkBitmapNonAnchor.

For a NB-IoT UE that supports twoHARQ-Processes-r14, there shall be a maximum of 2 downlink HARQ processes.

A UE shall upon detection on a given serving cell of a NPDCCH with DCI format N1, N2 ending in subframe n intended for the UE, decode, starting in n+5 DL subframe, the corresponding NPDSCH transmission in N consecutive NB-IoT DL subframe(s) $n_i$ with i=0, 1, ..., N-1 according to the NPDCCH information, where subframe n is the last subframe in which the NPDCCH is transmitted and is determined from the starting subframe of NPDCCH transmission and the DCI subframe repetition number field in the corresponding DCI;

subframe(s) ni with i=0, 1, ..., N-1 are N consecutive NB-IoT DL subframe(s) excluding subframes used for SI messages where, n0<n1< ..., nN-1, $N=N_{Rep}N_{SF}$, where the value of $N_{Rep}$ is determined by the repetition number field in the corresponding DCI, and the value of $N_{SF}$ is determined by the resource assignment field in the corresponding DCI, and $k_0$ is the number of NB-IoT DL subframe(s) starting in DL subframe n+5 until DL subframe$n_0$, where $k_0$ is determined by the scheduling delay field ($I_{Delay}$) for DCI format N1, and $k_0=0$ for DCI format N2. For DCI CRC scrambled by G-RNTI, $k_0$ is determined by the scheduling delay field ($I_{Delay}$) according to Table 21, otherwise $k_0$ is determined by the scheduling delay field ($I_{Delay}$) according to Table 20. The value of $R_{m,ax}$ is according to Subclause 16.6 in 3GPP 36.213 for the corresponding DCI format N1.

Table 20 shows an example of k0 for DCI format N1.

TABLE 20

| | $k_0$ | |
|---|---|---|
| $I_{Delay}$ | $R_{max} < 128$ | $R_{max} \geq 128$ |
| 0 | 0 | 0 |
| 1 | 4 | 16 |
| 2 | 8 | 32 |
| 3 | 12 | 64 |
| 4 | 16 | 128 |
| 5 | 32 | 256 |
| 6 | 64 | 512 |
| 7 | 128 | 1024 |

Table 21 shows an example of k_0 for DCI format N1 with DCI CRC scrambled by G-RNTI.

TABLE 21

| $I_{Delay}$ | $k_0$ |
|---|---|
| 0 | 0 |
| 1 | 4 |
| 2 | 8 |
| 3 | 12 |
| 4 | 16 |
| 5 | 32 |
| 6 | 64 |
| 7 | 128 |

A UE is not expected to receive transmissions in 3 DL subframes following the end of a NPUSCH transmission by the UE.

The resource allocation information in DCI format N1, N2 (paging) for NPDSCH indicates to a scheduled UE Table 22 shows an example of the number of subframes for NPDSCH. A number of subframes ($N_{SF}$) determined by the resource assignment field ($I_{SF}$) in the corresponding DCI according to Table 22.

A repetition number ($N_{Rep}$) determined by the repetition number field ($I_{Rep}$) in the corresponding DCI according to Table 23.

TABLE 22

| $I_{SF}$ | $N_{SF}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

Table 23 shows an example of the number of repetitions for NPDSCH.

TABLE 23

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |
| 8 | 192 |
| 9 | 256 |
| 10 | 384 |
| 11 | 512 |
| 12 | 768 |
| 13 | 1024 |
| 14 | 1536 |
| 15 | 2048 |

The number of repetitions for the NPDSCH carrying SystemInformationBlockType1-NB is determined based on the parameter schedulingInfoSIB1 configured by higher-layers and according to Table 24.

Table 24 shows an example of the number of repetitions for SIB1-NB.

TABLE 24

| Value of schedulingInfoSIB1 | Number of NPDSCH repetitions |
|---|---|
| 0 | 4 |
| 1 | 8 |
| 2 | 16 |
| 3 | 4 |
| 4 | 8 |
| 5 | 16 |
| 6 | 4 |
| 7 | 8 |
| 8 | 16 |
| 9 | 4 |
| 10 | 8 |
| 11 | 16 |
| 12-15 | Reserved |

The starting radio frame for the first transmission of the NPDSCH carrying SystemInformationBlockType1-NB is determined according to Table 25.

Table 25 shows an example of a start radio frame for the first transmission of the NPDSCH carrying SIB1-NB.

TABLE 25

| Number of NPDSCH repetitions | $N_{ID}^{Ncell}$ | Starting radio frame number for NB-SIB1 repetitions (nf mod 256) |
|---|---|---|
| 4 | $N_{ID}^{Ncell}$ mod 4 = 0 | 0 |
|  | $N_{ID}^{Ncell}$ mod 4 = 1 | 16 |
|  | $N_{ID}^{Ncell}$ mod 4 = 2 | 32 |
|  | $N_{ID}^{Ncell}$ mod 4 = 3 | 48 |
| 8 | $N_{ID}^{Ncell}$ mod 2 = 0 | 0 |
|  | $N_{ID}^{Ncell}$ mod 2 = 1 | 16 |
| 16 | $N_{ID}^{Ncell}$ mod 2 = 0 | 0 |
|  | $N_{ID}^{Ncell}$ mod 2 = 1 | 1 |

The starting OFDM symbol for NPDSCH is given by index $l_{DataStrart}$ in the first slot in a subframe k and is determined as follows
    if subframe k is a subframe used for receiving SIB1-NB,
        $l_{DataStrart}=3$ if the value of the higher layer parameter operationModeInfo is set to '00' or '01'
        $l_{DataStrart}=0$ otherwise
    else
        $l_{DataStrart}$ is given by the higher layer parameter eutraControlRegionSize if the value of the higher layer parameter eutraControlRegionSize is present
        $l_{DataStrart}=0$ otherwise UE Procedure for Reporting ACK/NACK The UE shall upon detection of a NPDSCH transmission ending in NB-IoT subframe n intended for the UE and for which an ACK/NACK shall be provided, start, at the end of $n+k_0-1$ DL subframe transmission of the NPUSCH carrying ACK/NACK response using NPUSCH format 2 in N consecutive NB-IoT UL slots, where $N=N_{Rep}^{AN} N_{slots}^{UL}$, where the value of $N_{Rep}^{AN}$ is given by the higher layer parameter ack-NACK-NumRepetitions-Msg4 configured for the associated NPRACH resource for Msg4 NPDSCH transmission, and higher layer parameter ack-NACK-Num-Repetitions otherwise, and the value of $N_{slots}^{UL}$ is the number of slots of the resource unit,
    allocated subcarrier for ACK/NACK and value of k0 is determined by the ACK/NACK resource field in the DCI format of the corresponding NPDCCH according to Table 16.4.2-1, and Table 16.4.2-2 in 3GPP TS36.213.

Narrowband Physical Broadcast Channel (NPBCH)

The processing structure for the BCH transport channel is according to Section 5.3.1 of 3GPP TS 36.212, with the following differences:
    The transmission time interval (TTI) is 640 ms.
    The size of the BCH transport block is set to 34 bits
    The CRC mask for NPBCH is selected according to 1 or 2 transmit antenna ports at eNodeB according to Table 5.3.1.1-1 of 3GPP TS 36.212, where the transmit antenna ports are defined in section 10.2.6 of 3GPP TS 36.211
    The number of rate matched bits is defined in section 10.2.4.1 of 3GPP TS 36.211

Scrambling shall be done according to clause 6.6.1 of 3GPP TS 36.211 with $M_{bit}$ denoting the number of bits to be transmitted on the NPBCH. $M_{bit}$ equals 1600 for normal cyclic prefix. The scrambling sequence shall be initialized with $c_{init}=N_{ID}^{Ncell}$ in radio frames fulfilling $n_f$ mod 64=0.

Modulation should be done using QPSK modulation scheme for each antenna port is transmitted in subframe 0 during 64 consecutive radio frames starting in each radio frame fulfilling $n_f$ mod 64=0 and shall Layer mapping and precoding shall be done according to clause 6.6.3 of 3GPP TS 36.211 with P∈{1, 2}. The UE shall assume antenna ports $R_{2000}$ and $R_{2001}$ are used for the transmission of the narrowband physical broadcast channel.

The block of complex-valued symbols $y^{(p)}(0), \ldots, y^{(p)}(M_{symb}-1)$ for each antenna port is transmitted in subframe 0 during 64 consecutive radio frames starting in each radio frame fulfilling $n_f \bmod 64=0$ and shall be mapped in sequence starting consecutive radio frames starting with y(0) to resource elements (k, l) not reserved for transmission of reference signals shall be in increasing order of the first the index k, then the index l. After mapping to a subframe, the subframe shall be repeated in subframe 0 in the 7 following radio frames, before continuing the mapping of $y^{(p)}(\cdot)$ to subframe 0 in the following radio frame. The first three OFDM symbols in a subframe shall not be used in the mapping process. For the purpose of the mapping, the UE shall assume cell-specific reference signals for antenna ports 0-3 and narrowband reference signals for antenna ports 2000 and 2001 being present irrespective of the actual configuration. The frequency shift of the cell-specific reference signals shall be calculated by replacing cell $N_{ID}^{cell}$ with $N_{ID}^{Ncell}$ in the calculation of $v_{shift}$ in clause 6.10.1.2 of 3GPP TS 36.211.

Narrowband Physical Downlink Control Channel (NPDCCH)

The narrowband physical downlink control channel carries control information. A narrowband physical control channel is transmitted on an aggregation of one or two consecutive narrowband control channel elements (NCCEs), where a narrowband control channel element corresponds to 6 consecutive subcarriers in a subframe where NCCE 0 occupies subcarriers 0 through 5 and NCCE 1 occupies subcarriers 6 through 11. The NPDCCH supports multiple formats as listed in Table 26. For NPDCCH format 1, both NCCEs belong to the same subframe. One or two NPDCCHs can be transmitted in a subframe.

Table 26 shows an example of supported NPDCCH formats.

TABLE 26

| NPDCCH format | Number of NCCEs |
|---|---|
| 0 | 1 |
| 1 | 2 |

Scrambling shall be done according to clause 6.8.2 of TS36.211. The scrambling sequence shall be initialized at the start of subframe $k_0$ according to section 16.6 of TS36.213 after every 4th NPDCCH subframe with $c_{init} = \lfloor n_s/2 \rfloor 2^9 + N_{ID}^{Ncell}$ where $n_s$ is the first slot of the NPDCCH subframe in which scrambling is (re-)initialized.

Modulation shall be done according to clause 6.8.3 of TS36.211 using the QPSK modulation scheme.

Layer mapping and precoding shall be done according to clause 6.6.3 of TS36.211 using the same antenna ports as the NPBCH.

The block of complex-valued symbols $y(0), \ldots y(M_{symb}-1)$ shall be mapped in sequence starting with y(0) to resource elements (k, l) on the associated antenna port which meet all of the following criteria:
   they are part of the NCCE(s) assigned for the NPDCCH transmission, and
   they are not used for transmission of NPBCH, NPSS, or NSSS, and
   they are assumed by the UE not to be used for NRS, and
   they are not overlapping with resource elements used for PBCH, PSS, SSS, or CRS as defined in clause 6 of TS36.211 (if any), and
   the index l in the first slot in a subframe fulfils $l \geq l_{NPDCCHStart}$ where $l_{NPDCCHStart}$ is given by clause 16.6.1 of 3GPP TS 36.213.

The mapping to resource elements (k, l) on antenna port p meeting the criteria above shall be in increasing order of first the index k and then the index l, starting with the first slot and ending with the second slot in a subframe.

The NPDCCH transmission can be configured by higher layers with transmissions gaps where the NPDCCH transmission is postponed. The configuration is the same as described for NPDSCH in clause 10.2.3.4 of TS36.211.

The UE shall not expect NPDCCH in subframe i if it is not a NB-IoT downlink subframe. In case of NPDCCH transmissions, in subframes that are not NB-IoT downlink subframes, the NPDCCH transmission is postponed until the next NB-IoT downlink subframe.

DCI Format

DCI Format N0

DCI format N0 is used for the scheduling of NPUSCH in one UL cell. The following information is transmitted by means of the DCI format N0:

Flag for format N0/format N1 differentiation (1 bit), Subcarrier indication (6 bits), Resource assignment (3 bits), Scheduling delay (2 bits), Modulation and coding scheme (4 bits), Redundancy version (1 bit), Repetition number (3 bits), New data indicator (1 bit), DCI subframe repetition number (2 bits)

DCI Format N1

DCI format N1 is used for the scheduling of one NPDSCH codeword in one cell and random access procedure initiated by a NPDCCH order. The DCI corresponding to a NPDCCH order is carried by NPDCCH. The following information is transmitted by means of the DCI format N1:

Flag for format N0/format N1 differentiation (1 bit), NPDCCH order indicator (1 bit)

Format N1 is used for random access procedure initiated by a NPDCCH order only if NPDCCH order indicator is set to "1", format N1 CRC is scrambled with C-RNTI, and all the remaining fields are set as follows:
   Starting number of NPRACH repetitions (2 bits), Subcarrier indication of NPRACH (6 bits), All the remaining bits in format N1 are set to one.
   Otherwise,
   Scheduling delay (3 bits), Resource assignment (3 bits), Modulation and coding scheme (4 bits), Repetition number (4 bits), New data indicator (1 bit), HARQ-ACK resource (4 bits), DCI subframe repetition number (2 bits)

When the format N1 CRC is scrambled with a RA-RNTI, then the following fields among the fields above are reserved:

New data indicator, HARQ-ACK resource

If the number of information bits in format N1 is less than that of format N0, zeros shall be appended to format N1 until the payload size equals that of format N0.

DCI Format N2

DCI format N2 is used for paging and direct indication. The following information is transmitted by means of the DCI format N2.

Flag for paging/direct indication differentiation (1 bit)
If Flag=0:
   Direct Indication information (8 bits), Reserved information bits are added until the size is equal to that of format N2 with Flag=1

If Flag=1:
Resource assignment (3 bits), Modulation and coding scheme (4 bits), Repetition number (4 bits), DCI subframe repetition number (3 bits)

NPDCCH Related Procedure

A UE shall monitor a set of NPDCCH candidates as configured by higher layer signalling for control information, where monitoring implies attempting to decode each of the NPDCCHs in the set according to all the monitored DCI formats.

An NPDCCH search space $NS_k^{(L',R)}$ at aggregation level $L' \in \{1, 2\}$ and repetition level $R \in \{1, 2, 4, 8, 16, 32, 64, 128, 256, 512, 1024, 2048\}$ is defined by a set of NPDCCH candidates where each candidate is repeated in a set of R consecutive NB-IoT downlink subframes excluding subframes used for transmission of SI messages starting with subframe k.

The locations of starting subframe k are given by $k=k_b$, where $k_b$ is the $b^{th}$ consecutive NB-IoT DL subframe from subframe k0, excluding subframes used for transmission of SI messages, and $b=u \cdot R$, and $u=0, 1, \ldots,$ $$\frac{R_{max}}{R} - 1,$$

and where subframe k0 is a subframe satisfying the condition $(10n_f + \lfloor n_s/2 \rfloor) \bmod T = \lfloor \alpha_{offset} \cdot T \rfloor$, where $T = R_{max} \cdot G$, $T \geq 4$. G and $\alpha_{offset}$ are given by the higher layer parameters.

For Type1-NPDCCH common search space, k=k0 and is determined from locations of NB-IoT paging opportunity subframes.

If the UE is configured by high layers with a NB-IoT carrier for monitoring of NPDCCH UE-specific search space,
the UE shall monitor the NPDCCH UE-specific search space on the higher layer configured NB-IoT carrier,
the UE is not expected to receive NPSS, NSSS, NPBCH on the higher layer configured NB-IoT carrier.
otherwise,
the UE shall monitor the NPDCCH UE-specific search space on the same NB-IoT carrier on which NPSS/NSSS/NPBCH are detected.

The starting OFDM symbol for NPDCCH given by index $l_{NPDCCHStart}$ in the first slot in a subframe k and is determined as follows
if higher layer parameter eutraControlRegionSize is present
$l_{NPDCCHStart}$ is given by the higher layer parameter eutraControlRegionSize
Otherwise, $l_{NPDCCHStart} = 0$ Narrowband Reference Signal (NRS)

Before a UE obtains operationModeInfo, the UE may assume narrowband reference signals are transmitted in subframes #0 and #4 and in subframes #9 not containing NSSS.

When UE receives higher-layer parameter operationModeInfo indicating guardband or standalone, Before the UE obtains SystemInformationBlockType1-NB, the UE may assume narrowband reference signals are transmitted in subframes #0, #1, #3, #4 and in subframes #9 not containing NSSS.

After the UE obtains SystemInformationBlockType1-NB, the UE may assume narrowband reference signals are transmitted in subframes #0, #1, #3, #4, subframes #9 not containing NSSS, and in NB-IoT downlink subframes and shall not expect narrowband reference signals in other downlink subframes.

When UE receives higher-layer parameter operationModeInfo indicating inband-SamePCI or inband-DifferentPCI, Before the UE obtains SystemInformationBlockType1-NB, the UE may assume narrowband reference signals are transmitted in subframes #0, #4 and in subframes #9 not containing NSSS.

After the UE obtains SystemInformationBlockType1-NB, the UE may assume narrowband reference signals are transmitted in subframes #0, #4, subframes #9 not containing NSSS, and in NB-IoT downlink subframes and shall not expect narrowband reference signals in other downlink subframes.

Narrowband Primary Synchronization Signal (NPSS)

The sequence $d_l(n)$ used for the narrowband primary synchronization signal is generated from a frequency-domain Zadoff-Chu sequence according to Equation 17 below.

$$d_l(n) = S(l) \cdot e^{-j\frac{\pi u n(n+1)}{11}}, n = 0, 1, \ldots, 10 \quad \text{(Equation 17)}$$

where the Zadoff-Chu root sequence index u=5 and S(l) for different symbol indices l is given by Table 27.

Table 27 shows an example of S(l).

TABLE 27

| Cyclic prefix length | S(3), ..., S(13) | | | | | | | | | | |
|---|---|---|---|---|---|---|---|---|---|---|---|
| Normal | 1 | 1 | 1 | 1 | −1 | −1 | 1 | 1 | 1 | −1 | 1 |

The same antenna port shall be used for all symbols of the narrowband primary synchronization signal within a subframe.

UE shall not assume that the narrowband primary synchronization signal is transmitted on the same antenna port as any of the downlink reference signals. The UE shall not assume that the transmissions of the narrowband primary synchronization signal in a given subframe use the same antenna port, or ports, as the narrowband primary synchronization signal in any other subframe.

The sequences $d_l(n)$ shall be mapped to resource elements (k, l) in increasing order of first the index k=0, 1, ..., $N_{sc}^{RB}-2$ and then the index l=3, 4, ..., $2N_{symb}^{DL}-1$ in subframe 5 in every radio frame. For resource elements (k, l) overlapping with resource elements where cell-specific reference signals are transmitted, the corresponding sequence element d(n) is not used for the NPSS but counted in the mapping process.

Narrowband Secondary Synchronization Signals (NSSS)

The sequence d(n) used for the narrowband secondary synchronization signal is generated from a frequency-domain Zadoff-Chu sequence according to Equation 18 below.

$$d(n) = b_q(n) \cdot e^{-j2\pi\theta_f n} \cdot e^{-j\frac{\pi u n'(n'+1)}{131}} \quad \text{(Equation 18)}$$

where $n = 0, 1, \ldots, 131$ $n' = n \bmod 131$ $m = n \bmod 128$

-continued $$u = N_{ID}^{Ncell} \bmod 126 + 3$$

$$q = \left\lfloor \frac{N_{ID}^{Ncell}}{126} \right\rfloor$$

The binary sequence $b_q(n)$ is given by Table 28. The cyclic shift $\theta_f$ in frame number $n_f$ is given by $$\theta_f = \frac{33}{132}(n_f/2)$$

mod 4.

Table 28 shows an example of $b_q(n)$.

TABLE 28

| q | $b_q(0), \ldots, b_q(127)$ |
|---|---|
| 0 | [1 1 1 1 1 1 1 1 1 1 1 1 1 1 1 1 1 1 1 1 1 1 1 1 1 1 1 1 1 1 1 1<br>1 1 1 1 1 1 1 1 1 1 1 1 1 1 1 1 1 1 1 1 1 1 1 1 1 1 1 1 1 1 1 1<br>1 1 1 1 1 1 1 1 1 1 1 1 1 1 1 1 1 1 1 1 1 1 1 1 1 1 1 1 1 1 1 1<br>1 1 1 1 1 1 1 1 1 1 1 1] |
| 1 | [1 −1 −1 1 −1 1 1 −1 −1 1 1 −1 1 −1 1 −1 1 1<br>−1 1 −1 1 1 1 −1 −1 1 1 −1 1 1 1 −1 1 −1 −1 1 −1 1<br>1 −1 −1 1 1 −1 1 −1 −1 1 −1 1 1 1 −1 1 −1 1 1<br>−1 −1 1 1 −1 1 1 −1 1 −1 −1 1 1 −1 1 −1 1 1 1 −1<br>1 −1 −1 1 −1 1 1 −1 1 −1 −1 1 1 −1 −1 1 1 1<br>−1 1 −1 1 1 1 −1 1 −1 −1 1 −1 −1 1 −1 1 1 −1 1<br>1 −1 1 −1 1 1 1 −1 1 1 −1 1 1 1 −1] |
| 2 | [1 −1 −1 1 −1 1 1 1 −1 −1 1 1 1 −1 1 1 −1 1 1 1<br>−1 1 −1 1 1 1 −1 1 1 −1 1 1 1 −1 1 1 −1 1<br>−1 1 1 1 −1 1 1 1 −1 1 1 −1 1 1 −1 1 1 1 −1 1<br>1 1 −1 1 1 −1 1 1 1 −1 1 −1 1 1 1 −1 1 1 1 −1<br>1 −1 1 1 −1 1 1 1 −1 1 −1 1 1 −1 1 1 1 1<br>−1 1 1 1 −1 1 1 −1 1 1 1 −1 1 1 1 −1 1 1 1<br>−1 1 1 1 1 1 −1 1 1 1 −1 1 −1 1 1] |
| 3 | [1 −1 −1 1 −1 1 1 1 −1 1 −1 1 1 1 −1 −1 1 1 1<br>−1 1 1 −1 1 1 1 −1 1 1 −1 1 1 1 −1 1 1 −1 1<br>−1 1 1 1 −1 1 1 1 −1 1 1 −1 1 1 −1 1 1 −1 1<br>1 1 −1 1 1 −1 1 1 1 −1 1 −1 1 1 1 −1 1 −1 1 1<br>−1 1 1 1 −1 1 1 −1 1 1 1 −1 1 1 1 −1 1 −1 1 1<br>1 1 −1 1 −1 1 1 1 −1 1 1 1 −1 1 1 −1 1 1 1<br>1 −1 1 −1 1 1 1 −1 1 −1 1 1 1 −1 1] |

The same antenna port shall be used for all symbols of the narrowband secondary synchronization signal within a subframe.

UE shall not assume that the narrowband secondary synchronization signal is transmitted on the same antenna port as any of the downlink reference signals. The UE shall not assume that the transmissions of the narrowband secondary synchronization signal in a given subframe use the same antenna port, or ports, as the narrowband secondary synchronization signal in any other subframe.

The sequence d(n) shall be mapped to resource elements (k, l) in sequence starting with d(0) in increasing order of the first the index k over the 12 assigned subcarriers and then the index l over the assigned last $N_{symb}^{NSSS}$ symbols of subframe 9 in radio frames fulfilling $n_f \bmod 2=0$, where $N_{symb}^{NSSS}$ is given by Table 29.

Table 29 shows an example of the number of NSSS symbols.

TABLE 29

| Cyclic prefic length | $N_{symb}^{NSSS}$ |
|---|---|
| Normal | 11 |

OFDM Baseband Signal Generation

If the higher layer parameter operationModeInfo does not indicate 'inband-SamePCI' and samePCI-Indicator does not indicate 'samePCI', then the time-continuous signal $s_l^{(p)}(t)$ on antenna port p in OFDM symbol l in a downlink slot is defined by Equation 19 below.

$$s_l^{(p)}(t) = \sum_{k=-\lfloor N_{sc}^{RB}/2 \rfloor}^{\lceil N_{sc}^{RB}/2 \rceil - 1} a_{k(-),l}^{(p)} \cdot e^{j2\pi(k+\frac{1}{2})\Delta f(t-N_{CP,i}T_s)} \quad \text{(Equation 19)}$$

for $0 \leq t < (N_{CP,i}+N) \times T_s$ where $k^{(-)}=k+\lfloor N_{sc}^{RB}/2 \rfloor$, N=2048, $\Delta f$=15 kHz and $a_{k,l}^{(p)}$ is the content of resource element (k, l) on antenna port p.

If the higher layer parameter operationModeInfo indicates 'inband-SamePCI' or samePCI-Indicator indicate 'samePCI', then the time-continuous signal $s_{l'}^{(p)}(t)$ on antenna port p in OFDM symbol l', where $l'=l+N_{symb}^{DL}(n_s \bmod 4) \in \{0, \ldots, 27\}$ is the OFDM symbol index from the start of the last even-numbered subframe, is defined by Equation 20 below.

$$s_{l'}^{(p)}(t) = \qquad\qquad\qquad\qquad\qquad \text{(Equation 20)}$$

$$\sum_{k=-\lfloor N_{RB}^{DL} N_{sc}^{RB}/2 \rfloor}^{-1} e^{\theta_{k^{(-)}}} a_{k^{(-)},l}^{(p)} \cdot e^{j2\pi k \Delta f \left(t-N_{CP,l'\bmod N_{symb}^{DL}} T_s\right)} +$$

$$\sum_{k=1}^{\lceil N_{RB}^{DL} N_{sc}^{RB}/2 \rceil} e^{\theta_{k^{(+)}}} a_{k^{(+)},l}^{(p)} \cdot e^{j2\pi k \Delta f \left(t-N_{CP,l'\bmod N_{symb}^{DL}} T_s\right)}$$

for $0 \leq t < (N_{CP,i}+N) \times T_s$ where $k^{(-)}=k+\lfloor N_{RB}^{DL} N_{sc}^{RB}/2 \rfloor$ and $k^{(+)}=k+\lfloor N_{RB}^{DL} N_{sc}^{RB}/2 \rfloor - 1$, $\theta_{k,l}=j2\pi f_{NB-IoT} T_s(N+\Sigma_{i=0}^{l'} N_{CP,i \bmod 7})$ if resource element (k, l') is used for Narrowband IoT, and 0 otherwise, and $f_{NB-IoT}$ is the frequency location of the carrier of the Narrowband IoT PRB minus the frequency location of the center of the LTE signal.

Only normal CP is supported for Narrowband IoT downlink in this release of the specification.

Hereinafter, the physical layer process of the narrowband physical broadcast channel (NPBCH) will be described in more detail.

Scrambling

Scrambling shall be done according to clause 6.6.1 with $M_{bit}$ denoting the number of bits to be transmitted on the NPBCH. $M_{bit}$ equals 1600 for normal cyclic prefix. The scrambling sequence shall be initialised with $c_{init} = N_{ID}^{Ncell}$ in radio frames fulfilling $n_f \bmod 64 = 0$.

Modulation

Modulation shall be done according to clause 6.6.2 using the modulation scheme in Table 10.2.4.2-1.

Table 30 shows an example of a modulation scheme for NPBCH.

TABLE 30

| Physical channel | Modulation schemes |
|---|---|
| NPBCH | QPSK |

Layer Mapping and Precoding

Layer mapping and precoding shall be done according to clause 6.6.3 with $P \in \{1, 2\}$. The UE shall assume antenna ports $R_{2000}$ and $R_{2001}$ are used for the transmission of the narrowband physical broadcast channel.

Mapping to Resource Elements

The block of complex-valued symbols $y^{(p)}(0), \ldots, y^{(p)}(M_{symb}-1)$ for each antenna port is transmitted in subframe 0 during 64 consecutive radio frames starting in each radio frame fulfilling $n_f \bmod 64 = 0$ and shall be mapped in sequence starting with $y(0)$ to resource elements (k,l). The mapping to resource elements (k,l) not reserved for transmission of reference signals shall be in increasing order of first the index k, then the index l. After mapping to a subframe, the subframe shall be repeated in subframe 0 in the 7 following radio frames, before continuing the mapping of $y^{(p)}(\bullet)$ to subframe 0 in the following radio frame. The first three OFDM symbols in a subframe shall not be used in the mapping process.

For the purpose of the mapping, the UE shall assume cell-specific reference signals for antenna ports 0-3 and narrowband reference signals for antenna ports 2000 and 2001 being present irrespective of the actual configuration. The frequency shift of the cell-specific reference signals shall be calculated by replacing $N_{ID}^{cell}$ with $N_{ID}^{Ncell}$ in the calculation of $v_{shift}$ in clause 6.10.1.2.

Next, information related to MIB-NB and SIBN1-NB will be described in more detail.

MasterInformationBlock-NB

The MasterInformationBlock-NB includes the system information transmitted on BCH.

Signalling radio bearer: N/A
RLC-SAP: TM
Logical channel: BCCH
Direction: E-UTRAN to UE Table 31 shows an example of the MasterInformationBlock-NB format.

TABLE 31

```
-- ASN1START
MasterInformationBlock-NB ::=        SEQUENCE {
    systemFrameNumber-MSB-r13           BIT STRING (SIZE (4) ),
    hyperSFN-LSB-r13                    BIT STRING (SIZE (2) ),
    schedulingInfoSIB1-r13              INTEGER (0..15),
    systemInfoValueTag-r13              INTEGER (0..31),
    ab-Enabled-r13                      BOOLEAN,
    operationModeInfo-r13               CHOICE {
        inband-SamePCI-r13                  Inband-SamePCI-NB-r13,
        inband-DifferentPCI-r13             Inband-DifferentPCI-NB-r13,
        guardband-r13                       Guardband-NB-r13,
        standalone-r13                      Standalone-NB-r13
    },
    spare                               BIT STRING (SIZE (11) )
}
ChannelRasterOffset-NB-r13 ::=       ENUMERATED {khz-7dot5, khz-2dot5, khz2dot5, khz7dot5}
Guardband-NB-r13 ::=                 SEQUENCE {
    rasterOffset-r13                    ChannelRasterOffset-NB-r13,
    spare                               BIT STRING (SIZE (3) )
}
Inband-SamePCI-NB-r13 ::=            SEQUENCE {
    eutra-CRS-SequenceInfo-r13          INTEGER (0..31)
}
Inband-DifferentPCI-NB-r13 ::=       SEQUENCE {
    eutra-NumCRS-Ports-r13              ENUMERATED {same, four},
    rasterOffset-r13                    ChannelRasterOffset-NB-r13,
    spare                               BIT STRING (SIZE (2) )
}
Standalone-NB-r13 ::=                SEQUENCE {
    spare                               BIT STRING (SIZE (5) )
}
-- ASN1STOP
```

Table 32 shows the description of the MasterInformationBlock-NB field.

TABLE 32

| MasterInformationBlock-NB field descriptions |
|---|
| ab-Enabled |
| Value TRUE indicates that access barring is enabled and that the UE shall acquire SystemInformationBlockType14-NB before initiating RRC connection establishment or resume. |
| eutra-CRS-SequenceInfo |

TABLE 32-continued

MasterInformationBlock-NB field descriptions

Information of the carrier containing NPSS/NSSS/NPBCH.
Each value is associated with an E-UTRA PRB index as an offset from the middle of the LTE system sorted out by channel raster offset.
eutra-NumCRS-Ports
Number of E-UTRA CRS antenna ports, either the same number of ports as NRS or 4 antenna ports.
hyperSFN-LSB
Indicates the 2 least significant bits of hyper SFN. The remaining bits are present in SystemInformationBlockType1-NB.
operationModeInfo
Deployment scenario (in-band/guard-band/standalone) and related information. See TS 36.211 [21] and TS 36.213 [23].
Inband-SamePCI indicates an in-band deployment and that the NB-IoT and LTE cell share the same physical cell id and have the same number of NRS and CRS ports.
Inband-DifferentPCI indicates an in-band deployment and that the NB-IoT and LTE cell have different physical cell id.
guardband indicates a guard-band deployment.
standalone indicates a standalone deployment.
rasterOffset
NB-IoT offset from LTE channel raster. Unit in kHz in set {−7.5, −2.5, 2.5, 7.5}
schedulingInfoSIB1
This field contains an index to a table specified in TS 36.213 [23, Table 16.4.1.3-3] that defines SystemInformationBlockType1-NB scheduling information.
systemFrameNumber-MSB
Defines the 4 most significant bits of the SFN. As indicated in TS 36.211 [21], the 6 least significant bits of the SFN are acquired implicitly by decoding the NPBCH.
systemInfoValueTag
Common for all SIBs other than MIB-NB, SIB14-NB and SIB16-NB.

SystemInformationBlockType1-NB

The SystemInformationBlockType1-NB message contains information relevant when evaluating if a UE is allowed to access a cell and defines the scheduling of other system information.

Signalling radio bearer: N/A
RLC-SAP: TM
Logical channel: BCCH
Direction: E-UTRAN to UE Table 33 shows an example of a SystemInformationBlockType1 (SIB1)-NB message.

TABLE 33

```
-- ASN1START
SystemInformationBlockType1-NB ::=    SEQUENCE {
    hyperSFN-MSB-r13                      BIT STRING (SIZE (8) ),
    cellAccessRelatedInfo-r13             SEQUENCE {
        plmn-IdentityList-r13                 PLMN-IdentityList-NB-r13,
        trackingAreaCode-r13                  TrackingAreaCode,
        cellIdentity-r13                      CellIdentity,
        cellBarred-r13                        ENUMERATED {barred, notBarred},
        intraFreqReselection-r13              ENUMERATED {allowed, notAllowed}
    },
    cellSelectionInfo-r13                 SEQUENCE {
        q-RxLevMin-r13                        Q-RxLevMin,
        q-QualMin-r13                         Q-QualMin-r9
    },
    p-Max-r13                             P-Max OPTIONAL, -- Need OP
    FreqBandIndicator-r13                 FreqBandIndicator-NB-r13,
    freqBandInfo-r13                      NS-PmaxList-NB-r13 OPTIONAL, -- Need OR
    multiBandInfoList-r13                 MultiBandInfoList-NB-r13 OPTIONAL, -- Need OR
    downlinkBitmap-r13                    DL-Bitmap-NB-r13 OPTIONAL, -- Need OP,
    eutraControlRegionSize-r13            ENUMERATED {n1, n2, n3} OPTIONAL, -- Cond inband
    nrs-CRS-PowerOffset-r13               ENUMERATED {dB-6, dB-4dot77, dB-3,
                                              dB-1dot77, dB0, dB1,
                                              dB1dot23, dB2, dB3,
                                              dB4, dB4dot23, dB5,
                                              dB6, dB7, dB8,
                                              dB9} OPTIONAL, -- Cond inband-SamePCI
    schedulingInfoList-r13                SchedulingInfoList-NB-r13,
    si-WindowLength-r13                   ENUMERATED {ms160, ms320, ms480, ms640,
                                              ms960, ms1280, ms1600, spare1},
    si-RadioFrameOffset-r13               INTEGER (1..15) OPTIONAL, -- Need OP
    systemInfoValueTagList-r13            SystemInfoValueTagList-NB-r13 OPTIONAL, -- Need OR
    lateNonCriticalExtension              OCTET STRING OPTIONAL,
    nonCriticalExtension                  SEQUENCE { } OPTIONAL
}
PLMN-IdentityList-NB-r13 ::=          SEQUENCE (SIZE (1. .maxPLMN-r11) ) OF PLMN-IdentityInfo-NB-r13
PLMN-IdentityInfo-NB-r13 ::=          SEQUENCE {
    plmn-Identity-r13                     PLMN-Identity,
    cellReservedForOperatorUse-r13        ENUMERATED {reserved, notReserved},
    attachWithoutPDN-Connectivity-r13     ENUMERATED {true} OPTIONAL -- Need OP
}
```

TABLE 33-continued

```
SchedulingInfoList-NB-r13 ::= SEQUENCE (SIZE (1..maxSI-Message-NB-r13) ) OF
SchedulingInfo-NB-r13
SchedulingInfo-NB-r13::=        SEQUENCE {
   si-Periodicity-r13              ENUMERATED {rf64, rf128, rf256, rf512,
                                       rf1024, rf2048, rf4096, spare},
   si-RepetitionPattern-r13        ENUMERATED {every2ndRF, every4thRF,
                                       every 8thRF, every16thRF},
   sib-MappingInfo-r13             SIB-MappingInfo-NB-r13,
   si-TB-r13       ENUMERATED {b56, b120, b208, b256, b328, b440, b552, b680}
}
SystemInfoValueTagList-NB-r13 ::=  SEQUENCE (SIZE (1.. maxSI-Message-NB-r13)) OF
                                       SystemInfoValueTagSI-r13
SIB-MappingInfo-NB-r13 ::=   SEQUENCE (SIZE (0..maxSIB-1) ) OF SIB-Type-NB-r13
SIB-Type-NB-r13 ::=          ENUMERATED {
                                 sibType3-NB-r13, sibType4-NB-r13, sibType5-NB-
r13,
                                 sibType14-NB-r13, sibType16-NB-r13, spare3,
spare2, spare1}
-- ASNISTOP
```

Table 34 shows the description of the SystemInformationBlockType1-NB field.

TABLE 34

SystemInformationBlockType1-NB field descriptions attachWithoutPDN-Connectivity
If present, the field indicates that attach without PDN connectivity as specified in TS 24.301 [35] is supported for this PLMN.
cellBarred
Barred means the cell is barred, as defined in TS 36.304 [4].
cellIdentity
Indicates the cell identity.
cellReservedForOperatorUse
As defined in TS 36.304 [4].
cellSelectionInfo
Cell selection information as specified in TS 36.304 [4].
downlinkBitmapNB-IoT downlink subframe configuration for downlink transmission.
If the bitmap is not present, the UE shall assume that all subframes are valid (except for subframes carrying NPSS/NSSS/NPBCH/SIB1-NB) as specified inTS 36.213[23].
eutraControlRegionSize
Indicates the control region size of the E-UTRA cell for the in-band operation mode. Unit is in number of OFDM symbols.
freqBandIndicator
A list of as defined in TS 36.101 [42, table 6.2.4-1] for the frequency band in freqBandIndicator.
freqBandInfo
A list of additionalPmax and additionalSpectrumEmission values as defined in TS 36.101 [42, table 6.2.4-1] for the frequency band in freqBandIndicator.
hyperSFN-MSB
Indicates the 8 most significat bits of hyper-SFN. Together with hyper-SFN-
LSB in MIB-NB, the complete hyper-SFN is built up. hyper-SFN is incremented by one when the SFN wraps around.
intraFreqReselection
Used to control cell reselection to intra-frequency cells when the highest ranked cell is barred, or treated as barred by the UE, as specified in TS 36.304 [4].
multiBandInfoList
A list of additional frequency band indicators, additionalPmax and additionalSpectrumEmission values, as defined in TS 36.101 [42, table 5.5-
1]. If the UE supports the frequency band in the freqBandIndicator IE it shall apply that frequency band. Otherwise, the UE shall apply the first listed band which it supports in the multiBandInfoList IE.
nrs-CRS-PowerOffset
NRS power offset between NRS and E-UTRA CRS. Unit in dB. Default value of 0.
plmn-IdentityList
List of PLMN identities. The first listed PLMN-Identity is the primary PLMN.

TABLE 34-continued

SystemInformationBlockType1-NB field descriptions p-Max
Value applicable for the cell. If absent the UE applies the maximum power according to the UE capability.
q-QualMin
Parameter "Qqualmin" in TS 36.304 [4].
q-RxLevMin
Parameter Qrxlevmin in TS 36.304 [4]. Actual value Qrxlevmin = IE value * 2 [dB].
schedulingInfoList
Indicates additional scheduling information of SI messages.
si-Periodicity
Periodicity of the SI-message in radio frames, such that rf256 denotes 256 radio frames, rf512 denotes 512 radio frames, and so on.
si-RadioFrameOffset
Offset in number of radio frames to calculate the start of the SI window. If the field is absent, no offset is applied.
si-RepetitionPattern
Indicates the starting radio frames within the SI window used for SI message transmission. Value every2ndRF corresponds to every second radio frame, value every4thRF corresponds to every fourth radio frame and so on starting from the first radio frame of the SI window used for SI transmission.
si-TB
This field indicates the transport block size in number of bits used to broadcast the SI message.
si-WindowLength
Common SI scheduling window for all SIs. Unit in milliseconds, where ms160 denotes 160 milliseconds, ms320 denotes 320 milliseconds and so on.
sib-MappingInfo
List of the SIBs mapped to this SystemInformation message.There is no mapping information of SIB2; it is always present in the first SystemInformation message listed in the schedulingInfoList list.
systemInfoValueTagList
Indicates SI message specific value tags. It includes the same number of entries, and listed in the same order, as in SchedulingInfoList.
systemInfoValueTagSI
SI message specific value tag as specified in Clause 5.2.1.3. Common for all SIBs within the SI message other than SIB14.
trackingAreaCode
AtrackingAreaCode that is common for all the PLMNs listed.

TABLE 35

| Conditional presence | Explanation |
| --- | --- |
| inband | The field is mandatory present if IE operationModeInfo in MIB-NB is set to inband-SamePCI or inband-DifferentPCI. Otherwise the field is not present. |

TABLE 35-continued

| Conditional presence | Explanation |
|---|---|
| inband-SamePCI | The field is mandatory present, if IE operationModeInfo in MIB-NB is set to inband-SamePCI. Otherwise the field is not present. |

NB-IoT Initial Access Procedure

In the general signal transmission/reception procedure of NB-IoT, a procedure for initial access by an NB-IoT terminal to a base station has been briefly described. Specifically, the procedure for initial access by the NB-IoT terminal to the base station may include a procedure for searching for an initial cell and a procedure for obtaining system information by the NB-IoT terminal.

In this regard, a specific signaling procedure between a terminal (UE) and a base station (e.g., NodeB, eNodeB, eNB, gNB, etc.) related to initial access of NB-IoT may be illustrated as shown in FIG. 15. Hereinafter, a general initial access procedure of NB-IoT, configuration of NPSS/NSSS, acquisition of system information (e.g., MIB, SIB, etc.) will be described in more detail with reference to FIG. 15.

FIG. 15 is an example of an initial access procedure of NB-IoT, and names of each physical channel and/or physical signal may be differently configured or referred to according to a wireless communication system to which NB-IoT is applied. As an example, basically, FIG. 15 is described in consideration of the NB-IoT based on the LTE system, but this is only for convenience of description, and it is a matter of course that the contents may be extended and applied to the NB-IoT based on the NR system.

As shown in FIG. 15, NB-IoT is based on following signals transmitted in the downlink: the first and the second narrowband synchronization signals (NPSS & NSSS). The NPSS is transmitted over 11 sub-carriers from the first subcarrier to the eleventh subcarrier in the sixth subframe of each frame (S110), and the NSSS is transmitted over 12 sub-carriers in the NB-IoT carrier in the tenth subframe for FDD and the first subframe for TDD of every other frame (S120).

The NB-IoT UE may receive MasterInformationBlock-NB (MIB-NB) on NPBCH (NB Physical Broadcast Channel) (S130).

The MIB-NB uses a fixed schedule with a periodicity of 640 ms and repetitions made within 640 ms. The first transmission of the MIB-NB is scheduled in subframe #0 of radio frames for which the SFN mod 64=0 and repetitions are scheduled in subframe #0 of all other radio frames. The transmissions are arranged in 8 independently decodable blocks of 80 ms duration.

Then, the UE may receive SystemInformationBlock-Type1-NB (SIB1-NB) on PDSCH (S140).

The SIB1-NB uses a fixed schedule with a periodicity of 2560 ms. SIB1-NB transmission occurs in subframe #4 of every other frame in 16 continuous frames. The starting frame for the first transmission of the SIB1-NB is derived from the cell PCID and the number of repetitions within the 2560 ms period and repetitions are made, equally spaced, within the 2560 ms period. TBS for SystemInformation-BlockType1-NB and the repetitions made within the 2560 ms are indicated by schedulingInfoSIB1 field in the MIB-NB.

The SI messages are transmitted within periodically occurring time domain windows (referred to as SI-windows) using scheduling information provided in SystemInformationBlockType1-NB. Each SI message is associated with a SI-window and the SI-windows of different SI messages do not overlap. That is, within one SI-window only the corresponding SI is transmitted. The length of the SI-window is common for all SI messages, and is configurable.

Within the SI-window, the corresponding SI message can be transmitted a number of times over 2 or 8 consecutive NB-IoT downlink subframes depending on TBS. The UE acquires the detailed time/frequency domain scheduling information and other information, e.g. used transport format for the SI messages from schedulingInfoList field in SystemInformationBlockType1-NB. The UE is not required to accumulate several SI messages in parallel but may need to accumulate a SI message across multiple SI windows, depending on coverage condition.

SystemInformationBlockType1-NB configures the SI-window length and the transmission periodicity for all SI messages.

Further, the UE may receive SystemInformationBlock-Type2-NB (SIB2-NB) on PDSCH for additional information (S150).

On the other hand, NRS in FIG. 15 refers to Narrowband reference signal.

Random Access Procedure of NB-IoT

In the general signal transmission/reception procedure of NB-IoT, a procedure for randomly accessing a base station by an NB-IoT terminal has been briefly described. Specifically, a procedure in which the NB-IoT terminal randomly accesses the base station may be performed through a procedure in which the NB-IoT terminal transmits a preamble to the base station and receives a response thereto.

In this regard, a specific signaling procedure between a terminal (UE and a base station (e.g., NodeB, eNodeB, eNB, gNB, etc.) related to random access of NB-IoT may be illustrated as shown in FIG. 16. Hereinafter, detailed contents of a random access procedure based on messages (e.g., msg1, msg2, msg3, msg4) used for a general random access procedure of NB-IoT will be described through the description of FIG. 16.

FIG. 16 is an example of an NB-IoT random access procedure, and names of each physical channel, each physical signal, and/or each message may be differently configured or referred to according to a wireless communication system to which NB-IoT is applied. As an example, basically, FIG. 16 is described in consideration of the NB-IoT based on the LTE system, but this is only for convenience of description, and it is a matter of course that the contents may be extended and applied to the NB-IoT based on the NR system.

As shown in FIG. 16, in the case of NB-IoT, the RACH procedure has the same message flow as LTE having different parameters.

Hereinafter, the NPRACH transmitted from the NB-IoT terminal to the base station in relation to the NB-IoT random access procedure will be described in detail.

The physical layer random access preamble is based on a single subcarrier frequency hopping symbol group.

FIG. 17 illustrates the structure of a random access symbol group.

As shown in FIG. 17, a random access symbol group consists of a sequence of identical symbols with a cyclic prefix of length and a total length. The total number of symbol groups in the preamble repetition unit is denoted by P. The number of time-continuous symbol groups is given by G.

The parameter values of frame structures 1 and 2 are shown in Tables 36 and 37, respectively.

TABLE 36

| Preamble format | G | P | N | $T_{CP}$ | $T_{SEQ}$ |
|---|---|---|---|---|---|
| 0 | 4 | 4 | 5 | $2048T_S$ | $5 \cdot 8192\ T_S$ |
| 1 | 4 | 4 | 5 | $8192T_S$ | $5 \cdot 8192\ T_S$ |
| 2 | 6 | 6 | 3 | $24576T_S$ | $3 \cdot 24576T_S$ |

TABLE 37

| Preamble format | Supported uplink-downlink configurations | G | P | N | $T_{CP}$ | $T_{SEQ}$ |
|---|---|---|---|---|---|---|
| 0 | 1, 2, 3, 4, 5 | 2 | 4 | 1 | $4778T_s$ | $1 \cdot 819T_s$ |
| 1 | 1, 4 | 2 | 4 | 2 | $8192T_s$ | $2 \cdot 819T_s$ |
| 2 | 3 | 2 | 4 | 4 | $8192T_s$ | $4 \cdot 819T_s$ |
| 0-a | 1, 2, 3, 4, 5 | 3 | 6 | 1 | $1536T_s$ | $1 \cdot 819T_s$ |
| 1-a | 1, 4 | 3 | 6 | 2 | $3072T_s$ | $2 \cdot 819T_s$ |

Transmission of the random access preamble is limited to specific time and frequency resources when triggered by the MAC layer. Each NPRACH resource configuration can configure up to three NPRACH resource configurations in cells corresponding to different coverage levels. NPRACH resource configuration is given by periodicity, number of repetitions, start time, frequency position, and number of subcarriers.

Machine Type Communication (MTC)

MTC (Machine Type Communication) is an application that does not require a large throughput that can be applied to M2M (Machine-to-Machine) or IoT (Internet-of-Things), and refers to the communication technology adopted to meet the requirements of an IoT service in 3GPP.

The MTC may be implemented to satisfy the criteria of (i) low cost & low complexity, (ii) enhanced coverage, and (iii) low power consumption.

In 3GPP, MTC has been applied from release 10, and briefly looks at the features of MTC added for each release of 3GPP.

First, the MTC described in 3GPP release 10 and release 11 relates to a load control method.

The load control method is to prevent IoT (or M2M) devices from suddenly loading the base station.

More specifically, in the case of release 10, the load control method relates to a method of controlling the load by disconnecting the connection to the connected IoT devices when a load occurs in the base station, and in the case of release 11, the load control method relates to a method of blocking access to a terminal in advance by a base station notifying the terminal to access later through broadcasting such as SIB14.

In the case of Release 12, features for low cost MTC were added, and for this purpose, UE category 0 was newly defined. UE category is an indicator of how much data a terminal can process in a communication modem.

That is, a UE of UE category 0 reduces the baseband and RF complexity of the UE by using a half duplex operation with a reduced peak data rate, relaxed RF requirements, and a single receiving antenna.

In Release 13, a technology called eMTC (enhanced MTC) was introduced, and by operating only at 1.08 MHz, which is the minimum frequency bandwidth supported by legacy LTE, the price and power consumption can be further reduced.

The contents described below are mainly eMTC-related features, but can be equally applied to MTC, eMTC, and MTC applied to 5G (or NR) unless otherwise specified. Hereinafter, for convenience of description, it will be collectively referred to as MTC.

Therefore, the MTC to be described later may be referred to as eMTC (enhanced MTC), LTE-M1/M2, BL (Bandwidth reduced low complexity)/CE (coverage enhanced), non-BL UE (in enhanced coverage), NR MTC, enhanced BL/CE, etc. as well. That is, the term MTC can be replaced with a term to be defined in the future 3GPP standard.

MTC General Characteristics (1) MTC operates only in a specific system bandwidth (or channel bandwidth).

A specific system bandwidth may use 6RB of legacy LTE as shown in Table 38 below, and may be defined in consideration of the frequency range and subcarrier spacing (SCS) of the NR defined in Tables 39 to 41. The specific system bandwidth may be expressed as a narrowband (NB). For reference, Legacy LTE refers to a part described in 3GPP standards other than MTC. Preferably, in the NR, the MTC may operate using RBs corresponding to the lowest system bandwidth of Tables 40 and 41 below, as in legacy LTE. Alternatively, in NR, the MTC may operate in at least one bandwidth part (BWP) or may operate in a specific band of the BWP.

TABLE 38

| Channel bandwidth [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

TABLE 39

| Frequency range designation | Corresponding frequency range |
|---|---|
| FR1 | 450 MHz-6000 MHz |
| FR2 | 24250 MHz-52600 MHz |

Table 40 is a table showing an example of the maximum transmission bandwidth configuration (NRB) for the channel bandwidth and SCS in FR 1 of the NR.

TABLE 40

| SCS (kHz) | 5 MHz NRB | 10 MHz NRB | 15 MHz NRB | 20 MHz NRB | 25 MHz NRB | 30 MHz NRB | 40 MHz NRB | 50 MHz NRB | 60 MHz NRB | 80 MHz NRB | 90 MHz NRB | 100 MHz NRB |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

Table 41 is a table showing an example of the maximum transmission bandwidth configuration (NRB) for the channel bandwidth and SCS in FR 2 of the NR.

TABLE 41

| SCS (kHz) | 50 MHz NRB | 100 MHz NRB | 200 MHz NRB | 400 MHz NRB |
|---|---|---|---|---|
| 60 | 66 | 132 | 264 | N.A |
| 120 | 32 | 66 | 132 | 264 |

The MTC narrowband (NB) will be described in more detail.

MTC follows a narrowband operation to transmit and receive physical channels and signals, and the maximum channel bandwidth is reduced to 1.08 MHz or 6 (LTE) RBs.

The narrowband may be used as a reference unit for resource allocation units of some channels of downlink and uplink, and the physical location of each narrowband in the frequency domain may be defined differently according to system bandwidth.

The bandwidth of 1.08 MHz defined in MTC is defined in order for the MTC terminal to follow the same cell search (cell search) and random access procedure as the legacy terminal.

MTC can be supported by cells with a much larger bandwidth (e.g., 10 MHz) than 1.08 MHz, but physical channels and signals transmitted/received by MTC are always limited to 1.08 MHz.

The system having a much larger bandwidth may be a legacy LTE, NR system, 5G system, and the like.

Narrowband is defined as 6 non-overlapping consecutive physical resource blocks in the frequency domain.

If $N_{NB}^{UL} \geq 4$, the wideband is defined as 4 non-overlapping narrowbands in the frequency domain. If $N_{NB}^{UL} < 4$, $N_{WB}^{UL} = 1$ and a single wideband are composed of $N_{NB}^{UL}$ non-overlapping narrowband(s).

For example, in the case of a 10 MHz channel (50 RBs), 8 non-overlapping narrowbands are defined.

FIG. 18(a) is a diagram illustrating an example of a narrowband operation, and FIG. 18(b) is a diagram illustrating an example of repetition with RF retuning.

With reference to FIG. 18(b), frequency diversity by RF retuning will be described.

Due to the narrowband RF, single antenna and limited mobility, MTC supports limited frequency, spatial and temporal diversity. To reduce the effects of fading and outage, frequency hopping is supported between different narrowbands by RF retuning.

This frequency hopping is applied to different uplink and downlink physical channels when repetition is possible.

For example, when 32 subframes are used for PDSCH transmission, the first 16 subframes may be transmitted on the first narrowband. At this time, the RF front-end is retuned to another narrowband, and the remaining 16 subframes are transmitted on the second narrowband.

The narrowband of the MTC may be configured by system information or downlink control information (DCI).

(2) MTC operates in half duplex mode and uses a limited (or reduced) maximum transmit power.

(3) MTC does not use a channel (defined in legacy LTE or NR) that should be distributed over the entire system bandwidth of legacy LTE or NR.

For example, legacy LTE channels not used for MTC are PCFICH, PHICH, and PDCCH.

Accordingly, the MTC cannot monitor the above channels and thus defines a new control channel, MPDCCH (MTC PDCCH).

The MPDCCH spans up to 6RBs in the frequency domain and one subframe in the time domain.

MPDCCH is similar to EPDCCH, and additionally supports common search space for paging and random access.

The MPDCCH is similar to the concept of E-PDCCH used in legacy LTE.

(4) MTC uses a newly defined DCI format, and may be DCI formats 6-0A, 6-0B, 6-1A, 6-1 B, 6-2, etc. as an example.

(5) MTC is a PBCH (physical broadcast channel), PRACH (physical random access channel), M-PDCCH (MTC physical downlink control channel), PDSCH (physical downlink shared channel), PUCCH (physical uplink control channel), PUSCH (physical uplink shared channel) can be repeatedly transmitted. Due to such MTC repetition transmission, even when the signal quality or power is very poor, such as in a poor environment such as a basement, the MTC channel can be decoded, resulting in an increase in cell radius and a signal penetration effect. The MTC may support only a limited number of transmission modes (TM) that can operate in a single layer (or single antenna), or can support a channel or a reference signal (RS) that can operate in a single layer. For example, the transmission mode in which the MTC can operate may be TM 1, 2, 6 or 9.

(6) HARQ retransmission of MTC is adaptive and asynchronous, and is based on a new scheduling assignment received on the MPDCCH.

(7) In MTC, PDSCH scheduling (DCI) and PDSCH transmission occur in different subframes (cross subframe scheduling).

(8) All resource allocation information (subframe, transport block size (TBS), subband index) for SIB1 decoding is determined by parameters of MIB, and no control channel is used for SIB1 decoding of MTC.

(9) All resource allocation information (subframe, TBS, subband index) for SIB2 decoding is determined by several SIB1 parameters, and no control channel for SIB2 decoding of MTC is used.

(10) MTC supports extended paging (DRX) cycle.

(11) The MTC can use the same primary synchronization signal (PSS)/secondary synchronization signal (SSS)/common reference signal (CRS) used in legacy LTE or NR. In the case of NR, PSS/SSS is transmitted in units of SS blocks (or SS/PBCH blocks or SSBs), and TRS (tracking RS) can be used for the same purpose as CRS. That is, the TRS is a cell-specific RS and may be used for frequency/time tracking.

MTC Operating Mode and Level

Next, the MTC operation mode and level will be described. MTC is classified into two operation modes (first mode and second mode) and four different levels for coverage enhancement, and may be as shown in Table 42 below.

The MTC operation mode is referred to as CE Mode. In this case, the first mode may be referred to as CE Mode A and the second mode may be referred to as CE Mode B.

TABLE 42

| Mode | Level | Description |
|---|---|---|
| Mode A | Level 1 | No repetition for PRACH |
| | Level 2 | Small Number of Repetition for PRACH |

TABLE 42-continued

| Mode | Level | Description |
| --- | --- | --- |
| Mode B | Level 3 | Medium Number of Repetition for PRACH |
| | Level 4 | Large Number of Repetition for PRACH |

The first mode is defined to improve small coverage in which complete mobility and channel state information (CSI) feedback are supported, and thus, there is no repetition or the number of repetitions is small. The operation of the first mode may be the same as the operation range of UE category 1. The second mode is defined for UEs with extremely poor coverage conditions supporting CSI feedback and limited mobility, and a large number of repetitive transmissions are defined. The second mode provides up to 15 dB of coverage enhancement based on the range of UE category 1. Each level of MTC is defined differently in RACH and paging procedure.

It looks at the MTC operation mode and how each level is determined.

The MTC operation mode is determined by the base station, and each level is determined by the MTC terminal. Specifically, the base station transmits RRC signaling including information on the MTC operation mode to the terminal.

Here, RRC signaling may be an RRC connection setup message, an RRC connection reconfiguration message, or an RRC connection reestablishment message. Here, the term of the message may be expressed as an information element (IE).

Thereafter, the MTC terminal determines a level within each operation mode and transmits the determined level to the base station. Specifically, the MTC terminal determines the level in the operation mode based on the measured channel quality (e.g., RSRP, RSRQ, or SINR), and informs the determined level to the base station using PRACH resources (frequency, time, preamble) corresponding to the determined level.

MTC Guard Period

As described above, MTC operates in the narrowband. The position of the narrowband may be different for each specific time unit (e.g., subframe or slot). The MTC terminal tunes to a different frequency in all time units. Therefore, a certain time is required for all frequency retuning, and this certain time is defined as the guard period of the MTC. That is, the guard period is required when transitioning from one time unit to the next time unit, and transmission and reception do not occur during the period.

The guard period is defined differently depending on whether it is a downlink or an uplink, and is defined differently according to a downlink or uplink situation. First, the guard period defined in the uplink is defined differently according to the characteristics of data carried by the first time unit (time unit N) and the second time unit (time unit N+1). Next, the guard period of the downlink requires a condition that (1) the first downlink narrowband center frequency and the second narrowband center frequency are different, and (2) in TDD, the first uplink narrowband center frequency and the second downlink narrowband center frequency are different.

The MTC guard period defined in Legacy LTE is described, and guard periods of $N_{symb}^{retune}$ SC-FDMA symbols are generated at most for Tx-Tx frequency retuning between two consecutive subframes. If the upper layer parameter ce-RetuningSymbols is configured, $N_{symb}^{retune}$ is equal to ce-RetuningSymbols, otherwise $N_{symb}^{retune}=2$. In addition, for the MTC terminal configured with the upper layer parameter srs-UpPtsAdd, a guard period of the maximum SC-FDMA symbol is generated for Tx-Tx frequency retuning between the first special subframe for frame structure type 2 and the second uplink subframe.

FIG. 19 is a diagram illustrating physical channels that can be used for MTC and a general signal transmission method using them.

The MTC terminal, which is powered on again while the power is turned off, or that newly enters the cell, performs an initial cell search operation such as synchronizing with the base station in step S1101. To this end, the MTC terminal receives a Primary Synchronization Signal (PSS) and a Secondary Synchronization Signal (SSS) from the base station, synchronizes with the base station, and acquires information such as a cell identifier (ID). The PSS/SSS used for the initial cell search operation of the MTC may be a legacy LTE PSS/SSS, a Resynchronization signal (RSS), or the like.

Thereafter, the MTC terminal may receive a physical broadcast channel (PBCH) signal from the base station to obtain intra-cell broadcast information.

Meanwhile, the MTC terminal may check a downlink channel state by receiving a downlink reference signal (DL RS) in the initial cell search step. Broadcast information transmitted through PBCH is MIB (Master Information Block), and in MTC, the MIB is repeated in a subframe different from the first slot of subframe #0 of the radio frame (subframe #9 for FDD and subframe #5 for TDD).

PBCH repetition is performed by repeating exactly the same constellation point in different OFDM symbols so that it can be used for initial frequency error estimation even before attempting PBCH decoding.

FIG. 20(a) illustrates an example of a frequency error estimation method for a repetition pattern for subframe #0, a general CP, and repeated symbols in FDD, and FIG. 20(b) illustrates an example of transmission of SIB-BR over a broadband LTE channel.

In MIB, five reserved bits are used in MTC to transmit scheduling information for a new system information block for bandwidth reduced device (SIB1-BR) including a time/frequency location and a transport block size.

SIB-BR is transmitted directly on the PDSCH without any control channel associated with it.

The SIB-BR remains unchanged in 512 radio frames (5120 ms) to allow multiple subframes to be combined.

Table 43 is a table showing an example of the MIB.

TABLE 43

```
-- ASN1START
MasterInformationBlock ::=      SEQUENCE {
   dl-Bandwidth                    ENUMERATED {
                                      n6, n15, n25, n50, n75, n100},
   phich-Config                    PHICH-Config,
   systemFrameNumber               BIT STRING (SIZE (8) ),
   schedulingInfoSIB1-BR-r13       INTEGER (0..31),
   systemInfoUnchanged-BR-r15      BOOLEAN,
   spare                           BIT STRING (SIZE (4) )
}
-- ASN1STOP
```

In Table 43, the schedulingInfoSIB1-BR field represents an index for a table defining SystemInformationBlockType1-BR scheduling information, and a value of 0 means that SystemInformationBlockType1-BR is not scheduled. The overall function and information carried by SystemInformationBlockType1-BR (or SIB1-BR) is similar to that of legacy LTE SIB1. The contents of SIB1-BR can be classified into (1) PLMN, (2) cell selection criteria, and (3) scheduling information for SIB2 and other SIBs.

After completing the initial cell search, the MTC terminal may receive the MPDCCH and the PDSCH according to the MPDCCH information in step S1102 to obtain more detailed system information. For MPDCCH, (1) it is very similar to EPDCCH, carries common and UE specific signaling, (2) it can be transmitted only once or can be transmitted repeatedly (the number of repetitions is configured by higher layer signaling), (3) A number of MPDCCHs are supported, and the UE monitors the set of MPDCCHs, (4) it is formed by an aggregation of an enhanced control channel element (eCCE), each eCCE includes a set of resource elements, (5) RA-RNTI (Radio Network Temporary Identifier), SI-RNTI, P-RNTI, C-RNTI, temporary C-RNTI, and semi-persistent scheduling (SPS) C-RNTI are supported.

Thereafter, the MTC terminal may perform a random access procedure such as steps S1103 to S1106 in order to complete access to the base station. The basic configuration related to the RACH procedure is transmitted by SIB2. In addition, SIB2 includes parameters related to paging. Paging Occasion (PO) is a subframe in which P-RNTI can be transmitted on the MPCCH. When the P-RNTI PDCCH is repeatedly transmitted, PO refers to the start subframe of the MPDCCH repetition. The paging frame (PF) is one radio frame and may include one or a plurality of POs. When DRX is used, the MTC terminal monitors only one PO per DRX cycle. Paging NarrowBand (PNB) is one narrowband, and the MTC terminal performs paging message reception.

To this end, the MTC terminal may transmit a preamble through a physical random access channel (PRACH) (S1103) and receive a response message (RAR) to the preamble through the MPDCCH and a corresponding PDSCH (S1104). In the case of contention-based random access, the MTC terminal may perform a contention resolution procedure such as transmission of an additional PRACH signal (S1105) and reception of an MPDCCH signal and a PDSCH signal corresponding thereto (S1106). Signals and/or messages (Msg 1, Msg 2, Msg 3, Msg 4) transmitted in the RACH procedure in MTC may be repeatedly transmitted, and this repetition pattern is configured differently according to the CE level. Msg 1 may mean PRACH preamble, Msg 2 may mean RAR (random access response), Msg 3 may mean UL transmission of the MTC terminal for RAR, and Msg 4 may mean DL transmission of the base station for Msg 3.

For random access, signaling for different PRACH resources and different CE levels is supported. This provides the same control of the near-far effect for the PRACH by grouping together UEs experiencing similar path loss. Up to four different PRACH resources may be signaled to the MTC terminal.

The MTC terminal estimates the RSRP using a downlink RS (e.g., CRS, CSI-RS, TRS, etc.), and selects one of the resources for random access based on the measurement result. Each of the four resources for random access has a relationship with the number of repetitions for the PRACH and the number of repetitions for the random access response (RAR).

Therefore, the MTC terminal with bad coverage needs a large number of repetitions to be successfully detected by the base station, and needs to receive an RAR having a corresponding repetition number to satisfy their coverage level.

Search spaces for RAR and contention resolution messages are also defined in the system information and are independent for each coverage level.

And, the PRACH waveform used in MTC is the same as the PRACH waveform used in legacy LTE (e.g., OFDM and Zadof-Chu sequence).

After performing the above-described procedure, the MTC terminal receives MPDCCH signal and/or PDSCH signal (S1107) and transmits physical uplink shared channel (PUSCH) signal and/or physical uplink control channel (PUCCH) (S1108) as a general uplink/downlink signal transmission procedure. Control information transmitted from the MTC terminal to the base station is collectively referred to as uplink control information (UCI). UCI may include HARQ-ACK/NACK, scheduling request (SR), channel quality indicator (Cal), precoding matrix indicator (PMI), rank indication (RI) information, etc.

When the RRC connection to the MTC terminal is established, the MTC terminal blind-decodes the MPDCCH in a search space configured to obtain uplink and downlink data allocation.

MTC uses all OFDM symbols available in a subframe to transmit DCI. Therefore, time domain multiplexing between the control channel and the data channel in the same subframe is impossible. That is, as discussed above, cross-subframe scheduling between the control channel and the data channel is possible.

The MPDCCH having the last repetition in subframe #N schedules PDSCH allocation in subframe #N+2.

The DCI transmitted by the MPDCCH provides information on how many times the MPDCCH is repeated so that the MTC terminal knows when PDSCH transmission starts.

PDSCH allocation can be performed in different narrowbands. Therefore, the MTC terminal needs to retune before decoding the PDSCH allocation.

For uplink data transmission, scheduling follows the same timing as legacy LTE. Here, the last MPDCCH in subframe #N schedules PUSCH transmission starting in subframe #N+4.

FIG. 21 is a diagram illustrating an example of scheduling for each of the MTC and legacy LTE.

Legacy LTE allocation is scheduled using the PDCCH, which uses the first OFDM symbols in each subframe, and the PDSCH is scheduled in the same subframe as the subframe in which the PDCCH is received.

In contrast, the MTC PDSCH is scheduled for cross-subframe, and one subframe is defined between the MPDCCH and the PDSCH to allow MPDCCH decoding and RF retuning.

The MTC control channel and data channels may be repeated through a large number of subframes having a maximum of 256 subframes for the MPDCCH and a maximum of 2048 subframes for the PDSCH so as to be decoded under extreme coverage conditions.

Cell Search of MTC

Hereinafter, the (initial) cell search (cell search) procedure of MTC in step S1001 of FIG. 19 will be described in more detail.

Cell search is the procedure by which a UE acquires time and frequency synchronization with a cell and detects the cell ID of that cell. E-UTRA cell search supports a scalable overall transmission bandwidth corresponding to 6 RBs and upwards. PSS and SSS are transmitted in the downlink to facilitate cell search. If a resynchronization signal is transmitted in the downlink, it can be used to re-acquire time and frequency synchronization with the cell. Physical layer provides 504 unique cell identities using synchronization signals.

The UE searches for the PSS/SSS in the center 6 PRBs to obtain the cell ID, subframe timing information, duplexing mode (time division duplex (TDD), or frequency division duplex (FDD)), and cyclic prefix (CP) length. The PSS uses Zadoff-Chu (ZC) sequence. For frame structure type 1 (i.e. FDD), the PSS shall be mapped to the last orthogonal frequency division multiplexing (OFDM) symbol in slots 0 and 10. For frame structure type 2 (i.e. TDD), the PSS shall be mapped to the third OFDM symbol in subframes 1 and 6. The SSS uses an interleaved concatenation of two length-31 binary sequences. The concatenated sequence is scrambled with a scrambling sequence given by the PSS. For FDD, the SSS shall be mapped OFDM symbol number NsymbDL-2 in slots 0 and 10, where NsymbDL is the number of OFDM symbols in a downlink slot. For TDD, the SSS shall be mapped OFDM symbol number NsymbDL-1 in slots 1 and 11, where NsymbDL is the number of OFDM symbols in a downlink slot.

System Information Acquisition of MTC

Hereinafter, a procedure for obtaining system information of the MTC in step S1002 of FIG. 19 will be described in more detail.

FIG. 22 illustrates a normal system information acquisition procedure.

Upon searching the cell by using the PSS/SSS, the UE acquires system information (SI).

The UE applies the system information acquisition procedure to acquire the access stratum (AS)- and non-access stratum (NAS)-system information that is broadcasted by the E-UTRAN. The procedure applies to UEs in RRC_IDLE and UEs in RRC_CONNECTED.

System information is divided into master information block (MIB; MasterInformationBlock) and a number of system information blocks (SIBs). The MIB defines the most essential physical layer information of the cell required to receive further system information. The MIB is transmitted on PBCH. SIBs other than system information block type-1 (SIB1; SystemInformationBlockType1) are carried in SI messages and mapping of SIBs to SI messages is flexibly configurable by schedulingInfoList included in SystemInformationBlockType1, with restrictions that: each SIB is contained only in a single SI message, and at most once in that message; only SIBs having the same scheduling requirement (periodicity) can be mapped to the same SI message; system information block type-1 (SIB2; SystemInformationBlockType2) is always mapped to the SI message that corresponds to the first entry in the list of SI messages in schedulingInfoList. There may be multiple SI messages transmitted with the same periodicity. SystemInformationBlockType1 and all SI messages are transmitted on DL-SCH. The BL UEs and UEs in CE apply BR version of the SIB or SI messages, e.g. SystemInformationBlockType1-BR.

The MIB uses a fixed schedule with a periodicity of 40 ms and repetitions made within 40 ms. The first transmission of the MIB is scheduled in subframe #0 of radio frames for which the SFN mod 4=0, and repetitions are scheduled in subframe #0 of all other radio frames. For TDD/FDD system with a bandwidth larger than 1.4 MHz that supports BL UEs or UEs in CE, MIB transmission may additionally be repeated in subframe #0 of the same radio frame, and subframe #5 of the same radio frame for FDD and TDD.

The SystemInformationBlockType1 contain information relevant when evaluating if a UE is allowed to access a cell and defines the scheduling of other system information blocks. The SystemInformationBlockType1 uses a fixed schedule with a periodicity of 80 ms and repetitions made within 80 ms. The first transmission of SystemInformationBlockType1 is scheduled in subframe #5 of radio frames for which the SFN mod 8=0, and repetitions are scheduled in subframe #5 of all other radio frames for which SFN mod 2=0.

For BL UEs or UEs in CE, MIB is applied which may be provided with additional repetitions, while for SIB1 and further SI messages, separate messages are used which are scheduled independently and with content that may differ. The separate instance of SIB1 is named as SystemInformationBlockType1-BR. The SystemInformationBlockType1-BR include information such as valid downlink and uplink subframes, maximum support of coverage enhancement, and scheduling information for other SIBs. The SystemInformationBlockType1-BR is transmitted over PDSCH directly, without any control channel associated with it. The SystemInformationBlockType1-BR uses a schedule with a periodicity of 80 ms. Transport block size (TBS) for SystemInformationBlockType1-BR and the repetitions made within 80 ms are indicated via schedulingInfoSIB1-BR in MIB or optionally in the RRCConnectionReconfiguration message including the MobilityControlInfo. Specifically, five reserved bits in the MIB are used in eMTC to convey scheduling information about SystemInformationBlockType1-BR, including time and frequency location, and transport block size. SIB-BR remains unchanged for 512 radio frames (5120 ms) to allow a large number of subframes to be combined.

The SI messages are transmitted within periodically occurring time domain windows (referred to as SI-windows) using dynamic scheduling. Each SI message is associated with a SI-window and the SI-windows of different SI messages do not overlap. That is, within one SI-window only the corresponding SI is transmitted. The length of the SI-window is common for all SI messages, and is configurable. Within the SI-window, the corresponding SI message can be transmitted a number of times in any subframe other than multimedia broadcast multicast service single frequency network (MBSFN) subframes, uplink subframes in TDD, and subframe #5 of radio frames for which SFN mode. The UE acquires the detailed time-domain scheduling (and other information, e.g. frequency-domain scheduling, used transport format) from decoding system information radio network temporary identity (SI-RNTI) on PDCCH. For a BL UE or a UE in CE, the detailed time/frequency domain scheduling information for the SI messages is provided in SystemInformationBlockType1-BR.

The SystemInformationBlockType2 contains common and shared channel information.

Random Access Procedure of MTC

Hereinafter, a random access procedure of MTC in steps S1003 to S1006 of FIG. 19 will be described in more detail.

The random access procedure is performed for the following events:

Initial access from RRC_IDLE;

RRC Connection Re-establishment procedure;

Handover;

DL data arrival during RRC_CONNECTED requiring random access procedure;

UL data arrival during RRC_CONNECTED requiring random access procedure;

For positioning purpose during RRC_CONNECTED requiring random access procedure.

FIG. 23 illustrates a contention-based random access procedure.

A random access preamble (may be referred to as "Msg1") is transmitted over PRACH. A UE randomly selects one random access preamble from a set of random access preambles indicated by system information or a handover command, selects a PRACH resource able to transmit the random access preamble, and transmits the same.

The physical layer random access preamble consists of a cyclic prefix of length TCP and a sequence part of length TSEQ. The parameter values are listed in Table 44 below and depend on the frame structure and the random access configuration. Higher layers control the preamble format.

TABLE 44

| Preamble format | $T_{CP}$ | $T_{SEQ}$ |
|---|---|---|
| 0 | $3168 \cdot T_S$ | $24576 \cdot T_S$ |
| 1 | $21024 \cdot T_S$ | $24576 \cdot T_S$ |
| 2 | $6240 \cdot T_S$ | $2 \cdot 24576 \cdot T_S$ |
| 3 | $21024 \cdot T_S$ | $2 \cdot 24576 \cdot T_S$ |
| 4 | $448 \cdot T_S$ | $4096 \cdot T_S$ |

Abbreviation

Before describing the method proposed in the present disclosure, abbreviations and definitions of terms to be described later are summarized.

MIB-NB: masterinformationblock-narrowband
SIB1-NB: systeminformationblock1-narrowband
CRS: cell specific reference signal or common reference signal
ARFCN: absolute radio-frequency channel number
PRB: physical resource block
PRG: precoding resource block group
PCI: physical cell identifier
N/A: non-applicable
EARFCN: E-UTRA absolute radio frequency channel number
RRM: radio resource management
RSRP: reference signal received power
RSRQ: reference signal received quality
TBS: transport block size
TDD/FDD: time division duplex/frequency division duplex Definition NB-IoT: NB-IoT allows access to network services through E-UTRA with a channel bandwidth limited to 200 kHz.

NB-IoT in-band operation: NB-IoT operates in-band when using resource block(s) in a normal E-UTRA carrier.

NB-IoT guard band operation: NB-IoT operates as a guard band when using resource block(s) not used in the guard band of the E-UTRA carrier.

NB-IoT standalone operation: NB-IoT operates standalone when using its own spectrum. For example, the spectrum currently used by the GERAN system on behalf of one or more GSM carriers and the spectrum that is scattered for potential IoT deployments.

Anchor carrier: In NB-IoT, the carrier assumes that NPSS/NSSS/NPBCH/SIB-NB for FDD or NPSS/NSSS/NPBCH for TDD is transmitted.

Non-anchor carrier: In NB-IoT, a carrier that does not assume that NPSS/NSSS/NPBCH/SIB-NB for FDD or NPSS/NSSS/NPBCH for TDD is transmitted.

Channel raster: The smallest unit in which the terminal reads resources. In the case of the LTE system, the channel raster (channel raster) has a value of 100 kHz.

In addition, '/' described in the present disclosure can be interpreted as 'and/or', and 'A and/or B' may be interpreted as having the same meaning as 'including at least one of A or (and/or) B'.

Hereinafter, in the standalone operation of the MTC proposed in the present disclosure, a method of utilizing a legacy LTE control region that was not used in the conventional LTE MTC will be described.

That is, in the case of a conventional system, since the legacy LTE control region is a region in which control information for LTE terminals is transmitted, the MTC terminal could not use the legacy LTE control region.

However, not using the legacy LTE control region degrades the efficiency of resource use and increases the overhead of signaling of MTC terminals.

For convenience of explanation, LTE-MTC supporting only conventional LTE in-band operation will be referred to as 'eMTC', MTC supporting standalone operation will be referred to as 'sMTC', and legacy LTE will be referred to as 'LTE'.

The sMTC cell is not obligated to support a control region for a conventional LTE UE. Therefore, the control region can be used for the following purposes for sMTC service.

That is, the LTE control region may be used for (1) performance improvement, (2) data rate improvement, and (3) control signaling purpose.

First Embodiment: Method of Utilizing the LTE Control Region for Performance Improvement The first embodiment is related to a method of improving channel estimation, synchronization and/or measurement performance by transmitting an RS in the LTE control region for improving sMTC performance, or a method of improving MPDCCH/PDSCH performance by additionally transmitting MPDCCH/PDSCH data in the LTE control region to lower the code rate.

(Method 1): The Method of Transmitting an RS

The method 1 is to transmit a cell-specific RS such as a CRS (in addition to the CRS understood by the LTE or eMTC terminal) in the LTE control region.

That is, in addition to the existing CRS transmitted in the LTE control region, reference signals for sMTC (e.g., CRS for sMTC, etc.) may be mapped and transmitted.

The additionally transmitted RS may be used to improve MPDCCH/PDSCH channel estimation performance, or may be used to improve measurement accuracy such as RSRP/RSRQ.

Alternatively, a UE-specific DMRS may be transmitted to the LTE control region.

The DMRS is basically configured to be transmitted in the time/frequency domain in which the corresponding MPDCCH/PDSCH is transmitted.

Therefore, in order to improve channel estimation and/or synchronization performance of MPDCCH/PDSCH used for a specific purpose by using the LTE control region, the base station may transmit the DMRS corresponding to the scheduled MPDCCH/PDSCH subframe (#n) in the LTE control region of the previous subframe(s) (e.g., subframe (n−1), (n−2), . . . ) of the subframe (#n).

Alternatively, for fast synchronization in the LTE control region, the base station may transmit a burst sync such as RSS (resynchronization signal) or transmit WUS (wake-up signal) in the LTE control region.

The terminal checks both the WUS and the MPDCCH in the subframe. If the WUS is detected and the MPDCCH is not yet detected, the UE continues to monitor the MPDCCH. If the WUS is not detected until the max duration, the UE may stop the MPDCCH monitoring.

(Method 2): The Method of Lowering the Code Rate of MPDCCH/PDSCH Data

The method 2 relates to a method of using an LTE control region to transmit MPDCCH/PDSCH data RE (from a data point of view).

The data RE is mapped by rate matching the data RE to a portion other than the portion of the RS (including all RSs that can be understood by the LTE or eMTC terminal as well as the above-described additional RS), or in a form in which data RE is punctured by the RS.

Alternatively, to be used for the original purpose, frequency tracking, and/or coherent combining between OFDM symbols, the terminal may preferentially select some (here, including a minimum of REs that may be overlapped at the position of the CRS (that can be understood by the LTE or eMTC terminal) of the control region or the additional RS described above) of the MPDCCH/PDSCH OFDM symbols (included in the same slot of subframe, or adjacent subframe), or may preferentially select a symbol not including RS.

In addition, the terminal may use in a form of copying some symbols (some symbols may vary) selected according to the number of symbols included in the LTE control region to the LTE control region.

Here, in order not to affect the eMTC operation, when the base station transmits the CRS in the LTE control region even though it is not LTE inband, the base station may copy data to the LTE control region and then puncturing by CRS.

Here, in order to obtain a similar combining (SNR) gain for all data REs in the copied OFDM symbol, that is in order to avoid the case that some data REs do not obtain a combining (SNR) gain due to CRS puncturing, OFDM symbols with CRS at the same location as the CRS location of the LTE control region are can be copied preferentially.

For convenience, the above method will be referred to as "the method of preferentially copying the CRS transmission symbol". The method may be a method of preferentially copying the CRS transmission symbol(s) having the same CRS RE position as the CRS RE position transmitted to the LTE control region.

This method has the advantage of minimizing puncturing of the MPDCCH transmission RE by the CRS in the LTE control region.

In the method, in the case of normal CP (cyclic prefix), when the symbol index in the subframe is I ($\in$ {0, 1, 2, . . . , 13}) and the number of symbols in the LTE control region is L, it can be copied as follow depending on the number of control regions.

(1) For normal CP:I$\in$ {0, 1, 2, . . . , 13}
  if L=1, I={7}→I={0} (A→B represents A copying to B)
  if L=2, I={7, 8}→I={0, 1}
  if L=3, I={7, 8, 9} or {7, 8, 6}→I={0, 1, 2}
  When L=3, both of the above methods are possible, but I={7, 8, 6}→I={0, 1, 2} may be relatively advantageous in terms of latency.
  if L=4, I={7, 8, 9, 10} or {7, 8, 9, 6} or {7, 8, 5, 6}→I={0, 1, 2, 3}
  When L=4, all three methods above are possible, but I={7, 8, 5, 6}→I={0, 1, 2, 3} may be the most advantageous in terms of latency.

(2) For extended CP:I$\in$ {0, 1, 2, . . . , 11}
  if L=1, I={6}→I={0}
  if L=2, I={6, 7}→I={0, 1}
  if L=3, I={6, 7, 8} or {5, 6, 7}→I={0, 1, 2}
  When L=3, both of the above methods are possible, but I={5, 6, 7}→I={0, 1, 2} may be relatively advantageous in terms of latency.

That is, among REs of the LTE control region, a mapping pattern of OFDM symbols in which a CRS are mapped may be copied to the REs at the same location as the REs to which the CRS are mapped, and reflected in the LTE control region.

In other words, and the REs of the LTE control region may be mapped using the REs to which the CRS is mapped and a mapping pattern of symbols having the same symbol location.

In this case, the base station may preferentially map the MPDCCH and/or PDSCH to the RE in the data region than the LTE control region as the control region, and may determine the mapping pattern of the control region according to the mapping pattern of the symbol to which the MPDCCH and/or the PDSCH is mapped based on the location of the CRS.

For MBSFN (Multimedia Broadcast multicast service Single Frequency Network) subframe, the terminal cannot expect the CRS in the MBSFN region. By applying a technique similar to the above, the base station can transmit by preferentially copying the OFDM symbol(s) in which the MBSFN RS or DMRS overlapping the CRS exists to the LTE control region in the order of time or in the order in which there are many MBSFN RSs or DMRSs overlapping the CRS.

In the former case (in the order of time), for example, if two ODFM symbols with I={2}, I={10} meet the above conditions, it is copied in the form of I={2, 10}→I={0, 1}. If L=1 in this situation, it is copied in the form of I={2}→I={0} or I={10}→I={0}. Both methods are possible, but the former has an advantage in terms of latency compared to the latter.

The above methods are not limited only to the same subframe or slot, but are applied equally to adjacent subframes or slots. That is, the MPDCCH/PDSCH of subframe #N or some of them may be copied (or RE mapping) to the LTE control region of subframe #N+1 or #N−1.

In addition, when the MPDCCH/PDSCH is not transmitted in the corresponding subframe (subframe #N), such as in the case of TDD special subframe configuration 0/5 or MBSFN subframe, the method may be applied in such way that the MPDCCH/PDSCH of the adjacent previous MPDCCH/PDSCH transmission DL subframe (subframe #N−1) or some of them is/are copied (or RE mapping) to the LTE control region of TDD special subframe configuration 0/5 (subframe #N) in which the MPDCCH/PDSCH is not transmitted.

Alternatively, for the LTE control region of the MBSFN subframe in which the MPDCCH/PDSCH is not transmitted, similar to the above method, the base station may transmit by copying (or RE mapping) the MPDCCH/PDSCH of an adjacent MPDCCH/PDSCH transmission DL subframe or some of them.

That is, in the case of a special subframe in which the number of symbols for transmitting data is smaller than that of a general subframe, the REs may be mapped by copying not only symbols of the same slot but also symbols of adjacent slots or subframes.

Specifically, in the case of a special subframe in which the number of symbols for data transmission is less than a certain number among symbols constituting a subframe, at least one symbol (at least one first symbol) of a slot (first slot) constituting a special subframe is applied by copying at least one symbol (at least one second symbol) of another slot (second slot) adjacent to the slot.

That is, the pattern in which the MPDCCH and/or PDSCH is mapped to the at least one first symbol may be the same as the pattern in which the MPDCCH and/or PDSCH is mapped to the at least one second symbol.

In this case, the at least one first symbol and the at least one second symbol may have a mapping pattern copied based on each start symbol.

In other words, in the case of the mapping of to the RE of the MPDCCH, a fixed mapping method on the time axis may be used. For example, the RE used for the MPDCCH in the first I_MPDCCHStart symbols of the second slot may be copied to the first I_MPDCCHStart symbol of the first slot.

In this case, I_MPDCCHStart may mean a symbol at which MPDCCH starts in a slot.

Separately or additionally from methods considering the use of frequency tracking and/or coherent combining between OFDM symbols, to minimize latency, or for services such as URLLC where latency is important, OFDM symbols closest to the LTE control region may be copied.

In addition, a method of preferentially copying the RS transmission symbol may be considered. In the RS preferential transmission method, by copying the RS instead of random data, more samples (i.e., RE) can be used for frequency tracking for frequency tracking, or gains such as improved channel estimation accuracy using an additional RS can be obtained. The RS may be, for example, CRS. In this case, the gain described in the method of preferentially copying the CRS transmission symbol can be additionally expected.

The RS may also be, for example, DMRS. This method will be referred to as the method of preferentially copying the DMRS transmission symbol. The method of preferentially copying the channel estimation DMRS transmission symbol may consider a method of preferentially copying the RS transmission symbol. In the RS preferential transmission method, by copying the RS instead of random data, more samples (i.e., RE) can be used for frequency tracking for frequency tracking, or gains such as improved channel estimation accuracy using an additional RS can be obtained.

The RS may be, for example, CRS. In this case, the gain described in the method of preferentially copying the CRS transmission symbol can be additionally expected. The RS may also be, for example, DMRS. This method will be referred to as the method of preferentially copying the DMRS transmission symbol. The method of preferentially copying the DMRS transmission symbol has the advantage of additionally obtaining channel estimation by using the DMRS signal copied to the LTE control region.

In addition, when the DMRS is power boosted, due to an increase in the SNR of the DMRS RE, a gain in terms of sync. can be additionally expected.

In the case of RE mapping by copying a part of the MPDCCH to the LTE control region, the part of the copied and RE mapped MPDCCH may be defined by one or more OFDM symbol(s) on the time axis, and by one or more PRB(s) on the frequency axis.

In this case, the OFDM symbol(s) defined as the time axis may be defined by a combination of OFDM symbol indexes. For example, in the case of the method of preferentially copying the CRS transmission symbol, the OFDM symbol index(s) defined as time axis may be OFDM symbol index(s) of the MPDCCH OFDM symbols containing CRS transmission REs of the same subcarrier indexes as those of CRS transmission REs in the LTE control region.

Alternatively, the OFDM symbol index(s) defined as time axis may be OFDM symbol index(s) of the OFDM symbols containing DMRS transmission REs.

The MPDCCH REs mapped to the LTE control region may be limited to one or a plurality of PRB(s) regions defined or limited in the frequency axis, and may be REs that satisfy the following conditions at the same time.

REs used for MPDCCH transmission
REs including reference signals (RSs) (e.g., CRS, DMRS) in PRBs used for MPDCCH transmission
REs that do not collide with CRS REs in the LTE control region after mapping to the LTE control region
That is, REs that do not have the same subcarrier indexes as the indexes of CRS REs in the LTE control region.
REs puncturing MPDCCH transmission REs (e.g., PSS, SSS, PBCH, CSI-RS)

The REs defined to puncturing MPDCCH transmission REs as described above may be included in the MPDCCH REs mapped to the LTE control region.

In this case, since the REs defined for puncturing MPDCCH transmission REs are known signals, the corresponding signals can be used for sync. or channel estimation.

The REs defined to puncturing MPDCCH transmission REs as described above can be excluded from the MPDCCH REs mapped to the LTE control region. In this case, instead of the REs puncturing the MPDCCH transmission RE, the punctured MPDCCH transmission REs are copied to the LTE control region and are then mapped to REs.

In this case, the number of the same REs between the LTE control region and the MPDCCH in the same subframe decreases, and thus there may be drawback in terms of sync. However, at the time of MPDCCH repetition (no REs defined to puncturing the MPDCCH transmission REs), performance improvement can be expected through averaging or combing gain by using the same point between the neighboring subframe and the LTE control region.

To get the advantage in terms of frequency tracking from the method of copying some OFDM symbol(s) of MPDCCH or PDSCH symbol(s) to LTE control region for the purpose of frequency tracking, or for the method of copying some OFDM symbol(s) of the MPDCCH or PDSCH symbol(s) to an LTE control region, the corresponding MPDCCH or PDSCH transmission should be expected by the terminal. That is, the terminal should be able to deterministically know the transmission time point of the corresponding MPDCCH or PDSCH to obtain a frequency tracking gain by repetition of OFDM symbol(s). If not, that is, when the terminal cannot know the transmission time point of the MPDCCH or PDSCH, or when blind detection and/or decoding is required to confirm MPDCCH or PDSCH transmission with only information on the transmission time point, (in the case that the actual transmission is not made or the above method is not applied) the terminal cannot receive due to an incorrect estimated value.

For the same reason as above, the method of copying some OFDM symbol(s) of the MPDCCH or PDSCH symbol(s) to the LTE control region for frequency tracking may be applied only when the UE is able to deterministicly determine the transmission time point (deterministic transmission or deterministic scheduling), such as MPDCCH and/or PDSCH for broadcast transmission.

Alternatively, in order to obtain an advantage in terms of frequency tracking from the method of copying some OFDM symbol(s) of the MPDCCH or PDSCH symbol(s) to the LTE control region, the method may be applied only when the UE is able to deterministicly determine the transmission time point (deterministic transmission or deterministic scheduling), such as MPDCCH and/or PDSCH for broadcast transmission.

The case of that the UE is able to deterministicly determine the transmission time point (deterministic transmission or deterministic scheduling) may include, for example, a channel that is periodically transmitted (repeatedly) at a time point that the UE can know, such as a PBCH or an MPDCCH and/or a PDSCH for transmitting SIB and/or SI messages.

For the above reasons, the method of copying some OFDM symbol(s) of the MPDCCH or PDSCH symbol(s) to the LTE control region, is applied only when the UE is able to deterministicly determine the transmission time point (deterministic transmission or deterministic scheduling).

And, in other cases, that is, in the case of transmission in which the UE cannot deterministicly determine the transmission time point, the following method of MPDCCH or PDSCH rate matching may be applied, or a method of copying some OFDM symbol(s) of the MPDCCH or PDSCH symbol(s) designed for a purpose other than the frequency tracking purpose to the LTE control region (e.g., a method for preferentially copying OFDM symbols with CRS at the same location as CRS location of LTE control region to LTE control region) may be applied.

The method of MPDCCH or PDSCH rate matching may be a method of sequentially frequency first RE mapping coded bits from the LTE control region (R1) (R1→R2 RE mapping method), or a method of sequentially frequency first RE mapping remaining coded bits (may be additional parity bits) to the LTE control region (R2→R1 RE mapping method) after performing frequency first RE mapping sequentially coded bits on the MPDCCH or PDSCH transmission region for backward compatibility with legacy or for data sharing.

The part copied or mapped to the LTE control region may be part of coded bits or modulation symbols of MPDCCH/PDSCH or PDCCH/PDSCH transmission REs.

Additionally, when the MPDCCH/PDSCH is repetitioned, in order to maximize coherent combining between subframes, the same repetition may be performed up to the LTE control region, or the repeated OFDM symbol may be changed for each repetition or for a predetermined repetition so that the OFDM symbols copied from the MPDCCH/PDSCH to the LTE control region are as uniform as possible considering the total number of repetitions. The set of OFDM symbol(s) copied to the LTE control region and repeated may be determined in conjunction with the MPDCCH/PDSCH repetition number and/or repetition index (i_rep).

For example, it is assumed that the LTE control region is composed of the first 3 OFDM symbols (i=0, 1, 2) of the subframe, and the MPDCCH/PDSCH OFDM symbols are followed by 11 OFDM symbols (i=3, 4, 5, 6, 7, 8, 9, 10, 11, 12, 13).

The OFDM symbol index in the MPDCCH/PDSCH copied to the LTE control region according to the MPDCCH/PDSCH repetition number may be determined as follows.

(Example 1) Repetition number=4 (i_rep=0, 1, 2, 3)
    i_rep=0: {3, 4, 5}; i_rep=1: {6, 7, 8}; i_rep=2: {9, 10, 11}; i_rep=3: {12, 13, 3}

(Example 2) Repetition number=8 (i_rep=0, 1, 2, 3, 4, 5, 6, 7)
    i_rep=0: {3, 4, 5}; i_rep=1: {3, 4, 5}; i_rep=2: {6, 7, 8}; i_rep=3: {6, 7, 8}
    i_rep=4: {9, 10, 11}, i_rep=5: {9, 10, 11}, i_rep=6: {12, 13, 3}; i_rep=7: {12, 13, 3}

In Example 1, the set of OFDM symbol(s) copied to the LTE control region and repeated is configured to include the MPDCCH/PDSCH OFDM symbols as uniform as possible within the repetition number. When the repetition number is sufficient as in Example 2, a set of OFDM symbol(s) may be configured to enable (OFDM) symbol level combining between adjacent subframe(s). The above example may have different values depending on the number of symbols included in the control region and the number of repeated transmissions. In addition, the above example can be similarly applied as a value for avoiding redundant symbols between repeated transmissions as much as possible.

The methods of using the LTE control region during the repetition may be differently applied according to 1) repetition number and/or CE mode (method A), 2) frequency hopping (method B), 3) RV cycling (method C).

(Method A): A Method of LTE Control Region RE Mapping According to the Repetition Number and/or CE Mode As mentioned above, the above methods may have different effects according to the repetition number, and thus may be determined in conjunction with the repetition number. Alternatively, since the range of the supported repetition number is different according to the CE mode, the above methods may be applied differently according to the CE mode. For example, since CE mode B mainly aims to extend coverage through repetition gain, Example 2 may be applied only to terminals operating in CE mode B, and Example 1 may be used for terminals operating in coverage mode A. When applying Example 2 to terminals operating in CE mode B, the duration X in which the set of OFDM symbol(s) copied to the LTE control region by enabling (OFDM) symbol level combining maintains the same may be determined in consideration of the channel coherence time, etc. The X may be a subframe unit or a slot unit.

(Method B): A Method of LTE Control Region RE Mapping According to Frequency/Narrowband Hopping The duration X in which the set of OFDM symbol(s) copied to the LTE control region by enabling (OFDM) symbol level combining maintains the same is meaningful only in the same (frequency/narrowband) hop. Therefore, the methods may be determined according to whether frequency/narrowband hopping is configured. For example, when frequency hopping is 'on', it is determined that the gain by symbol level combining is small, and as in Example 1, a method of copying different parts without repetition may be applied, or the size of the duration of X can be determined according to a length of (frequency/narrowband) a hop. Here, the range of the duration X value may range from 1 to the number of subframes or slots in the hop, and X=1 may mean a case where different parts are copied without repetition as in Example 1.

(Method C): A Method of LTE Control Region RE Mapping According to RV Cycling

The duration X in which the set of OFDM symbol(s) copied to the LTE control region by enabling (OFDM) symbol level combining maintains the same may be a value limited by a period of the RV cycling when the RV cycling is applied. In addition, the method of LTE control region RE mapping according to the RV cycling may be a method determined in conjunction with the CE mode. For example, when a terminal operating in CE mode A is configured to perform the RV cycling at every repetition, since repetition gain cannot be obtained, the above Example 1 may be applied to operate. A terminal operating in CE mode B may be configured to have the same RV for a certain duration Z. The duration X value may be configured to have a value equal to or smaller than the Z value or calculated in the terminal, or the X value may be referred to as the Z value as it is.

At the time of the repetition, the methods of using the LTE control region (e.g., whether to copy or map a different part for each repetition or a specific repetition unit, or whether to copy or map the same part for all repetitions) may be UE-specifically or semi-statically configured through a cell-specific RRC signaling.

For example, in the case of a method of copying or mapping OFDM symbol(s) including CRS, when the CRS transmission port is 2 or more, the positions of the CRS transmission REs of OFDM symbol index 0 and 3 are the same.

In order to allow copying of different parts (e.g., different CRS transmission symbols) only in this case, the copying of different parts may be allowed depending on the number of CRS transmission ports (that is, only in the case of 2 or more), or may be configured to be configurable through higher layer signaling as described above.

When RE mapping the LTE-MTC MPDCCH/PDSCH to the LTE control region in frame structure type 2 (TDD), even if the LTE control region includes PSS to protect the PSS located at symbol index l=2 of the TDD special subframe, that is even if the MPDCCH/PDSCH start symbol l_startsymbol>2, the copying or RE mapping the MPDCCH/PDSCH to the position of the PSS (that is, the symbol index l=2) may not be performed.

(Example) special subframe capable of MPDCCH/PDSCH transmission (e.g., special subframe configuration #4)

When l_startsymbol=3 and normal CP, when copying or RE mapping OFDM symbols corresponding to OFDM symbol indexes 7, 8, and 9 to OFDM symbol indexes 0, 1 and 2, respectively, they collide with the PSS. In this case, by applying the above method, it is possible to copy or RE-map OFDM symbols corresponding to OFDM symbol indexes 7 and 8 to OFDM symbol indexes 0 and 1, respectively, excluding OFDM symbol index 9. In the case of the PDSCH, it may be excluded from rate-matching.

When l_startsymbol=3 and extended CP, when copying or RE mapping OFDM symbols corresponding to OFDM symbol indexes 6, 7, and 8 to OFDM symbol indexes 0, 1 and 2, respectively, they collide with the PSS. In this case, by applying the above method, it is possible to copy or RE-map OFDM symbols corresponding to OFDM symbol indexes 6 and 7 to OFDM symbol indexes 0 and 1, respectively, excluding OFDM symbol index 8. In the case of the PDSCH, it may be excluded from rate-matching.

More generally, when the TB scheduling unit is not a subframe or slot, for example, when the minimum unit of scheduling is N subframes or slots in time by applying an uplink sub-PRB, the operation may be performed in units of N subframes or slots, not in units of a subframe or slot. The operation includes operating in units of M*K subframes or slots, since 1 TB is transmitted over M*K subframes or slots when 1 TB is divided into multiple M RUs and transmitted, and the length of one RU in time is K subframes or slots.

Method of PBCH Extension

In order to improve the performance of the PBCH, the base station and/or the terminal may extend or copy all or some of the OFDM symbol(s) of the PBCH (consisting of 4 OFDM symbols) in the LTE control region and transmit. When copying some OFDM symbol(s) of the PBCH, a pattern may be configured for the purpose of correcting a performance difference due to differences in PBCH patterns between TDD/FDD, for example.

In the case of FDD, all four OFDM symbols constituting the PBCH included in the four PBCH repetitions are equal to four. In the case of TDD, two of the four OFDM symbols constituting the PBCH are repeated 5 times, and the other two OFDM symbols are repeated 3 times. In the case where it is not necessary to assume the CRS in the LTE control region in the sMTC, a more flexible configuration may be possible.

FIG. 8 is a diagram illustrating that 4 PBCH repetitions are applied in the conventional eMTC, and FIGS. 9 to 11 illustrate methods of extending a PBCH to the LTE control region for an sMTC UE proposed in the present disclosure. FIG. 9 (Example 1) and FIG. 10 (Example 2) are examples of a case where a CRS is transmitted in the LTE control region, and FIG. 11 (Example 3) is an example of a case where a CRS is not expected in the LTE control region.

In addition, the method of extending the PBCH to the LTE control region may be used to reinforce a point where frequency estimation performance compared to FDD may be relatively weak when PBCH is used in TDD in the eMTC. The eMTC FDD was able to improve the frequency tracking performance by using repetition between OFDM symbols while placing PBCH repetition in subframes #0 and #9. However, eMTC TDD had to place PBCH repetition in subframes #0 and #5 to support PBCH repetition in all TDD U/D configurations. Thus, eMTC TDD could not obtain a gain in terms of frequency tracking performance as much as FDD. In Examples 2 and 3, the PBCH configuration symbols extended to the control region in TDD are arranged to be most advantageous in terms of frequency tracking performance by forming equal intervals with the same PBCH OFDM symbols repeated later. The above examples are an arrangement that satisfies two uses: a use for correcting a performance difference due to differences in PBCH patterns between TDD/FDD and a use for reinforcing frequency estimation performance in TDD.

As another method, in order to reduce the PBCH detection delay time of the terminal, the base station may transmit part of the encoded bits to be included in the next PBCH transmission subframe or part of the PBCH OFDM symbols. That is, some information of the (n+1) to (n+3)-th PBCH transmission subframe may be transmitted in the control region of the n-th PBCH transmission subframe. This may be for the terminal to attempt to detect at the lowest possible PBCH code rate in one subframe.

Alternatively, some of the encoded bits to be included in the PBCH transmission subframe or some of the PBCH OFDM symbols may be transmitted in the LTE control region of the subframe(s) following the PBCH transmission subframe.

Second Embodiment: Method of Utilizing the LTE Control Region to Improve a Data Transmission Rate In order to improve the data transmission rate, the LTE control region may be used for MPDCCH/PDSCH data transmission. In the following, for convenience of description, the LTE control region is referred to as R1 and the MPDCCH/PDSCH region is referred to as R2.

As the method for improving the data transmission rate, a method of encoding (channel coding) data transmitted in R1 and data transmitted in R2 in a single part and a method of encoding in two parts may be considered.

In addition, the methods proposed below are not limited to use for improving data transmission speed, and may also be used as methods for improving performance. For example, when additional parity information for error correction is transmitted in R2, methods proposed below may be classified as the method of utilizing the LTE control region for improving performance.

(Method 1): Single Part Encoding for sMTC Data Rate Enhancement

The single part encoding method is a method of constructing a channel coding input as a single part based on the RE of a region including R1 and R2 for sMTC data rate enhancement, and generating a coded bit by rate matching in the channel coding step. Rate-matched coded bits are RE mapped to R1 and R2 through modulation (e.g., QPSK, 16QAM, etc.).

RE mapping of the single part encoding method may perform frequency-first time-second RE mapping in the order of R1→R2 without considering data sharing with eMTC. The above method has an advantage that a buffer required for reordering at the RE mapping input end is unnecessary or a required buffer size is small by performing RE mapping in the input order.

Alternatively, systematic bits among coded bits may be preferentially mapped to R2 in consideration of data sharing with eMTC, and then the remaining coded bits may be RE-mapped to R1. Through the RE mapping method, decoding can be performed independently with only R2, but if both R1 and R2 are used, the code rate is lowered and reception is possible at a relatively low SNR.

In addition, sMTC and eMTC receive essential data through R2, and sMTC may also receive essential data even in a lower SNR area by receiving additional information by additionally receiving some kind of auxiliary data through R1, or by receiving additional redundancy data through R1.

That is, for backward compatibility with the LTE terminal, rate-matched coded bits are preferentially mapped to the MPDCCH/PDSCH region (or data region) of R2 through a modulation process, and the remaining coded bits may be mapped to R1.

In other words, the MPDCCH/PDSCH may be rate matched in a backward compatible manner in all available OFDM symbols.

With the single part encoding method, corresponding information (e.g., whether both R1 and R2 are received, RE mapping method, etc.) is signaled through a higher layer configuration or scheduling DCI in order for sMTC UE to enable receive data of R2, or R1 and R2.

(Method 2): 2-Part Encoding for sMTC Data Rate Enhancement

The two part encoding method is a method of independently encoding data to be transmitted through R2 and data to be transmitted through R1. If the part that is RE-mapped to R1 is called part 1, the part that is RE-mapped to R2 is called part 2, and each code rate is C1 and C2, then rate matching in part 1 is performed based on the number of (available) REs in C1 and R1, and rate matching in part 2 is performed based on the number of (available) REs of C2 and R2. Since C1 and C2 may be data of different characteristics, they can be independently configured.

For example, eMTC and sMTC may commonly receive common data having the code rate C2 through R2, and sMTC may independently receive sMTC-specific data having the code rate C1.

In this case, the independent data of R1 may not be indicated with HARQ process ID or may not support HARQ-ACK feedback. In addition, resource allocation information of R1 (e.g., MCS, TBS, etc.) may be indirectly derived from scheduling information of the R2 part. If the R2 part also supports HARQ retransmission, it may be dependent on the R2 part. This may be HARQ-ACK feedback by setting the HARQ ID to the same value or by combining detection results of R1 and R2 parts. Alternatively, one HARQ ID and an additional 1 bit indication may be used to distinguish whether the R2 part or the R1 part in the corresponding subframe or slot. This information may be transmitted in DCI. In addition, when frequency retuning is required, the R1 duration may be allowed to be used as a guard time.

Payload bits transmitted through R2 and payload bits transmitted through R1 may be encoded by different channel coding methods due to a difference in payload size (or code block size resulting therefrom) between the two. For example, payload bits transmitted in R2 are encoded by the LDPC or the turbo coding method optimized for large payload size or code block size, and payload bits transmitted in R1 are encoded by the Reed Muller code or the polar coding method more suitable for small payload size or code block size.

Whether or not two part encoded data (including same or different channel coding) can be received may be defined in the form of UE capability and reported. The two part encoding method for sMTC data rate enhancement can be applied only to capable UEs according to the reported UE capability. The capable UE may simultaneously perform decoding using two decoders to reduce latency in case of the two part ending.

The data transmitted in R1 may be information common to sMTC UEs, or information such as broadcast information, SC-PTM information, paging, and Msg2/4 during random access. The sMTC UE may simultaneously receive data transmitted through R1 along with MPDCCH/PDSCH data transmitted through R2 (depending on UE capability).

When the LTE control region is used for MPDCCH/PDSCH data transmission (or when the LTE control region is extended to rate-matching), if the max code rate of MPDCCH/PDSCH data is maintained, due to the increase in the number of transmitted REs, higher TBS allocation is theoretically possible. In this regard, when a TBS is newly defined or an additional TBS size is defined and supported, the UE configured to expect MPDCCH/PDSCH transmission in the LTE control region may calculate the TBS differently.

When an area in which DL or UL transmission is possible increases or decreases in an LTE subframe, a TBS value calculated through the number of MCS and PRB may be used by scaling.

For example, if the area in which DL or UL transmission is possible increases or decreases, the scaling factor X is determined according to the increased or decreased ratio, and a value subjected to the integerization process by multiplying the corresponding scaling factor X by TBS which is obtained through TBS table lookup using the number of MCS and PRB is used as the TBS value. Alternatively, the closest value on the TBS table may be applied as a new TBS when the integerization process is performed.

The integerization process may be an operation such as round/floor/ceiling. When the closest value on the TBS table is greater than 1, a larger TBS value can be selected, or a smaller value can be selected. If the TBS value after multiplying the scaling factor X is TBS', when the TBS' value is larger than the TBS size (e.g., 1000 bits) allowed by LTE MTC, 1000 bits is selected.

That is, TBS' may be selected as min (1000, TBS'). The above method may be effective when the number of OFDM symbols capable of PDSCH transmission is small (e.g., special subframes), for example. In this case, since the number of OFDM symbols capable of transmitting PDSCH in a special subframe is smaller than that of a normal subframe, if the TBS scaling parameter is Y, it may be in the form of additionally multiplying Y by X.

Alternatively, a terminal configured to expect MPDCCH/PDSCH transmission in the LTE control region may calculate a repetition differently or may be configured a repetition value different from that of the eMTC. For example, when using the LTE control region to improve performance (e.g., when using the LTE control region by the above methods of transmitting RS and/or lowering the code rate of MPDCCH/PDSCH data, etc.), as performance is improved, a small number of repetitions can be applied.

In the method of applying a new repetition, a terminal configured to set a new value different from the existing eMTC or to expect MPDCCH/PDSCH transmission in the LTE control region can calculate a repetition value to be actually applied from the value set identically to the eMTC. The calculation method may be, for example, a value integerized through an operation such as floor/round/ceil by multiplying a specific value (e.g., a scaling factor that is inversely proportional to the degree of performance improvement) from the value configured identically to the eMTC. In addition, in order to enable the sMTC UE to receive the data of R2 or R1 and R2 by the two part encoding method described above, corresponding information (e.g., whether both R1 and R2 are received, RE mapping method, encoding information, etc.) is signaled through a higher layer configuration or scheduling DCI.

In addition, in order to allow the sMTC UE to receive one data unit only through R2 or through R1 and R2 (or through R1 only) as in the single part encoding method described above, corresponding information (e.g., whether data is transmitted using R1 or R2 or both R1 and R2) is signaled through a higher layer configuration or scheduling DCI.

When the LTE control region is used for PDSCH data transmission (using single-part encoding or two-part encoding) (or when the LTE control region is extended by rate-matching), and when data sharing between the sMTC UE and the (legacy) eMTC UE is supported, the redundancy version (RV) value according to the repetition of the sMTC UE and the starting position in the circular buffer corresponding to the RV may always have the same value as the eMTC UE.

This method does not configure one or a plurality of circular buffers based on all of the coded bits transmitted in R1 and R2 for the sMTC UE, and does not determine the starting position in the circular buffer with a certain ratio of the size of each configured circular buffer, but configures one or more circular buffers based on the coded bits transmitted to R2. In addition, a starting position in the circular buffer may be determined at a predetermined ratio of the size of each configured circular buffer.

When the LTE control region is used for PDSCH data transmission (using single-part encoding or two-part encoding) (or when the LTE control region is extended by rate-matching), and when data sharing between the sMTC UE and the (legacy) eMTC UE is not supported, the redundancy version (RV) value according to the repetition of the sMTC UE and the starting position in the circular buffer corresponding to the RV may have a different value from the eMTC UE. For example, this method may configure one or more circular buffers based on all of the coded bits transmitted in R1 and R2 for the sMTC UE, and determine the starting position in the circular buffer at a certain ratio of the size of each configured circular buffer.

The above method may mean operating a circular buffer independently for R1 and R2 when the LTE control region is used for PDSCH data transmission. Here, if each circular buffer corresponding to R1 and R2 is referred to as CB1 and CB2, CB2 has the same size as the circular buffer of eMTC.

If the circular buffer of eMTC is composed of an N_row× N_column matrix, for example, N_column=32, and N_row is determined by N_column and channel coding output bit stream size, sMTC CB2 has the same N_row×N_column size as eMTC and dummy bit (if necessary) is also filled in the same way as eMTC. The circular buffer corresponding to PDSCH data added by using the LTE control region has the same N_column value as CB2, and the N_row value is determined according to the amount of added data. When the circular buffer is composed of an N_row×N_column matrix, the read-out start column value of the circular buffer matrix is determined according to the RV value (e.g., read-out start column values are 2, 26, 50, 74 corresponding to RV0, RV1, RV2, RV3, respectively). The read-out start column value in the circular buffer according to the RV value of CB1 may have the same value as CB2.

When independent retransmission of PDSCH data is supported for R1 and R2, HARQ-ID and/or RV values for R1 and R2 data may be independently operated within the same subframe or slot. Here, in order to reduce the DCI signaling overhead, the initial transmission of R1 data is applied (the HARQ-ID and) the RV value of R2 of the same subframe, but when retransmission, the same RV value as the initial transmission or a specific value (e.g., RV0) can be assumed.

Regarding two methods of the redundancy version (RV) value according to the repetition of the sMTC UE and the starting position in the circular buffer corresponding to the RV, depending on whether it is an sMTC UE or an eMTC UE (e.g., depending on whether the LTE control region is used), or whether the sMTC UE supports data sharing between the sMTC UE and the eMTC UE (or with reference to the corresponding signaling), the redundancy version (RV) value according to repetition and the starting position in the circular buffer corresponding to the RV may be determined.

The definition of EREG and ECCE of MPDCCH in eMTC is defined for symbol index l=0~13 (in case of normal CP) in subframe. However, the actual MPDCCH transmission is performed using only REs belonging to the OFDM symbol (that is, satisfy the condition of l≥startSymbolBR) including the starting symbol (startSymbolBR). When a sMTC UE is configured to use the LTE control region, MPDCCH transmission is also possible for OFDM symbol(s) before l=startSymbolBR. In this case, the following methods may be considered as the MPDCCH RE mapping method of the sMTC UE.

First, the MPDCCH may be transmitted in a frequency-first-time-second manner from l=0 or the first OFDM symbol in which the configured sMTC UE can transmit the MPDCCH.

This method may mean that when determining the MPDCCH transmission RE of eMTC, startSymbolBR is replaced with '0' or the value of the first OFDM symbol in which the configured sMTC UE can transmit the MPDCCH under the condition of l≥startSymbolBR. The above method has the advantage of simple RE mapping from the standpoint of supporting only the sMTC UE, but the RE mapping order are different from that of the eMTC UE, so MPDCCH data sharing with the eMTC UE is not efficiently supported.

Second, after RE mapping starting from I=startSymbolBR in the same way as eMTC, for REs added by using the LTE control region, RE mapping may be performed in a frequency-first-time-second manner from I=0 or the first OFDM symbol in which the configured sMTC UE can transmit the MPDCCH. The above method has the advantage of efficiently sharing MPDCCH data because the understanding of the RE mapping position and order of sMTC and eMTC is the same for OFDM symbols satisfying I≥startSymbolBR.

This method may be useful when transmitting a control signal applied to both the existing eMTC and sMTC (or applied regardless of the eMTC and sMTC). In this case, the MPDCCH transmission REs available only to the sMTC UE(s) may be used for redundancy transmission or additional control data transmission for only additional sMTC UE(s). Alternatively, some of OFDM symbols (or REs) belonging to OFDM symbols satisfying I≥startSymbolBR may be copied and transmitted.

The above methods may be determined according to the type of control data transmitted through the MPDCCH or the search space (SS) type. For example, when control data transmitted through MPDCCH is UE-specific or transmitted through UE-specific search space (UESS), it may not be necessary to consider data sharing with eMTC, so sMTC may apply the first method described above.

Alternatively, when control data transmitted through MPDCCH is common to sMTC UE(s) and eMTC UE(s), or transmitted through a common search space (CSS), the second method that has an advantage in terms of data sharing with eMTC may be determined to be used.

In the conventional eMTC, when MPDCCH is transmitted, if the code rate of control data is more than a certain value (e.g., code rate>~0.8), considering that it is difficult to receive from the terminal side, If the number of MPDCCH transmission REs (nRE, eMTC) of eMTC is less than a specific value in the state assuming the size of a specific DCI format or considering the size of the overall DCI format, the MPDCCH format is selected to double the ECCE aggregation level (AL), that is, double the ECCE AL.

For example, if the code rate is less than nRE,eMTC=104 corresponding to about 0.8, ECCE AL is to be increased. However, in the case of the sMTC UE, the RE (nRE, sMTC) that can be used for MPDCCH transmission in the same subframe or slot is greater than or equal to the eMTC. That is, the relationship between nRE and sMTC>=nRE and eMTC is established. Here, the ECCE AL determination for the sMTC UE may be determined in the following manner.

First, the ECCE AL of sMTC is determined based on the number of MPDCCH transmission REs of eMTC (nRE, eMTC). For example, if nRE,eMTC<104, the ECCE AL of sMTC is increased. Since for the number of MPDCCH transmission REs, the relationship between nRE, sMTC>=nRE, eMTC is always established, in certain cases, for example, in the case of nRE, eMTC<104<=nRE, sMTC, it is not necessary to increase the ECCE AL from the viewpoint of the sMTC UE, but after both the sMTC UE and the eMTC UE determine the ECCE AL based on nRE, eMTC, by using REs as much as nRE, sMTC—nRE, eMTC to improve the performance of MPDCCH for sMTC UE(s) or to transmit additional control data in the determined ECCE AL, the above method is an advantageous method in terms of performance compared to the second method.

In this method, nRE and eMTC, which are the criteria for determining the ECCE AL, even if the MPDCCH for an actual eMTC UE is not a transmission RE, for example, even if it is an MPDCCH transmission RE for an sMTC UE, may mean the number of MPDCCH transmission REs that satisfy the I≥startSymbolBR condition, that is, excluding the LTE control region.

Second, the ECCE AL of sMTC is determined based on the number of MPDCCH transmission REs of sMTC (nRE, sMTC). For example, if nRE,sMTC<104, the ECCE AL of sMTC is increased. In the case of this method, under certain conditions, sMTC may have an ECCE AL different from eMTC. For example, if nRE,eMTC<104<=nRE, sMTC, in the case of eMTC, the ECCE AL is doubled according to the conditions of nRE, eMTC<104, and in the case of sMTC, since 104<=nRE, ECCE AL may not be doubled. In this case, considering that sMTC has lower performance than eMTC control data, the base station increases the ECCE AL for the sMTC UE by 2 when the above conditions occur, that is, nRE, eMTC<104<=nRE, sMTC.

For the two methods for determining the sMTC ECCE AL, one of the two methods may be configured through a higher layer signaling, or may be applied differently depending on whether (control) data are shared between sMTC and eMTC.

For example, when (control) data are shared between sMTC and eMTC, the first method among the above methods may be selected or when (control) data are not shared, the first method among the above methods may be selected. Whether the sMTC and eMTC (control) data sharing is configured by higher layer or may be dynamically indicated through DCI.

The sMTC UE may include the meaning of an LTE MTC UE capable of using the LTE control region. In this case, the first method may be a method of determining AL (based on R2) only with REs belonging to the R2 region defined above among the number of MPDCCH transmission REs, similar to legacy LTE MTC UEs using the LTE control region.

In the case of a UE using the LTE control region, the second method may be a method of determining AL (based on R1+R2) including REs belonging to the R1 region as well as the R2 region. The LTE MTC UE that can use the LTE control region may support only the second method, which is an R1+R2 based AL determination method, to obtain the effect of transmitting additional control data within the same max code rate limit, or may use the second method, which is an R1+R2 based AL determination method, as a basic operation, and apply the first method, which is an R2 based AL determination method, under a specific condition.

A specific condition for applying the first method may be, for example, a case in which the MPDCCH search space is shared with a conventional LTE MTC UE that cannot use the LTE control region. That is, the first method can be applied to the MPDCCH transmitted through the Type1-/1A-/2-/2A-MPDCCH CSS. Because, in the case of Type0-MPDCCH CSS, it is configured to be UE-specific in the same way as UESS and shared a search space with the UESS, from the standpoint of an LTE MTC UE capable of using an LTE control region, it may not be necessary to consider sharing a search space with a conventional LTE MTC UE that cannot use an LTE control region.

Therefore, in this case, for an LTE MTC UE capable of using an LTE control region, the AL can be determined by applying the same UESS method, that is, the second method, which is the R1+R2 based AL determination method.

The sMTC ECCE AL determination method, when retuning frequency (or NB), because the first subframe or slot of the destination frequency (or NB) can be used as a guard period (GP), different methods may be applied to different subframes or slots of the same frequency (or NB). When all or part of the LTE control region is used as a GP, DL reception of the UE cannot be expected during the GP. Accordingly, since it is expected that the base station will not perform DL scheduling during the corresponding period, in this case, the sMTC ECCE AL determination may operate differently from a method signaled by a higher layer signaling or dynamic signaling. For example, in the first subframe or slot of the destination frequency (or NB), it may be determined based on the MPDCCH transmission RE calculated from OFDM symbols excluding the GP duration (e.g., the first one or two OFDM symbols) regardless of the signaling method, or the sMTC ECCE AL determination method (the first method) based on nRE, eMTC may be used.

When the MPDCCH is repeatedly transmitted by applying frequency (NB) hopping to an LTE MTC UE capable of using the LTE control region, the base station may apply the same AL determination method to all subframes in the same NB, and the LTE MTC UE capable of using the LTE control region may not receive the MPDCCH during the guard period (GP).

In this case, the UE may apply the same AL determination method to the same NB and perform an average operation to obtain a repetition gain in the same NB, excluding only some durations in the MPDCCH not received during the GP. Alternatively, an average operation for obtaining repetition gain may be performed using only the R2 region.

Alternatively, in order to reduce the complexity of the terminal operation, when transmitting the MPDCCH through frequency (NB) hopping, the base station may transmit the MPDCCH by applying the first AL determination method (using only the R2 region). In this case, the UE capable of using the LTE control region may refer to the higher layer configured frequency (NB) hopping on/off flag, and when frequency (NB) hopping is on, perform the reception of the MPDCCH and a BD operation for the reception by assuming the first AL determination method. If the frequency (NB) hopping is on and the hopping interval (the number of consecutive subframes used for MPDCCH transmission in the same NB between frequency hopping) is 1 or less than a specific value such as 2, the R1+R2 based AL determination and RE mapping can be performed excluding as many OFDM symbols required for frequency retuning of the terminal in the R1 duration.

Third Embodiment: Method of Utilizing the LTE Control Region for Control Signal Transmission The LTE control region may be used for transmission of control signals for the sMTC UE. The control signal for the sMTC UE may be a mode indication indicating whether the cell supports sMTC, and control region indication information for the sMTC UE, as listed below.

First, it is described for the mode indication for sMTC devices.

In the case of the PBCH, the mode indication may be mode indication information that can only be understood by sMTC. For example, the mode indication may be an indication indicating whether sMTC is supported in a cell, or may indicated, when operating in-band or standalone, whether the corresponding frequency band (including eMTC or sMTC) is an LTE band, an NR band, a GSM band or a real standalone situation that does not belong to any band. For example, indication information on whether the corresponding cell supports sMTC is helpful in terms of sMTC device power saving. In addition, information on the RAT of the corresponding or neighboring band may be used for measurement, in-band operation, and the like. Alternatively, when the indication indicates that the cell supports only sMTC, there is an advantage of reconfiguring or optimizing the MIB field in the PBCH. For example, a specific field removed by removing unnecessary information such as phich-config from the aspect of the current eMTC from the MIB field may be used for another purpose, or reception performance may be improved by removing unnecessary fields. The following methods may be considered as the signaling method of the mode indication.

First Method: Method of Using Known Sequence

The first method may be a method of signaling by sequence detection (or selection), that is, a method of signaling through hypothesis testing.

For example, after designating 4 sequences in advance, it may be a method in which 2 bits are transmitted through 4 hypothesis testing.

Alternatively, it may be a method of signaling through a sequence initialization value. For example, signaling information to be transmitted using a gold sequence is used for gold sequence initialization, and the terminal may receive the signaling information used for initialization by performing sequence detection for a corresponding gold sequence.

Second Method: Repeat Legacy Sync Signals (PSS/SSS) with Some Potential Modifications LTE PSS and/or SSS are used as they are, but a form different from the existing LTE FDD/TDD pattern may be used. Alternatively, by copying the PSS and/or SSS in a time or frequency reversed form to remove the possibility that a legacy eMTC device may be falsely detected, sMTC may receive a corresponding control signal by detecting a pattern between time reversed PSS/SSS.

Third Method: Repeat PBCH Signals with Some Potential Modifications

The third method can indicate a standalone mode, etc. by repeating the PBCH in a specific pattern. The PBCH repetition unit may be the entire PBCH (consisting of 4 OFDM symbols), or a part of the PBCH (i.e., some of the 4 OFDM symbols constituting the PBCH). For example, when configuring a pattern by copying a part of the PBCH to the LTE control region, different parts of the PBCH may be copied to distinguish the pattern. Alternatively, information corresponding to a corresponding state may be transmitted by configuring as many patterns as the number of cases in which three of the four OFDM symbols constituting the PBCH are selected and arranged in order. Alternatively, a pattern may be classified in the form of multiplying the same OFDM symbol by an orthogonal sequence.

Next, a method of transmitting information in coded bits to which separate channel coding is applied will be described.

This method is a method of transmitting additional information not included in the MIB and/or SIB1-BR in the LTE control region by applying separate coding.

For example, only 4 SIB1-BR repetition can be supported in the case of 1.4 MHz BW, and this method can be used to deliver information to inform the sMTC UE of additional repetition (if there is an additional NB). Alternatively, when notifying the eMTC terminal as an X system BW (X needs to be indicated as one of the existing LTE system bandwidth that can be interpreted by the eMTC or LTE terminal. For example, when indicated as 1.4 MHz, eMTC and LTE terminal can understand as a 1.4 MHz cell that supports eMTC) and further configuring an additional BW to the sMTC, the MIB indicates only X-MHz, and the control region (to expand the system bandwidth of sMTC) in front of the MIB may be used to additionally inform the sMTC BW.

In this case, the initial access BW is X-MHz (at least the CRS needs to be transmitted within RBs supported by the X-MHz LTE system bandwidth), and in the BW viewing only the sMTC indicated through LTE control region signaling, the CRS may be omitted. In this case, sMTC sees the extended BW as the entire system BW, and SIB1-BR additional repetition can also be expected according to LTE control region signaling. However, rate-matching (for coherent combining with an NB in which a CRS exists) can follow the initial access BW as if there is a CRS.

This expanded BW need not be symmetric based on the initial access BW, and there is no need to add an RB gap between NBs. That is, the X-MHz indicated by the MIB may be used as time/frequency resources used for coexistence with LTE and eMTC terminals.

The bandwidth allocated only to sMTC can be used to expand the bandwidth of sMTC while minimizing coexistence considerations. This method can be used to transmit information necessary for coexistence with NR. The system bandwidth extension information for the purpose sMTC may be indicated using spare/reserved bits of the MIB (bits that the eMTC terminal does not understand), not the method indicated in the control region proposed above.

The sMTC UE may perform BD the PBCH extension (not necessarily PBCH repetition, but may be filled with separate coded other information) of the LTE control region before or at the same time before PBCH decoding, or decoding the PBCH in the same manner as eMTC in consideration of the terminal complexity, and then may receive the PBCH extension after checking whether PBCH extension support or presence is present through a predefined MIB field (e.g., MIB 1 spare bit).

Next, it will be described for the LTE control region indication.

In sMTC, the MPDCCH/PDSCH region (i.e., the starting point of the OFDM symbol or the number of OFDM symbols used for MPDCCH/PDSCH transmission) or the LTE control region may be more dynamically configured.

As a method of utilizing this, for example, when R2 is shared with eMTC, the startSymbolBR of SIB1-BR may be configured to the maximum value, and it is possible to dynamically configure or change a control region for an sMTC UE through the dynamic control region indication method capable of receiving only sMTC UEs. In this way, the sMTC UE can use for itself a part of the LTE control region or all except the RE required for signaling and/or RS transmission through dynamic configuration.

For example, the LTE control region information may be used the LTE PCFICH as it is, or may be repeated in the frequency domain or in OFDM symbol units in the LTE control region for coverage extension (i.e., according to CE mode/level). Alternatively, the LTE control region information may be repeated over the LTE control region of a plurality of subframes.

Regarding the above, the LTE control region information for the conventional eMTC is transmitted in a broadcast format (e.g., SIB) or is specified in the spec as a fixed value if inevitable. Here, the starting symbol value (startSymbolBR) of the MPDCCH/PDSCH allowed for eMTC is 1/2/3/4, but the starting symbol value of the MPDCCH/PDSCH allowed for sMTC may include 0 (e.g., startSymbolBR=0/1/2/3/4). This may be indicated to the eMTC UE and the sMTC UE in the SIB as follows.

For example, one of startSymbolBR=0/1/2/3/4 is notified to the sMTC UE with a separate SIB field (the separate maximum startSymbolBR that can only be understood by the sMTC terminal may be set to be smaller than the startSymbolBR indicated to the eMTC), or the sMTC UE is always recognized as startSymbolBR=0 irrespective of the SIB, or whether startSymbolBR=0 may be informed by UE-specific RRC.

Next, it will be described for the UL HARQ-ACK feedback signaling.

Conventional eMTC supports only asynchronous HARQ for UL transmission. The sMTC may support synchronous HARQ for UL transmission by transmitting the HARQ-ACK feedback signal in the LTE control region.

Here, the definition of synchronous may be more extensive than synchronous HARQ in LTE. For example, the UL HARQ-ACK feedback time point after UL transmission may be defined as a transmission opportunity form having a specific period (e.g., configured by higher layer or by UL scheduling DCI). The first UL HARQ-ACK feedback transmission opportunity may be repeated with a specific period (synchronous) starting from a certain time point (e.g., configured by higher layer or by UL scheduling DCI) from the last or first subframe of (repeated) UL transmission.

Through the UL HARQ-ACK feedback signal, the base station may perform an early UL HARQ-ACK feedback signal when the base station succeeds 'early' decoding at a time point when repetition of UL data repeatedly transmitted by the sMTC UE is not completed. The sMTC UE can reduce power consumption by early stopping UL transmission using an early UL HARQ-ACK feedback signal. The sMTC UE may have to monitor the UL HARQ-ACK feedback signal at the above-mentioned periodic UL HARQ-ACK feedback signal transmission opportunity during UL repetitive transmission in order to determine the UL transmission termination time point.

Next, it will be described for the DL control search space (SS) for the sMTC UE.

The LTE control region can be used for sMTC DL control channel transmission by configuring a new DL control SS in the corresponding region. For example, a USS for an sMTC UE may be configured in the LTE control region, and the corresponding USS may be allowed only to the sMTC UE, or limited to UEs configured to use the LTE control region. Alternatively, the corresponding USS can be used to support self-subframe scheduling to a high capability UE. Alternatively, it is possible to configure CSS for the sMTC UE and the sMTC UE may perform CSS monitoring in R1 and USS monitoring (LTE EPDCCH operation) in R2.

In order to transmit the control channel for the sMTC UE in the LTE control region, a new ECCE may be defined in the LTE control region. For the sMTC UE, an AL may be configured by combining the ECCE defined in the LTE control region and the ECCE in the conventional MPDCCH region. Alternatively, the CCE of the LTE control region may follow the CCE configuration of LTE.

In the method for lowering the code rate of MPDCCH/PDSCH data, the method of copying some of the MPDCCH OFDM symbols to the LTE control region to improve MPDCCH performance is proposed.

In this case, when receiving common search space (CSS) with eMTC, it is assumed that there is a CRS and the MPDCCH can be extended. When the UE-specific search space (USS) is a control channel for the sMTC UE, the presence or absence of a CRS may be selected differently according to the BL/CE DL subframe and MBSFN subframe configuration. Even in the case of extension under the assumption that there is no CRS in the above, it may be assumed that there is a CRS when repetitive transmission is configured and a duration in which the CRS is to be transmitted is included in the repetitive transmission duration.

Next, it will be described for time resources for coexistence with other systems.

All of the above proposals are methods of using the LTE control region to transmit a specific signal or channel, but there may also be a way to empty it without transmitting a signal for sMTC for coexistence with other systems (e.g., services requiring NR or low-latency). This is possible when eMTC or LTE is not supported, and sMTC terminals may be configured to expect a signal/channel from the LTE control region in a specific subframe periodically or aperiodically. That is, when coexistence with a third system is required, the LTE control region can be opportunistically used for sMTC terminals, and this can be implemented in a method of configuring whether the sMTC terminal can expect a signal/channel for each subframe in the form of signaling (e.g., bitmap).

Fourth Embodiment: sMTC System Operation

The fourth embodiment relates to operations and controls to be considered for supporting an sMTC system.

LTE Control Region Use

The LTE control region is not used in a channel or signal in an idle mode, but can be used only in a connected mode. For example, the LTE control region can be used only when instructed to use the LTE control region with UE specific RRC in the connected mode.

The usage indication of the LTE control region may be in the form of a subframe bitmap for a subframe capable of using a kind of the LTE control region.

Alternatively, whether to use the LTE control region may be configured for each frequency. For example, when sMTC may operate over an NR frequency region and an LTE frequency region, or may operate over the RAT area or empty spectrum different from the NR frequency area used for specific purposes such as control of the first few OFDM symbol(s) of a subframe or slot, or the first OFDM symbol(s) of a subframe or a slot of a specific bandwidth part or a partial frequency region in NR are used for a specific purpose such as control, whether to use the LTE control region may be configured for each frequency.

Alternatively, the use of the LTE control channel can be applied only when a data channel is scheduled. For example, the MPDCCH transmission subframe is not used in the LTE control region, and the LTE control region may be used only in the PDSCH transmission subframe. In the case of a PDSCH transmission subframe, scheduling DCI can dynamically indicate whether to use the LTE control region and related detailed parameters (e.g., RE mapping method, channel coding related option, etc.).

In addition, related options including whether to use the LTE control region may be configured by cell-specific and/or UE-specific higher layer signaling.

In addition, it will be described for the GP (guard period) for NB retuning when using the LTE control region.

In the eMTC, in the case of Tx-to-Rx or Rx-to-Rx NB retuning, the DL subframe on the Rx side always absorbs the switching gap. The reason is that in the case of BL/CE subframe, in order to protect the LTE control region, do not transmit DL to the eMTC UE for the first L symbol (L is fixed to 3 or 4, or a higher layer is configured in a range of 1-4). Because. However, in the case of sMTC, since the LTE control region does not need to be protected, the LTE control region may be used for DL data or DL control signaling as proposed in this disclosure. Therefore, it is necessary to consider the GP for Tx-to-Rx or Rx-to-Rx NB retuning accordingly.

For the sMTC UE, or when the sMTC UE is configured to receive DL data or control signal (for example, (M)PDCCH) through the LTE control region, the location of the GP according to the data type or priority of the data type may be determined as a source NB or a destination NB.

Here, the data type may be classified into payload data and control signals downloaded from an upper layer.

For example, control signals have higher priority than data.

Therefore, for example, in A-to-B NB retuning, whether the GP is configured to A or B, if A is a control signal and B is data (transmitted in PDSCH), the GP is configured to the first OFDM symbol(s) of B (i.e. destination NB), and vice versa, the last OFDM symbol(s) of A (i.e. source NB)), and if it is equal priority, that is, if all data or all control signals, the GP is equally divided into A and B in OFDM units.

As an example of the equal division method, if the length of the GP corresponds to two OFDM symbols, one OFDM symbol is placed in both A and B to configure the GP, respectively. Alternatively, if equal division is not possible because the length of the GP is odd in OFDM symbol units, the GP is always configured to A side, that is, so that the source NB side, is one more per OFDM symbol unit than the destination NB. If both control signal monitoring and data reception are attempted in a specific subframe, the corresponding subframe is regarded as a subframe for monitoring control signals and the GP can be created. Here, a duration of the GP may be a duration in which the base station does not perform MPDCCH/PDSCH scheduling during the corresponding duration or the duration of the GP may be a duration that is allowed not to attempt reception by considering the corresponding duration as the GP depending on the capability of the terminal, even if a signal is transmitted in the corresponding duration.

In the case of Tx-to-Rx, if the last symbol in the subframe immediately preceding Rx is configured as a duration for SRS transmission, the UE considers the duration as part of the GP, and the first part of the Rx duration after Tx (GP Requested time-SRS transmission duration) can be used as a duration for the rest of the GP.

Here, when the SRS transmission is not configured for the terminal expecting Rx, or the corresponding terminal does not transmit the actual SRS and other UL signals in the configured SRS duration, the SRS duration may be regarded as a partial duration of the GP as proposed above. Alternatively, a new signal or message may be defined for the purpose of generating such the GP, and the base station may inform the terminal of this.

As another method, there is also a method in which the base station directly indicates a duration that can be used as the GP in the Rx duration. Unlike the above proposal, since a signal to be transmitted by the base station in the Rx duration can be resource mapped in a rate-matching manner, there may be an advantage in terms of code rate.

For this, the terminal may individually report the required GP duration. However, when receiving a channel that can be expected to receive simultaneously with eMTC terminals or with other sMTC terminals (for example, paging, common DCI, etc.), terminals may only assume to be the GP generated based on the eMTC's GP (which may be determined by a control region value).

The proposed methods can be applied/interpreted differently in RRC connected mode and idle mode.

The LTE control region can be used as a GP for frequency (or narrowband) retuning. In this case, like the eMTC, the UE does not perform DL reception during the LTE control region, and the base station does not perform MPDCCH/PDSCH scheduling during the corresponding period, thereby securing the GP. The enable/disable signal for using the LTE control region as a GP can be configured UE-specifically through higher layer signaling or dynamically configured through DCI, and can be automatically used as a GP in a specific subframe or slot.

The specific subframe or slot may be the first subframe or slot of the destination frequency (or narrowband) in the above description.

When applied in the same way as the LTE control region utilization method described above (the method proposed in the first to third embodiments), the GP is used only in the case of the specific subframe or slot, and for the remaining subframes or slots, the method of utilizing the (higher layer configured) LTE control region proposed in the first to third embodiments may be applied.

In order to support the LTE control region utilization method more dynamically, the method of using the LTE control region of the corresponding subframe or slot through scheduling DCI (e.g., whether it is used as one of the methods proposed in the first to third embodiments above or as a GP) can be indicated.

The number of OFDM symbols that sMTC can expect to receive in the LTE control region may vary depending on a UE. For example, the number of symbols of the available LTE control region may be different according to the frequency retuning time of UL. In this case, all of the above may be similarly applied for each UE. Meanwhile, since the first symbol in which CRS is transmitted is advantageous in terms of reception performance, sMTC terminals may expect DL transmission for all OFDM symbols in the LTE control region, and the eNB may schedule MPDCCH/PDSCH during the corresponding period. Here, the necessary retuning gap is secured as the last OFDM symbol(s) of the previous subframe or slot, and in this case, the eNB may perform rate-matching assuming the GP for the last OFDM symbol(s) of the corresponding subframe or slot, and the sMTC terminal may receive assuming rate-matching for the GP.

Method to Support in TDD

In this section, a method of supporting the sMTC system in TDD is proposed.

Use of DwPTS in TDD

Even in the case of CE mode B, the sMTC terminal can expect to receive MPDCCH in the Downlink Pilot Time Slot (DwPTS). Here, the required number of OFDM symbols may be limited to a special subframe configuration in which as many OFDM symbols are secured in DwPTS when CE mode A excludes the control region in the existing eMTC.

In the case of CE mode A, as above, when the number of OFDM symbols including all the symbols of the control region is secured as many as the number of symbols necessary for the eMTC to use DwPTS, MPDCCH reception can be expected in the corresponding DwPTS.

Even in the case of CE mode B, the sMTC terminal can expect to receive PDSCH in DwPTS. Here, the required number of OFDM symbols in this case may be limited to a special the required number of OFDM symbols may be limited to a special subframe configuration in which as many OFDM symbols are secured in DwPTS when CE mode A excludes the control region in the existing eMTC.

In the case of CE mode A, as above, when the number of OFDM symbols including all the symbols of the control region is secured as many as the number of symbols necessary for the eMTC to utilize DwPTS, PDSCH reception can be expected in the corresponding DwPTS.

In the case of sharing with eMTC in the above A/B/C/D, the use of DwPTS is interpreted in the same manner as eMTC.

FIG. 28 is a flowchart illustrating an example of an MPDCCH transmission method of a base station proposed in the present disclosure.

That is, FIG. 28 shows an operation method by a base station for transmitting an MTC Physical Downlink Control Channel (MPDCCH) in a wireless communication system supporting Machine Type Communication (MTC).

Referring to FIG. 28, the base station may copy and apply symbols of adjacent slots to symbols of a special subframe.

Specifically, the base station may transmit configuration information related to transmission of the MPDCCH to the terminal (S28010). In this case, the configuration information may include LTE control region information and mapping information indicating whether or not mapping is performed through copy between symbols, as in the above-described methods.

In this case, the mapping information may indicate whether the LTE control region of a specific slot is mapped by copying symbols of the same slot/subframe or other slot/subframe.

In this case, the copy between symbols may mean a copy of the mapping pattern mapped to the RE.

Thereafter, the base station maps the MPDCCH to a plurality of resource elements (REs) of at least one first symbol constituting a first slot of a special subframe (S28020).

The special subframe refers to a subframe in which the number of symbols for data transmission is less than a certain number among symbols constituting a subframe as described above, and the mapping of the RE performed by the base station may be performed by copying at least one second symbol of a second slot adjacent to the first slot to at least one first symbol as described in the preceding methods.

That is, in order to map the MPDCCH/PDSCH to REs of symbols constituting a slot of a special subframe, the base station may copy symbols of the same slot or other adjacent slots.

In this case, a mapping pattern of symbols constituting a slot of a special subframe may be the same as a mapping pattern of symbols of the same slot or another adjacent slot.

Thereafter, the base station may transmit the MPDCCH to the terminal on a plurality of resource elements (S28030).

Using such a method, the terminal can improve data transmission performance because it is possible to map control information and/or data to the RE in the LTE control region and transmit.

In this regard, the operation of the base station described above may be specifically implemented by the base station apparatuses 610 and 710 shown in FIGS. 6 and 7 of the present disclosure. For example, the operation of the base station described above may be performed by the processors 611 and 711 and/or the RF unit (or module) 613 and 715.

Specifically, the processors 611 and 711 may control to transmit configuration information related to transmission of the MPDCCH to the terminal through the RF units (or modules) 613 and 715.

In this case, the configuration information may include the LTE control region information and the mapping information indicating whether or not mapping is performed through copy between symbols, as in the above-described methods.

In this case, the mapping information may indicate whether the LTE control region of a specific slot is mapped by copying symbols of the same slot/subframe or other slot/subframe.

In this case, the copy between symbols may mean a copy of the mapping pattern mapped to the RE.

Thereafter, the processors 611 and 711 may map the MPDCCH to a plurality of resource elements (REs) of at least one first symbol constituting a first slot of a special subframe.

The special subframe refers to a subframe in which the number of symbols for data transmission is less than a certain number among symbols constituting a subframe as described above, and the mapping of the RE performed by the base station may be performed by copying at least one second symbol of a second slot adjacent to the first slot to at least one first symbol as described in the preceding methods.

That is, in order to map the MPDCCH/PDSCH to REs of symbols constituting a slot of a special subframe, the base station may copy symbols of the same slot or other adjacent slots.

In this case, a mapping pattern of symbols constituting a slot of a special subframe may be the same as a mapping pattern of symbols of the same slot or another adjacent slot.

Thereafter, the processors 611 and 711 may transmit the MPDCCH to the terminal on a plurality of resource elements through the RF units (or modules) 613 and 715.

FIG. 29 is a flowchart illustrating an example of a method for receiving an MPDCCH of a base station proposed in the present disclosure.

Referring to FIG. 29, the terminal may receive an MPDCCH mapped by copying symbols of a slot adjacent to symbols of a special subframe on the RE.

Specifically, the terminal may receive configuration information related to transmission of the MPDCCH from the base station (S29010). In this case, the configuration information may include LTE control region information and mapping information indicating whether or not mapping is performed through copy between symbols, as in the above-described methods.

In this case, the mapping information may indicate whether the LTE control region of a specific slot is mapped by copying symbols of the same slot/subframe or other slot/subframe.

In this case, the copy between symbols may mean a copy of the mapping pattern mapped to the RE.

Thereafter, the terminal may receive the MPDCCH on a plurality of resource elements (S29020).

In this case, the MPDCCH may be mapped to a plurality of resource elements (REs) of at least one first symbol constituting a first slot of a special subframe.

The special subframe refers to a subframe in which the number of symbols for data transmission is less than a certain number among symbols constituting a subframe as described above, and the mapping of the RE performed by the base station may be performed by copying at least one second symbol of a second slot adjacent to the first slot to at least one first symbol as described in the preceding methods.

That is, in order to map the MPDCCH/PDSCH to the REs of symbols constituting a slot of a special subframe, symbols of the same slot or other adjacent slots may be copied.

In this case, a mapping pattern of symbols constituting a slot of a special subframe may be the same as a mapping pattern of symbols of the same slot or another adjacent slot.

In this regard, the operation of the terminal described above may be specifically implemented by the terminal apparatuses 620 and 720 shown in FIGS. 6 and 7 of the present disclosure. For example, the operation of the terminal described above may be performed by the processors 621 and 721 and/or the RF unit (or module) 623 and 725.

Specifically, the processors 621 and 721 may control to receive configuration information related to transmission of the MPDCCH from the base station through the RF units (or modules) 623 and 725.

In this case, the configuration information may include the LTE control region information and the mapping information indicating whether or not mapping is performed through copy between symbols, as in the above-described methods.

In this case, the mapping information may indicate whether the LTE control region of a specific slot is mapped by copying symbols of the same slot/subframe or other slot/subframe.

In this case, the copy between symbols may mean a copy of the mapping pattern mapped to the RE.

Thereafter, the processors 621 and 721 may control to receive the MPDCCH on a plurality of resource elements through the RF units (or modules) 623 and 725.

In this case, the MPDCCH may be mapped to a plurality of resource elements (REs) of at least one first symbol constituting a first slot of a special subframe.

The special subframe refers to a subframe in which the number of symbols for data transmission is less than a certain number among symbols constituting a subframe as described above, and the mapping of the RE performed by the base station may be performed by copying at least one second symbol of a second slot adjacent to the first slot to at least one first symbol as described in the preceding methods.

That is, in order to map the MPDCCH/PDSCH to the REs of symbols constituting a slot of a special subframe, symbols of the same slot or other adjacent slots may be copied.

In this case, a mapping pattern of symbols constituting a slot of a special subframe may be the same as a mapping pattern of symbols of the same slot or another adjacent slot.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present disclosure by coupling a part of the elements and/or technical features. The order of operations described in the embodiments of the present disclosure may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present disclosure may be implemented by various means, for example, hardware, firmware, software and the combination thereof. In the case of the hardware, an embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present disclosure may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the disclosure. Therefore, the detailed description is not limited to the embodiments described above, but should be considered as examples. The scope of the present disclosure should be determined by reasonable interpretation of the attached claims, and all modification within the scope of equivalence should be included in the scope of the present disclosure.

INDUSTRIAL APPLICABILITY

The present disclosure has been described mainly with the example applied to 3GPP LTE/LTE-A, NR system, but may also be applied to various wireless communication systems except the 3GPP LTE/LTE-A, NR system.

The invention claimed is:

1. A method of receiving a Machine Type Communication (MTC) Physical Downlink Control Channel (MPDCCH), by a terminal, in a wireless communication system supporting MTC, the method comprising:
receiving, from a base station, configuration information related to transmission of the MPDCCH; and
receiving, from the base station, the MPDCCH,
wherein a control region includes first L symbols (1≤L≤4, L is a natural number) in a subframe based on the configuration information, and
wherein based on symbol indexes in the subframe being 0, 1, . . . , 13 in a time domain, and
based on L=1, the MPDCCH mapped to a symbol with symbol index 7 is additionally mapped to a symbol with symbol index 0,
based on L=2, the MPDCCH mapped to a symbol with symbol index 7 is additionally mapped to a symbol with symbol index 0, the MPDCCH mapped to a symbol with symbol index 8 is additionally mapped to a symbol with symbol index 1,
based on L=3, the MPDCCH mapped to a symbol with symbol index 7 is additionally mapped to a symbol with symbol index 0, the MPDCCH mapped to a symbol with symbol index 8 is additionally mapped to a symbol with symbol index 1, the MPDCCH mapped to a symbol with symbol index 9 is additionally mapped to a symbol with symbol index 2, and
based on L=4, the MPDCCH mapped to a symbol with symbol index 7 is additionally mapped to a symbol with symbol index 0, the MPDCCH mapped to a symbol with symbol index 8 is additionally mapped to a symbol with symbol index 1, the MPDCCH mapped to a symbol with symbol index 9 is additionally mapped to a symbol with symbol index 2, the MPDCCH mapped to a symbol with symbol index 10 is additionally mapped to a symbol with symbol index 3.

2. The method of claim 1, wherein the MPDCCH is mapped based on an identical mapping pattern in the at least one first symbol to which the MPDCCH is additionally mapped and the at least one second symbol to which the MPDCH is initially mapped.

3. The method of claim 1, wherein a cell-specific reference signal is mapped to an identical RE in the at least one first symbol to which the MPDCCH is additionally mapped and the at least one second symbol to which the MPDCH is initially mapped.

4. The method of claim 1, wherein a first slot in the subframe includes the control region and a data region in which the MPDCCH or a Physical Downlink Shared Channel (PDSCH) is transmitted.

5. The method of claim 4, wherein rate matching is performed in the data region in preference to the control region.

6. The method of claim 1, wherein a channel estimation of the MPDCCH is performed using a channel estimation result of at least one other subframe contiguous to the subframe.

7. A terminal for receiving a Machine Type Communication (MTC) Physical Downlink Control Channel (MPDCCH) in a wireless communication system supporting MTC, the terminal comprising:
a transmitter for transmitting a radio signal;
a receiver for receiving a radio signal;
at least one processor; and
at least one computer memory operably connectable to the at least one processor and storing instructions that, when executed by the at least one processor, perform operations,
the operation comprising:
receiving, from a base station, configuration information related to transmission of the MPDCCH; and
receiving, from the base station, the MPDCCH,
wherein a control region includes first L symbols (1≤L≤4, L is a natural number) in a subframe based on the configuration information, and
wherein based on symbol indexes in the subframe being 0, 1, . . . , 13 in a time domain,
based on L=1, the MPDCCH mapped to a symbol with symbol index 7 is additionally mapped to a symbol with symbol index 0,
based on L=2, the MPDCCH mapped to a symbol with symbol index 7 is additionally mapped to a symbol with symbol index 0, the MPDCCH mapped to a symbol with symbol index 8 is additionally mapped to a symbol with symbol index 1,
based on L=3, the MPDCCH mapped to a symbol with symbol index 7 is additionally mapped to a symbol with symbol index 0, the MPDCCH mapped to a symbol with symbol index 8 is additionally mapped to a symbol with symbol index 1, the MPDCCH mapped to a symbol with symbol index 9 is additionally mapped to a symbol with symbol index 2, and
based on L=4, the MPDCCH mapped to a symbol with symbol index 7 is additionally mapped to a symbol with symbol index 0, the MPDCCH mapped to a symbol with symbol index 8 is additionally mapped to a symbol with symbol index 1, the MPDCCH mapped to a symbol with symbol index 9 is additionally mapped to a symbol with symbol index 2, the MPDCCH mapped to a symbol with symbol index 10 is additionally mapped to a symbol with symbol index 3.

8. The terminal of claim 7, wherein the MPDCCH is mapped based on an identical mapping pattern in the at least one first symbol to which the MPDCCH is additionally mapped and the at least one second symbol to which the MPDCH is initially mapped.

9. The terminal of claim 7, wherein a cell-specific reference signal is mapped to an identical RE in the at least one first symbol to which the MPDCCH is additionally mapped and the at least one second symbol to which the MPDCH is initially mapped.

10. The terminal of claim 7, wherein a first slot in the subframe includes the control region and a data region in which the MPDCCH or a Physical Downlink Shared Channel (PDSCH) is transmitted.

11. The terminal of claim 10, wherein rate matching is performed in the data region in preference to the control region.

12. The terminal of claim 10, wherein a channel estimation of the MPDCCH is performed using a channel estimation result of at least one other subframe contiguous to the subframe.

13. A method of transmitting a Machine Type Communication (MTC) Physical Downlink Control Channel (MPDCCH), by a base station, in a wireless communication system supporting MTC, the method comprising:

transmitting, to a terminal, configuration information related to transmission of the MPDCCH; and transmitting, to the terminal, the MPDCCH, wherein a control region includes first L symbols (1≤L≤4, L is a natural number) in a subframe based on the configuration information, and wherein based on symbol indexes in the subframe being 0, 1, . . . , 13 in a time domain, based on L=1, the MPDCCH mapped to a symbol with symbol index 7 is additionally mapped to a symbol with symbol index 0, based on L=2, the MPDCCH mapped to a symbol with symbol index 7 is additionally mapped to a symbol with symbol index 0, the MPDCCH mapped to a symbol with symbol index 8 is additionally mapped to a symbol with symbol index 1, based on L=3, the MPDCCH mapped to a symbol with symbol index 7 is additionally mapped to a symbol with symbol index 0, the MPDCCH mapped to a symbol with symbol index 8 is additionally mapped to a symbol with symbol index 1, the MPDCCH mapped to a symbol with symbol index 9 is additionally mapped to a symbol with symbol index 2, and based on L=4, the MPDCCH mapped to a symbol with symbol index 7 is additionally mapped to a symbol with symbol index 0, the MPDCCH mapped to a symbol with symbol index 8 is additionally mapped to a symbol with symbol index 1, the MPDCCH mapped to a symbol with symbol index 9 is additionally mapped to a symbol with symbol index 2, the MPDCCH mapped to a symbol with symbol index 10 is additionally mapped to a symbol with symbol index 3.

14. The method of claim 1, wherein the subframe is a special subframe in which a number of symbols for data transmission among symbols in a subframe is less than a certain number.

* * * * *